US007619764B2

(12) United States Patent
Fukunaga et al.

(10) Patent No.: US 7,619,764 B2
(45) Date of Patent: Nov. 17, 2009

(54) CENTER SERVER, INFORMATION PROCESSING APPARATUS AND METHOD, AND PRINT SYSTEM

(75) Inventors: Shinji Fukunaga, Kawasaki (JP); Masahiko Takaku, Yokohama (JP); Shinji Fujikawa, Yokohama (JP); Masaki Shitano, Yokohama (JP); Mikihiko Kamekawa, Abiko (JP); Fumihiro Fukuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 981 days.

(21) Appl. No.: 10/801,839

(22) Filed: Mar. 17, 2004

(65) Prior Publication Data

US 2004/0174561 A1 Sep. 9, 2004

Related U.S. Application Data

(62) Division of application No. 09/363,826, filed on Jul. 30, 1999, now Pat. No. 6,775,023.

(30) Foreign Application Priority Data

| | | |
|---|---|---|
| Jul. 31, 1998 | (JP) | 10-217425 |
| Jul. 31, 1998 | (JP) | 10-217426 |
| Jul. 31, 1998 | (JP) | 10-217427 |
| Oct. 30, 1998 | (JP) | 10-310567 |
| Oct. 30, 1998 | (JP) | 10-310570 |
| Oct. 30, 1998 | (JP) | 10-310571 |

(51) Int. Cl.
*G06K 15/00* (2006.01)
*H04N 1/00* (2006.01)

(52) U.S. Cl. ........................ 358/1.15; 358/404; 358/405

(58) Field of Classification Search ................ 358/1.15, 358/400, 404, 444, 1.18, 1.16, 407, 438, 358/439, 440, 442, 405
See application file for complete search history.

(56) References Cited

U.S. PATENT DOCUMENTS

| | | | | |
|---|---|---|---|---|
| 5,410,679 | A * | 4/1995 | Lubold et al. | 710/1 |
| 5,963,444 | A * | 10/1999 | Shidara et al. | 700/7 |
| 6,252,674 | B1 | 6/2001 | Takaoka | 358/1.5 |
| 6,317,793 | B1 * | 11/2001 | Toyosawa | 709/228 |
| 6,452,688 | B1 * | 9/2002 | Suzuki | 358/1.15 |

(Continued)

FOREIGN PATENT DOCUMENTS

EP 0 585 074 A2 3/1994

(Continued)

OTHER PUBLICATIONS

Search Report in EP 99 30 6091.

*Primary Examiner*—Jerome Grant, II
(74) *Attorney, Agent, or Firm*—Fitzpatrick, Cella, Harper & Scinto

(57) ABSTRACT

An image collector/transmitter with the smallest transmission cost is provided which can collect images from image keeping locations with the smallest transmission cost without lowering user services such as selection of an output receiver. Position information indicating the keeping location of image data is managed, and when a print order is issued from an external apparatus, the image data for the print order is collected in accordance with the managed position information, and the collected image data and a print request for the print order are transmitted to a printer controller.

25 Claims, 50 Drawing Sheets

U.S. PATENT DOCUMENTS

| | | | | |
|---|---|---|---|---|
| 6,775,023 | B1 * | 8/2004 | Fukunaga et al. | 358/1.15 |

FOREIGN PATENT DOCUMENTS

| | | | | |
|---|---|---|---|---|
| EP | 0 796 001 | A2 | | 9/1997 |
| EP | 0 806 721 | A1 | | 11/1997 |
| EP | 0 847 002 | A1 | | 6/1998 |
| EP | 0977113 | A | * | 2/2000 |
| EP | 0977113 | A2 | | 2/2000 |

* cited by examiner

FIG. 10

| ORDER ID (201) | SUBORDER ID (202) | IMAGE ID (203) | STATUS (204) | |
|---|---|---|---|---|
| USR1/PC1/0002 | - | - | BEING COLLECTED | 211 |
| USR1/PC1/0002 | 0001 | - | BEING COLLECTED | 212 |
| USR1/PC1/0002 | 0001 | CANON/PS5/199801010758 | BEING COLLECTED | 213 |
| USR1/PC1/0002 | 0001 | CANON/PS5/199801050027 | COLLECTED | 214 |

FIG. 11

| SERVER ID (1101) | PRIORITY (1102) |
|---|---|
| PS001 | 100 |
| PS002 | 200 |
| IS001 | 300 |

FIG. 12A

ORIGINAL IMAGE POSITION MANAGEMENT TABLE [A]

| IMAGE ID (1201) | OWNER (1202) | KEEPING LOCATION (1203) | ADDITIONAL INFORMATION (1204) | |
|---|---|---|---|---|
| CANON/PS01/1998ABC001 | USR123 | IS01 | - | 1211 |
| CANON/IS03/1998ABC002 | - | E : ¥ spool ¥ image1.jpg | - | 1212 |
| CANON/IS03/1998ABC003 | - | IS02 | - | 1213 |
| CANON/IS03/1998ABC003 | - | PS07 | - | 1214 |

FIG. 12B

ORIGINAL IMAGE POSITION MANAGEMENT TABLE [B]

| IMAGE ID (1201) | OWNER (1202) | KEEPING LOCATION (1203) | ADDITIONAL INFORMATION (1204) | |
|---|---|---|---|---|
| CANON/PS01/1998ABC001 | USR123 | C : ¥ bank ¥ image12.jpg | - | 1215 |
| CANON/IS01/1998ABC004 | - | C : ¥ bank ¥ image13.jpg | - | 1216 |
| CANON/IS01/1998ABC007 | USR456 | E : ¥ shop ¥ image45.fpx | - | 1217 |

SCRIPT (PDL)

```
#[imagetable
      imagetab( "CANON/PS02/19980403A899", "./train. jpg");
      imagetab( "CANON/PS02/19980402BC66", "./ship. jpg");
#[document 0 0 297 210
#[page 1
            .
            .
            .
      image( 5, 5, ( "CANON/PS02/19980403A899", 1, ((1, 0))));
      image( 50, 5, ( "CANON/PS02/19980402BC66", 1, ((1, 0))));
            .
            .
#]page
#]document
```

1402

```
<REG ID="/CANON/IS01/010353000051"
        OPE="NEW"
        CUST="1001080353000101"
        SHOP="1001">
        <CAMLLINK HREF="./im012345.jpg"/>
</REG>
```

```
<CAML>
<TRANS ID="0001000353000001">
    <SENDER ID="IS04" TIME="12/20/1997 11:26:03 JST"/>
    <RECEIVER ID="CENTER"/>
</TRANS>
<FTP ID="/CANON/IS01/010353000051">
    <CAMALLINK HREF="./image123. jpg"/>
</FTP>
</CAML>
```

RECEPTION ORDER LIST WINDOW

4501

```
<CAML>
<ORDER ID="USR01/PC001/0013" SHOP="PS01" OPE=CANCEL"
            CUST="1001080353000101" DATE="19971220" CHARGE="2300">

</ORDER>
</CAML>
```

CENTER SERVER, INFORMATION PROCESSING APPARATUS AND METHOD, AND PRINT SYSTEM

This application is a division of application Ser. No. 09/363,826, filed on Jul. 30, 1999, now U.S. Pat. No. 6,775,023 the entire disclosure of which is incorporated herein by reference.

BACKGROUND OF THE INVENTION

1. Field of the Invention

The present invention relates to a print system in a network in which in response to a print request from a client, a server controls a print instruction and supplies and collects image data and transmits the collected images and print orders to an output apparatus.

2. Related Background Art

With recent rapid progress of computer performances, it becomes possible to refer to an image on a computer or edit it. With recent advancement on network techniques such as Internet prevailed to general societies, it is common to distribute image data via a network. There are services for printing image data on a network at a remote printer.

Under such environments, a great amount of digital data such as image data is kept at a plurality of computers. It is becoming important for network data supply how a great amount of data is kept efficiently and how flexibly an operation such as changing a data keeping location is performed.

According to the prior art, digital data such as an image file kept on a network is identified by using Uniform Resource Locator (hereinafter called URL) widely used by the Internet, and a data acquisition request is transmitted to the computer which keeps the data and is identified by a portion of URL. According to this prior art, a computer name and a keeping location name in URL are other names assigned to physical data keeping locations. If a user knows only URL, data can be acquired by issuing a data acquisition request to the computer which keeps the data, even if the data keeping location is changed.

However, the computer name and data keeping location name in URL cannot be changed. Therefore, if a physical data keeping location is to be changed, it is required to be changed under the condition that URL is not changed. Namely, if it is necessary to keep data which cannot be covered by the processing ability and data capacity of a computer to be identified by URL, it is difficult to change the data keeping location, URL memorized by users may be changed, or a processing efficiency of the computer may be lowered. There is therefore a possibility that usability of the system is lowered.

When an image is printed by using such a system, a client designates URL and acquires an image file from a data keeping location. In order to request for printing an image file edited at a client computer, the edited image file of a high print resolution is transferred from the client computer to a center server and to a remote printer. This increases a network load. At the same time, since the client and a print server or output shop having the remote printer are required to be connected to the network so as to transfer data of the high resolution image file, the access time to the network increases and the communications cost rises.

As a second print system, print images may be kept at a print server so that a print image can be output in response to an output instruction, without transferring the print image to the network. In this case, a data transfer amount of the network can be reduced considerably so that a network route cost can be lowered and a data output amount per unit time can be increased. With this second print system, however, it is difficult to print an image at an output apparatus which does not keep the print image, and each output apparatus is required to invest facilities such as a print image keeping apparatus.

Both the conventional print systems require a large amount of investment in terms of cost, when an already existing small DPE shop and the like participate in network print services.

A user operates upon a computer to acquire remote data via the network. With this method, the user connects the computer to the network and designates desired data to acquire the data from a remote computer connected to the network. Connection to the network may be realized by using a mobile communications equipment or the like thorough dial-up or other methods.

Such a connection method is positively performed at any desired time by a user to acquire data. However, an output apparatus such as a printer is always connected to the network.

When print data is received at a printer or print server via the Internet, it is possible to know the size of reception data in advance. However, even if a plurality of data sets are to be received, a data request is performed once. Therefore, it takes in some cases a long time to receive all the data. During this data reception, other tasks are stopped.

According to the prior arts described above, since print images are collectively kept at a center server, although a user can instruct a desired output apparatus to print an image, a running cost increases and a service quality is lowered because of a large data transfer amount. If print images are kept at output apparatuses, the output apparatus is fixed in accordance with print images so that the performance of easy-to-use is degraded. In addition, the output apparatuses are required to be always connected to the network and a connection method is limited. For example, a data output apparatus such as a printer is required to be always connected to the network, and it is impossible to connect the output apparatus itself by using a mobile communications equipment through dial-up connection.

If data is to be transmitted again because of disconnection of a network, a user is required to again instruct a transmission of each data. It is therefore difficult to transfer a large amount of print data at the same time.

When a user orders a print, a print order status cannot be referred to until the order is transmitted to a center server via the network and an actual print is output. Furthermore, if there is a simple order miss such as erroneous contents of the order, it is necessary to issue another correct order together with the erroneous order.

If a print server cannot process a print order received from a center server, from some reasons such as a management trouble, it is necessary for a print server (print shop) clerk to explain the reason to the user and postpone a delivery date or provide other countermeasures.

SUMMARY OF THE INVENTION

It is a first object of the present invention to provide an image collection and transfer apparatus wherein print image keeping locations are managed by a center server, and images are collected from image keeping locations having a low transfer cost and transferred to an output apparatus desired by a user, so that the cost can be minimized without lowering the user service contents such as selection of a desired output apparatus.

It is a second object of the present invention to freely and easily make a change in image data keeping locations and the like without lowering user convenience, by definitely assigning an identifier to a design or image data and managing and identifying each image data keeping location by using the identifier, and to flexibly select a data acquisition destination in accordance with a computer data processing ability, by assigning each identifier with a plurality of physical data files.

It is a third object of the present invention to allow an output apparatus to use dial-up connection so as to improve the degree of freedom of installation location of the output apparatus, and to allow stable use of the dial-up connection even under unstable network environments such as mobile communications, by transferring only the data still not transferred when the network connection is intercepted, without any user operation.

In order to solve the above problems, an image collection apparatus of this invention comprises: managing means for managing position information indicating a keeping location of image data; image collecting means for collecting image data designated by the print order in accordance with the print order and the position information managed by the managing means, when the print order is received from an external apparatus; and print instructing means for transmitting the image data collected by the image collecting means and a print request basing upon the print order to a print controller.

A print controller of this invention comprises: image managing means for managing position information indicating a keeping location of image data; editing means for acquiring image data designated by the print order from the keeping location in accordance with the print order and the position information managed by the managing means, and editing the acquired image data to generate print data in accordance with the print order, when the print order is received from an external apparatus; and output means for outputting the print data edited and generated by the editing means.

A storage medium of this invention stores a computer readable program which realizes the functions of the image collection apparatus or the print controller.

BRIEF DESCRIPTION OF THE DRAWINGS

FIG. 10 is an order status table.

FIG. 11 is a server management table.

FIGS. 12A and 12B are original image position management tables.

DETAILED DESCRIPTION OF THE PREFERRED EMBODIMENTS

First Embodiment

<System Structure>

Figure 1:
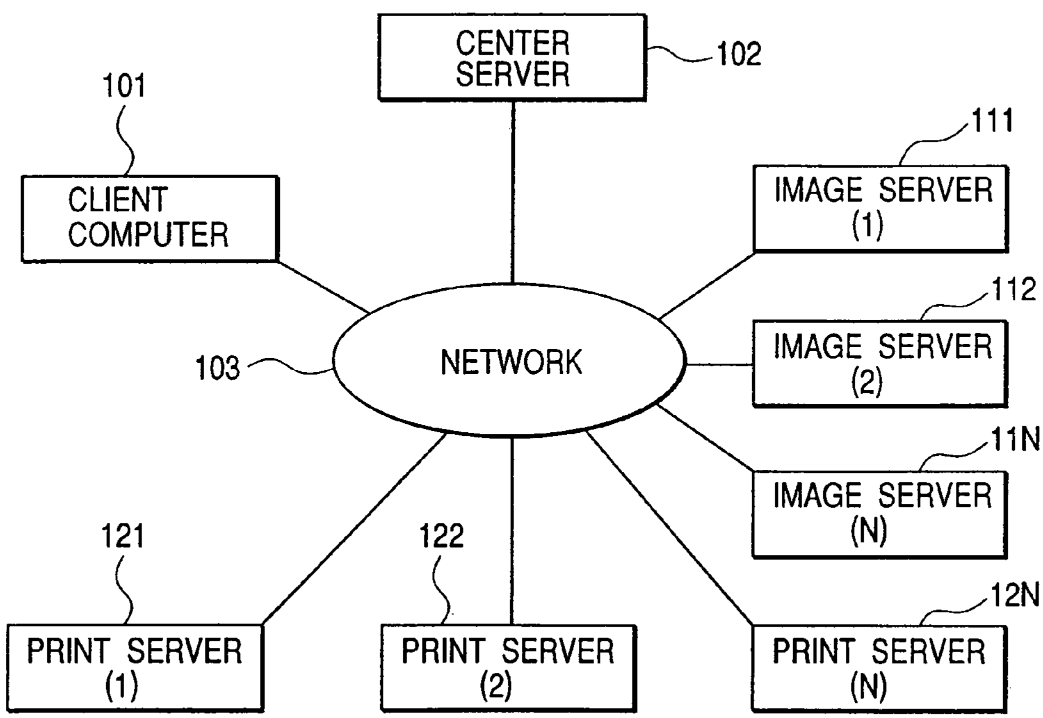
FIG. 1 is a diagram showing a system structure according to a first embodiment of the invention.

FIG. 1 shows the structure of the whole system according to the first embodiment of the invention.

In FIG. 1, reference numeral 101 represents an information processing apparatus (a computer system including a CPU, a ROM, a RAM, an HDD and the like to be described later with reference to FIG. 2) which a user or client of the system of this embodiment directly operates upon, for example, at home. The information processing apparatus 101 is hereinafter called a client computer.

The client computer 101 has: a function of browsing information such as images stored in a center server 102 to be described later, via a network 103; a function of acquiring the information; and a function of issuing a print instruction or image print order at a print server to be described later, to the center server 102.

The print instruction or image print order is hereinafter called a print order or simply an order.

The center server 102 is an image collecting apparatus of the invention which executes a process in response to a request mainly from the client computer 101.

The center server 102 has: a function of storing images to be transmitted to the client computer 101 in response to a request from the client computer 101; and a function of receiving a print order from the client computer 101, collecting images in accordance with image keeping location information, and issuing a print request to print servers 121, 122, 123, 12N to be described later.

The details of the print request will be later given.

Reference numerals 111, 112 and 11N represent an image storing apparatus having a function of storing images and transmitting stored images to the center server 102 in response to a request from the center server 102. The image storing apparatuses 111, 112 and 11N are hereinafter called an image server.

The print servers 121, 122 and 12N are an output apparatus having: a function of printing an image in response to a print request from the center server 102; and a function of storing images to print them and transmitting the stored images to the center server 102 in response to an image transmission request from the center server 102. The output apparatus is hereinafter called a print server. In this embodiment, the print server corresponds to a print shop such as a DPE shop and is connected via the network 103 to the center server.

The print servers 121, 122 and 12N may not be provided with the image storing function.

The network 103 is a connection system for the client computer 101, center server 102, image servers 111, 112 and 11N, and print servers 121, 122 and 12N, and may be a local area network (LAN) or the Internet. Such a connection system is hereinafter called simply a network. In this embodiment, although the network 103 used is the Internet, other network systems may also be used.

Some of the client computer 101, center server 102, image servers 111, 112 and 11N and print servers 121, 122 and 12N may be the physically same computer.

<Block Diagrams of Client Computer, Center Server and Image Server>

Figure 2:
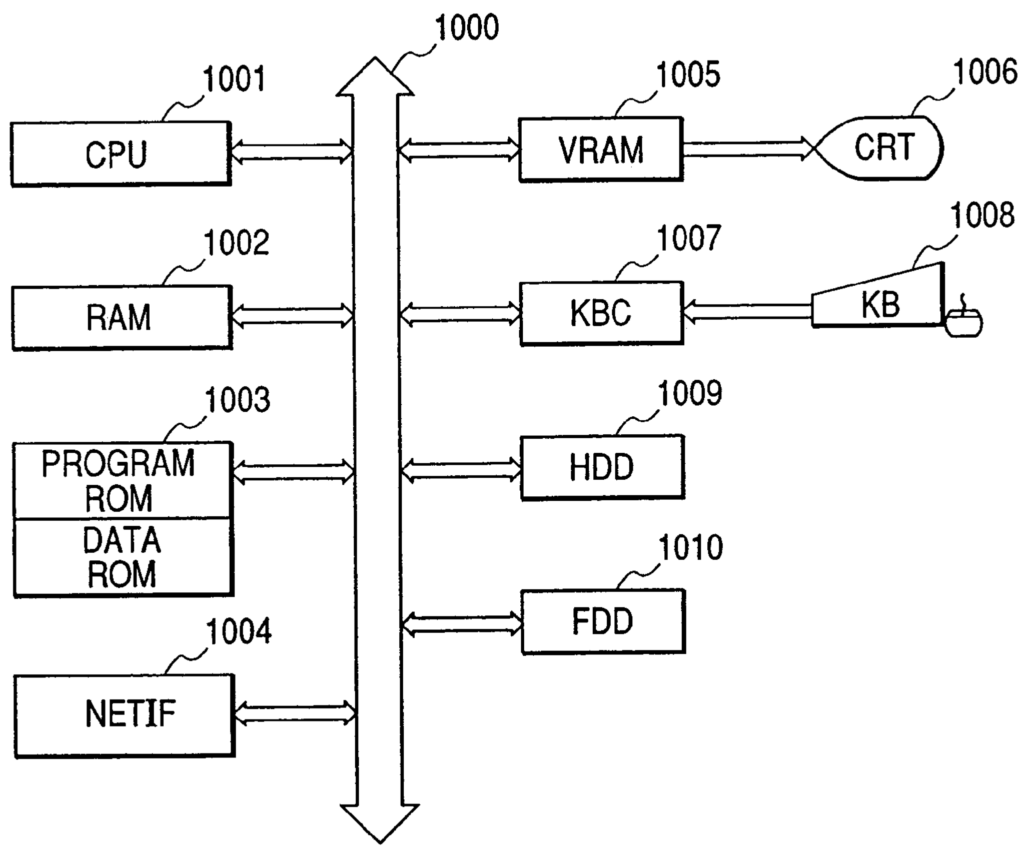
FIG. 2 is a block diagram showing the system structure of a center server, an image server, and a client computer.

FIG. 2 is a block diagram showing the system structure of the information processing apparatus as the embodiment of the invention. In this embodiment, the internal structures of the center server 102 as the image collecting apparatus, the image servers 111, 112 and 11N as the image storing apparatus, and the client computer 101 are the same. Therefore, the hardware structure thereof will be described collectively with reference to FIG. 2.

In FIG. 2, reference numeral 1001 represents a central processing unit (hereinafter called a CPU) for controlling the information processing apparatus.

Reference numeral 1002 represents a random access memory (hereinafter called a RAM) which functions as the main memory of CPU 1001 and provides a memory area for programs and an execution area and a data area for the programs.

Reference numeral 1003 represents a read only memory (hereinafter called a ROM) for storing the operation sequence of CPU 1001. ROM 1003 includes a program ROM and a data ROM, the former storing fundamental software (OS) which is a system program for controlling the information processing apparatuses (image collecting apparatus, image storing apparatus), and the latter storing information necessary for running the system. In place of ROM 1003, an HDD 1009 to be described later is used in some cases.

Reference numeral 1004 represents a network interface (NETIF) which controls the data transfer between the information processing apparatus (image collecting apparatus, image storing apparatus) via the network and analyzes the connection status.

Reference numeral 1005 represents a video RAM (VRAM) on which an image to be displayed on the screen of a CRT 1006 to be described later is developed, and which controls the image display, the image indicating an operation status of the information processing apparatus (image collecting apparatus, image storing apparatus).

Reference numeral 1006 represents a display apparatus such as a CRT display. The display apparatus 1006 is hereinafter called a CRT.

Reference numeral 1007 represents a controller for controlling signals input from an external input apparatus 1008.

The external input apparatus 1008 receives any operation entered by a user of the information processing apparatus, and may be a keyboard or a pointing device such as a mouse. The external input apparatus 1008 is hereinafter called simply a KB.

The hard disk drive (HDD) 1009 is used for storing application programs and data such as image information. In this embodiment, the application program may be a software program for realizing various functions constituting the embodiment.

The details of a flow chart illustrating each program will be later given with reference to FIG. 15, FIGS. 17 to 22, FIGS. 24 to 29, and FIGS. 34 to 36.

Reference numeral 1010 represents an external input/output apparatus which uses a removable disk such as a floppy disk and a CD-ROM. The external input/output apparatus 1010 is used for reading the application program from the storage medium, and is hereinafter called simply an FDD.

Application programs and data to be stored in HDD 1009 may be stored in FDD 1010.

Reference numeral 1000 represents an input/output bus (address bus, data bus, and control bus) for connection of respective units.

<Block Diagram of Print Server>

Figure 3:
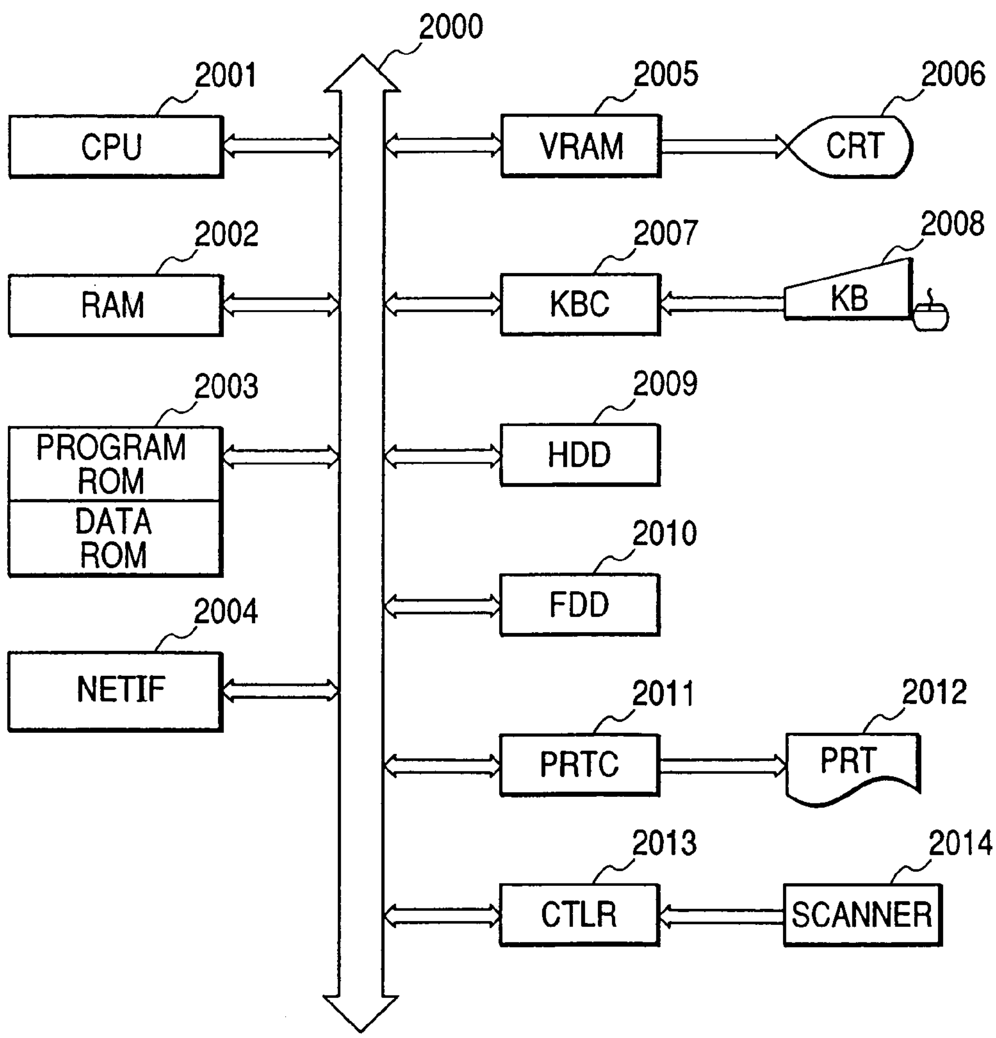
FIG. 3 is a block diagram showing the system structure of a print server.

FIG. 3 is a block diagram showing the system structure of the print server of the invention.

In FIG. 3, reference numeral 2001 represents a CPU for controlling the output apparatus or print server.

Reference numeral 2002 represents a RAM which functions as the main memory of CPU 2001 and provides a memory area for programs and an execution area and a data area for the programs.

Reference numeral 2003 represents a ROM for storing the operation sequence of CPU 2001. ROM 2003 includes a program ROM and a data ROM, the former storing fundamental software (OS) which is a system program for controlling the print server and the latter storing information necessary for running the system. In place of ROM 2003, an HDD 2009 to be described later is used in some cases.

Reference numeral 2004 represents a network interface (NETIF) which controls the data transfer to and from other information processing apparatuses such as the center server 101 via the network and analyzes the connection status.

Reference numeral 2005 represents a VRAM on which an image to be displayed on the screen of a CRT 2006 to be described later is developed, and which controls the image display, the image indicating an operation status of the information processing apparatus or print server.

Reference numeral 2006 represents a display apparatus such as a CRT display. The display apparatus 2006 is hereinafter called a CRT.

Reference numeral 2007 represents a controller for controlling signals input from an external input apparatus 2008.

The external input apparatus 2008 receives any operation entered by a user of the print server at the print shop, and may be a keyboard or a pointing device such as a mouse. The external input apparatus 2008 is hereinafter called simply a KB.

The hard disk drive (HDD) 2009 is used for storing application programs for print control and data such as image information.

Reference numeral 2010 represents an external input/output apparatus which uses a removable disk such as a floppy disk and a CD-ROM. The external input/output apparatus 2010 is used for reading the application program from the storage medium, and is hereinafter called simply an FDD.

Application programs and data to be stored in HDD 2009 may be stored in FDD 2010.

Reference numeral 2011 represents a printer controller which controls an external input/output apparatus 2012 to be described later and controls an output image. The printer controller 2011 is hereinafter called a PRTC.

The external input/output apparatus 2012 is an external output apparatus capable of high resolution printing such as a printer. The external input/output apparatus 2012 is hereinafter called a PRT.

Reference numeral 2013 represents an extended external input/output apparatus controller which controls an extended external input/output apparatus 2014 and is called hereinafter a CTRL.

The extended external input/output apparatus 2014 is an apparatus having a function of externally inputting image data, such as a scanner for reading a printed matter. This apparatus 2014 is hereinafter simply called a scanner.

Reference numeral 2000 represents an input/output bus (address bus, data bus, and control bus) for connection of respective units.

<Center Server>

Figure 4:
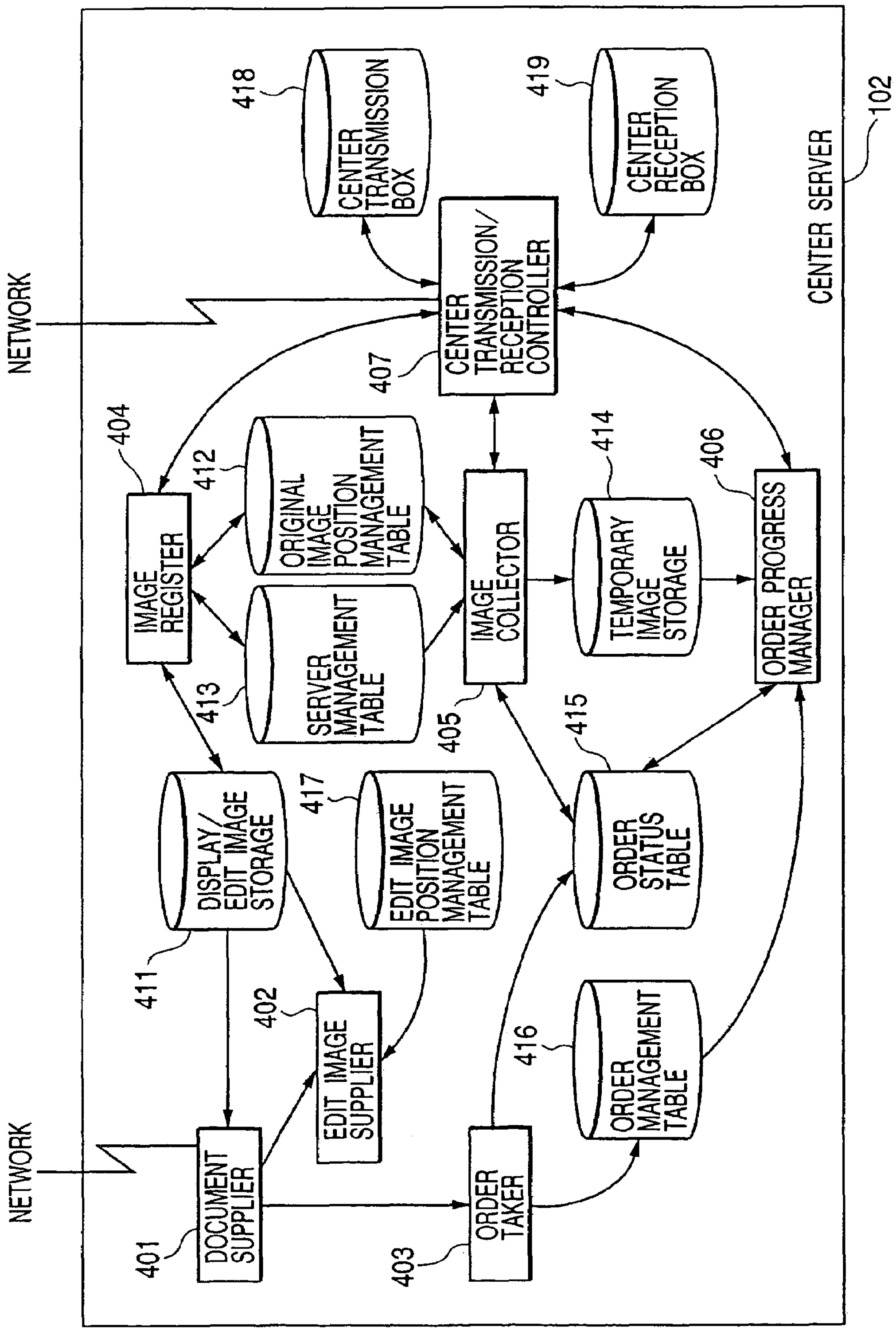
FIG. 4 is a diagram showing the module structure of a center server according to the invention.

FIG. 4 shows the structure of each processing component and management data in the center server 102. In FIG. 4, each of the processing components 401, 402, 403, 404, 405, 406 and 407 is an application program which is used by developing it from ROM 1003, HDD 1009 or FDD 1010 upon RAM 1002. Reference numerals 411, 412, 413, 414, 415, 416, 417, 418 and 419 represent data stored in HDD 1009.

A document supplier 401 is an application program which allows to search a document (text, image, or a combination of text and image) requested from the client computer 101 via the network, for example, the Internet, from HDD 1009 and to transmit the searched document. The document supplier 401 is generally called an Internet server program or WWW server program which can transmit a document and in addition, can use an application program stored in HDD 1009 or the like in response to a request from the client computer 101 by developing the application program on RAM 1002, and if necessary, can limit data to be transmitted by certifying a user ID in response to an external request.

An edit image supplier 402 is an application program which allows to search a display/edit image requested from the client computer 101 from a display/edit image storage 411 to be described later, and after the display/edit image data is converted into an image format used by the client computer 101, to transmit the converted display/edit image data to the client computer 101 via the document supplier 401.

An order taker 403 is an application program which allows to receive a print order transmitted from the client computer 101, to analyze the print order to store the analyzed results in an order management table 416 to be described later, to transmit taken order results to the client computer 101 via the document supplier 401, and to use an image collector 405 for collecting images to be described later by developing it from HDD 1009 or the like onto RAM 1002.

The edit image supplier 402 and order taker 403 are an application program which is developed by the document supplier 401 from HDD 1009 or the like onto RAM 1002 in response to a request from the client computer 101. This application program is a program generally called a CGI program with an expanded function.

An image register 404 is an application program which is developed by a center transmission/reception controller 407 to be described later from HDD 1009 or the like onto RAM 1002. This application program receives position change data (new registration, delete, copy and move) of a print image and an edit image transmitted from the image server 111 or print server 121 and updates and manages a position management table 412 to be described later, and has a function of storing the edit image in the display/edit image storage 411 to be described later. This application program has also a function of transmitting the print image transmitted from the move source image server 111 or print server 121 to a move target image server 111 or print server via a center transmission/reception controller 407, if the position change data is data representative of a move of the print image.

The image collector 405 is an application program which is developed from HDD 1009 or the like onto RAM 1002 in response to an activation instruction from the order taker 403 or the center transmission/reception controller 407 to be described later. The image collector 405 has: a first function of determining a storage location of a print original image necessary for printing stored in the order management table 416 to be described later; a second function of transmitting, via the center transmission/reception controller 407, a print image acquisition request to the image server 111 or print server 121 which was determined as the storage location identified by the first function; a third function of temporarily storing the print image returned from the image server 111 or print server 121 in a temporary image storage 414 to be described later and managing the stored print image; and a fourth function of using an order progress manager 406 to be described later by developing it from HDD 1009 or the like onto RAM 1002 when it is judged from the management of a collection state that all print images necessary for a print order are collected.

The order progress manager 406 is an application program which is used by being developed by the image collector 405 or center transmission/reception controller 407 from HDD 1009 or the like onto RAM 1002. This application program has: a function of generating print request data to be supplied to the print server 121 from print order data stored in the order management table 416 and print image data stored in the temporary image storage 414 to be later described and transmitting the generated print request data to the print server 121 via the center transmission/reception controller 407 to be later described; and a function of updating the contents of the order management table in accordance with print completion report data received from the print server 121 via the center transmission/reception controller 407.

The center transmission/reception controller 407 has: a function of managing data generated and collected by an application program such as image collector 405 of the center server and kept in a center transmission box 418 to be described later, and extracting transmission data for the image server 111 or print server 121 from the center transmission box 418 and transmitting the extracted transmission data, in response to a data transmission/reception start request received by the image server 111 or print server 121 via NETIF 1004; and a function of storing reception data received from the image server 111 or print server 121 in a center reception box 419 to be later described and using an application program for analyzing the reception data and processing it by developing the application program from HDD 1009 or the like upon RAM 1002.

Data transfer to and from the image server 111 or print server 121 is executed in response to a transmission/reception start request from the image server 111 or print server 121. Therefore, an optimum transmission/reception cycle can be established in accordance with the network connection state (permanent connection via a dedicated line, temporary connection by dial-up).

The display/edit image storage 411 stores images of a low resolution corresponding to all images users can use. This storage 411 stores display images and edit images to be supplied in response to an image acquisition request from a user received via a network browser or peruser 502 to be described later or the document supplier 401. The display image (e.g., thumbnail image of 64×64 pixels or the like) has a lowest resolution and is displayed on the network browser 502. The edit image (e.g., visual image of 1.4 base, 1/16 base or the like) is used by a data processor 501 to be described later. Image files are stored at directories assigned to respective user Ides, in correspondence to the transmission data limit of each user ID possessed by the document supplier 401, and each image file has a table which is used for searching an image file corresponding to an image ID to be later described with reference to FIG. 9.

The original image position management table 412 is a table which manages keeping locations of print images, as will be later described with reference to FIGS. 12A and 12B.

A server management table 413 is a table which manages information on the image server 111 and print server 121, as will be later described with reference to FIG. 11.

The temporary image storage 414 is a spool for storing print images (e.g., original images, 1/16 base images) necessary for printing until the printing is completed.

An order status table 415 is used for managing the progress status of a print order, as will be later described with reference to FIG. 10.

The order management table 416 stores print order data, as will be later described with reference to FIG. 8.

An edit image position management table 417 manages a correspondence between a path name and an image ID of an image file stored in the display/edit image storage 411, by using the same layout as that of the original image position management table to be later described with reference to FIGS. 12A and 12B.

The center transmission box 418 and center reception box 419 are used when transmission data and reception data of the image server 111 or print server 121 is stored in HDD 1009.

<Client Computer>

Figure 5:
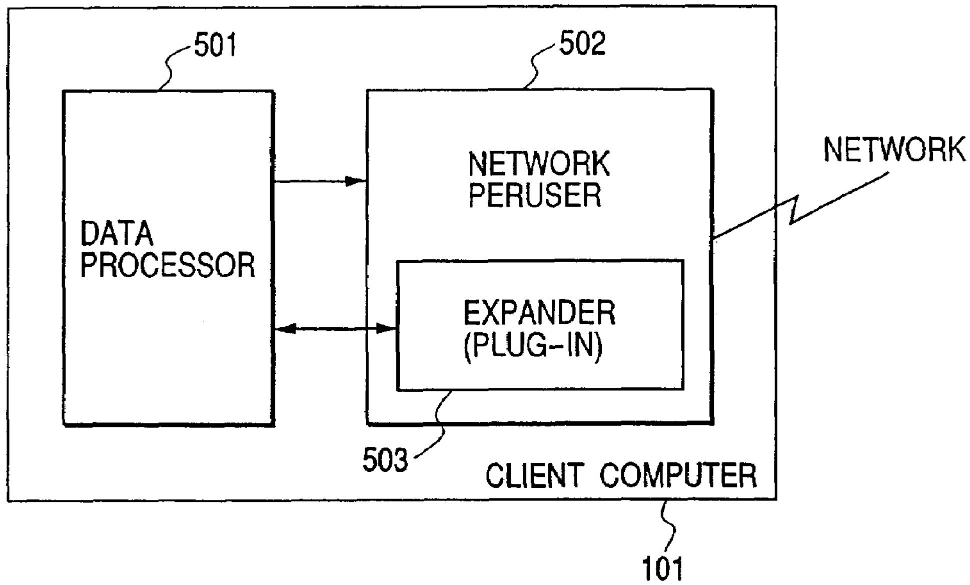
FIG. 5 is a diagram showing the module structure of a client according to the invention.

FIG. 5 is a diagram showing the structure of the information processing apparatus or client computer 101 actually used by a user. The client computer 101 has the data processor 501, network browser or peruser 502 and an expander 503, as the application programs which are used by being developed from ROM 1003, HDD 1009 or FDD 1010 upon RAM 1002.

The data processor 501 has: a function of creating and editing document data including character strings, figures, images and the like and converting the document data into a page descriptive language; and a function of acquiring edit images from the center server 102 via the expander 503 running in the network browser 502, generating a print order including edited page descriptive language, and placing the print order to the center server via the expander 503.

The network browser 502 is an application program (a general application program such as an Internet browser) capable of receiving external services via the network, for example, the Internet.

The network browser 502 can expand its function by building the expander (plug-in module) therein. The expander (plug-in) 503 is an application program built in the network browser 503. The network browser 503 places emphasis upon a function of browsing documents such as images on the network and transmitting document data to the client computer. Therefore, it uses the expander 503 to cooperate with an external application program such as data processor 501.

The expander 503 is an application program stored in HDD 1009 and can be used by developing it upon RAM 1009 at the same time when the network browser 502 is developed. The expander 503 has: a function of acquiring data to be processed by the data processor 501 from the network in cooperation with the network browser 502; a function of displaying the acquired data on CRT 1006; a function of transferring the acquired data to the data processor 501; and a function of transmitting print order data generated by the data processor to the network.

The print order placing function of the data processor 501 may be performed by the order placer of the center server 102 and the data display function and print order data transmitting function of the expander may be performed by the network browser 502. In this case, the invention can be reduced in practice without the data processor 501 and expander 503.

<Image Server>

Figure 6:
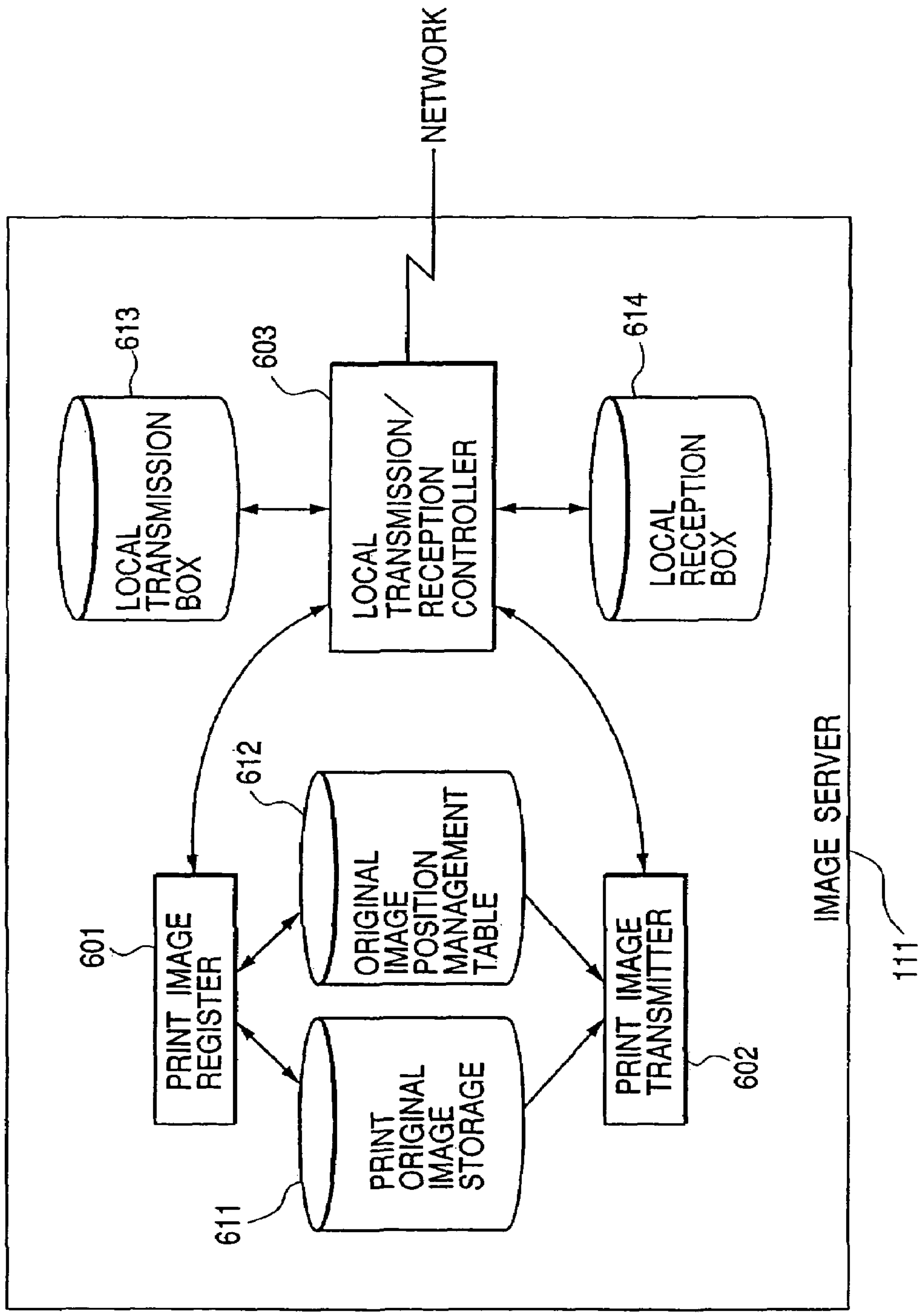
FIG. 6 is a diagram showing the module structure of an image server according to the invention.

FIG. 6 is a diagram showing the processing components in the image servers 111, 112 and 11N and management data. Each of processing components 601, 602, 603 and 604 is an application program which is used by developing it from ROM 1003, HDD 1009 or FDD 1010 onto RAM 1002.

A print image register 601 is an application program for new registration, move, copy and delete of a print image, and has: a function of reading print original images stored in an external storage such as CD-ROM and ZIP by using FDD 1010 and storing the read original images in a print original image storage 611 to be described later, in response to an operation entered by a manager from KB 1008; and a function of deleting images in the print original image storage 611. It also has: a function of updating an original image position management table 612 to be described later; a function of generating display/edit images; and a function of transmitting original image position information, display/edit images and the like to the center server 102 via a local transmission/reception controller 603 to be described later.

A print image transmitter 602 is an application program which has a function of analyzing a print image transmission request received by the local transmission/reception controller 603 to be described later from the center server 102, searching necessary print images from the print original image storage 611 to be described later by using the original image management table 612 to be described later, and transmitting the necessary print images to the request transmitting side (center server 102) via the local transmission/reception controller 603.

The local transmission/reception controller 603 has: a function of managing data generated by the application program such as print image register 601 of the image server and stored in the local transmission box 613, transmitting a transmission/reception start request to the center server 102 via NETIF 1004, and extracting transmission data from the local transmission box 613 and transmitting it; and a function of storing reception data received from the center server 102 in the local reception box 614 and analyzing the reception data to use the application program for processing the reception data by developing it from HDD 1009 or the like onto RAM 1002.

The print original image storage 611 stores print original image files of a high resolution in a removable disk which can be read and written by HDD 1009 or FDD 1010.

The original image position management table 612 is a table which manages path names of print images by storing them in HDD 1009 as a database or searchable file, as will be later described with reference to FIG. 12.

The local transmission box 613 and local reception box 614 are used when transmission data and reception data for the center server 102 is stored in HDD 1009.

<Print Server>

Figure 7:
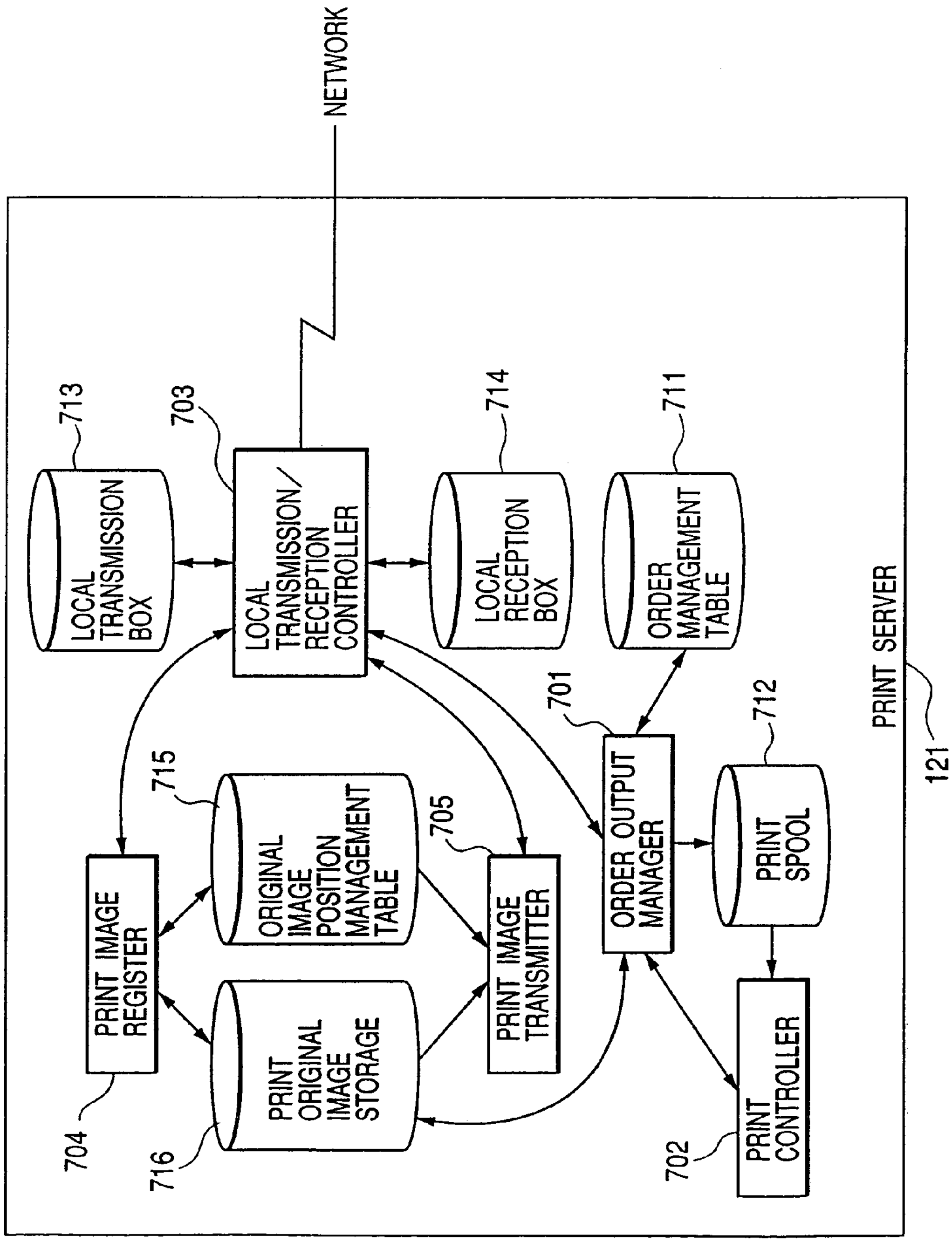
FIG. 7 is a diagram showing the module structure of a print server according to the invention.

FIG. 7 is a diagram showing the processing components in the print servers 121, 122 and 12N and management data. Each of processing components 701, 702, 703, 704 and 705 is an application program which is used by developing it from ROM 2003, HDD 2009 or FDD 2010 onto RAM 1002.

An order output manager 701 is an application program having a function of managing the progress status of a print order transmitted from the center server 102. This application program has: a function of receiving a print order from the center server 102 via a local transmission/reception controller 703 to be later described, analyzing the print order and storing the analyzed results in an order management table 711 to be later described; a function of generating print data in accordance with a print operation entered by an operator from KB 1008, storing the print data in a print spool 712 to be later described, and sending a print start instruction to a print controller 702 to be later described; and a function of receiving a print completion notice from the print controller 702, generating print completion notice data and transmitting the print completion notice data to the center server 102 via the local transmission/reception controller 703.

The print controller 702 is an application program having a function of generating a final print image and sending it to PRTC 2011 to print it. This application program has: a function of editing a final print image by using print original images in the print spool 712 to be described later in accordance with the edit information in the print spool 712; and a function of sending a completion notice to the order output manager 701 when a print process is completed.

The local transmission/reception controller 703 is similar to the local transmission/reception controller 603 of the image server 111 and has: a function of managing data generated by the application program such as order output manager 701 of the print server and stored in a local transmission box 713, transmitting a transmission/reception start request to the center server 102 via NETIF 2004, and extracting transmission data from the local transmission box 713 and transmitting it; and a function of storing reception data received from the center server 102 in a local reception box 714 and analyzing the reception data to use the application program for processing the reception data by developing it from HDD 2009 or the like onto RAM 2002.

A print image register 704 is similar to the print image register of the image server 111, and is an application program for new registration, move, copy and delete of a print image. This application program has: a function of reading print original images stored in an external storage such as CD-ROM by using FDD 2010 and storing the read original images in a print original image storage 716 to be described later, in response to an operation entered by a manager from KB 2008; and a function of deleting images in the print original image storage 716. It also has: a function of updating an original image position management table 715 to be described later; a function of generating display/edit images; and a function of transmitting original image position information, display/edit images and the like to the center server 102 via a local transmission/reception controller 703 to be described later.

A print image transmitter 705 is similar to the print image transmitter 602 of the image server and is an application program which has a function of analyzing a print image transmission request received by the local transmission/reception controller 703, searching necessary print images from the print original image storage 716 to be described later by using the original image management table 715 to be described later, and transmitting the necessary print images to the request transmitting side via the local transmission/reception controller 703.

The order management table 711 is a database or searchable file stored in HDD 2009 and has print order data as will be described later with reference to FIG. 8 and an order status table having the progress status data of print orders as will be described later with reference to FIG. 10.

The print spool 712 temporarily stores edit information and all print original images necessary for a print process by the print controller 702.

The local transmission box 713 and local reception box 714 are similar to the local transmission box 613 and local reception box 614 of the image server, and are used when transmission data and reception data for the center server 102 is stored in HDD 2009.

The original image position management table 713 is similar to the original image position management table 612 of the image server 111, and is a table for managing the path names of print images as will be later described with FIG. 12. This table is stored as a database or searchable film in HDD 2009.

The print original image storage 718 is similar to the print original image storage 611 of the image server 111, and stores print original image files of a high resolution in a removable disk which can be read and written by HDD 2009 or FDD 2010.

In this embodiment, the print server 121 has print original images and a management function therefor to include the functions of the image server 121 and reduce a transmission load. Even if the print server 121 is not provided with the image server functions such as print image register 704, print image transmitter 705, original image position management table 715 and print original image storage 716, the embodiment can be reduced in practice.

If NETIF 2004 of the print server 121 or NETIF 1004 of the image server 111 and network 130 are replaced by digital communications, e.g., Personal Handyphone System (PHS) and digital communications apparatuses such as mobile communications and mobile communications apparatuses, the invention can be reduced in practice even under mobile communications environments.

<Print Order Data>

Figure 8:
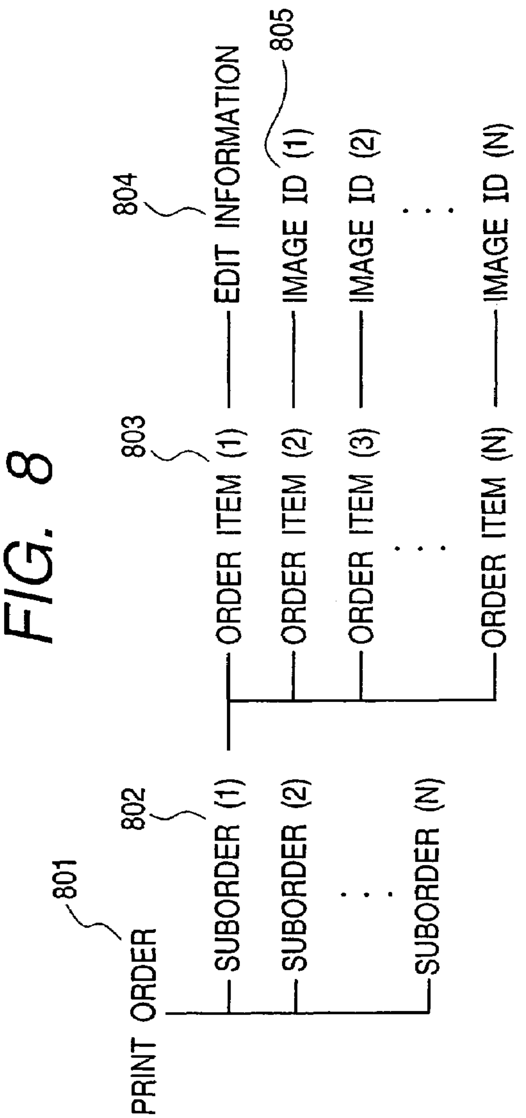
FIG. 8 is a diagram showing the data structure of print order data used by the invention.

FIG. 8 shows the structure of print order data used in this embodiment. The print order data has the data structure for storing print order data used in this embodiment. The print order data herein described is transmitted from the center server to the print server. The print order data is stored in the order management table 416 of the center server 102 by the order taker 403, and processed by the order progress manager 406. The print order data is also stored in the order management table 711 of the print server 121 and managed by the order output manager 701. The data structure of print order data and various terms used in this embodiment will be described with reference to FIG. 8.

In FIG. 8, reference numeral 801 represents a print order which is a unit of a print request by a user. The print order is identified by an order ID unique to this embodiment. The print order 801 is constituted of one or more sub-orders 802 and includes print order information such as an identifier of a print server at which a user wishes to print an image.

The order ID is a combination of a user ID, a client computer identifier, and an order placing time. The user ID is an identifier of a user who issued a print order. The client computer identifier is an identifier (IP address of network connection) of a client computer from which the user issued the print order.

The sub-order 802 is a unit of printing at a print server and is identified by a sub-order ID which is a unique serial number (001, 002, . . . ) in the print order. The sub-order is constituted of one or more order items 803 and includes sub-order information such as a paper size, the number of output copies and the like.

The order item 803 constituting the sub-order 802 is constituted of edit information 804 or image ID 805.

The edit information 804 is a script which writes a print position of each image by page descriptive language.

The image ID 805 identifies a print image. The image ID 805 constitutes the sub-order as one order item. As will be later described with reference to FIGS. 9A and 9B, the image ID identifies a print image. If a plurality of image files at remote locations have the same image, they are assigned the same image ID.

Although the order 801, sub-orders 802 and order-items 803 include user information, charge information and the like, they are not relevant to the present invention so that they are omitted in this embodiment.

<ID System>

Figure 9A:
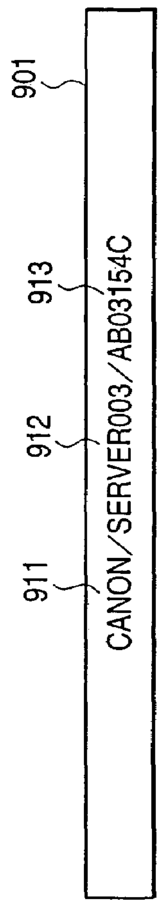
FIGS. 9A and 9B are diagrams illustrating image Ides.
Figure 9B:
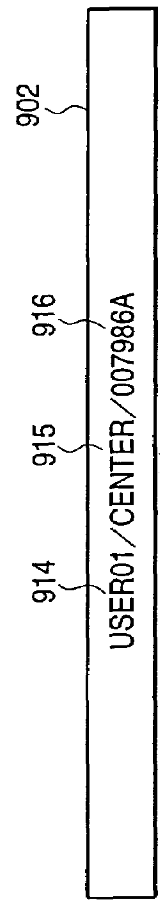

FIGS. 9A and 9B are diagrams explaining an image ID and an order ID of this embodiment.

In FIG. 9A, reference numeral 901 represents an image ID which is partitioned into three parts by a delimiter ("/"). In this embodiment, the image ID is assigned to each print original image when the original image is registered.

Reference numeral 911 represents the name of a center server 102.

Reference numeral 912 represents an ID of a server which registered the print original image having the image ID. In this embodiment, this ID is an ID of either the image server 111 or print server 121. This server ID 912 is uniquely assigned to the image server 111 and print server 121 connected to the center server 102, and also assigned to the center server 102.

The server ID 912 is used for maintaining the image ID unique, and is not necessarily required to be the same as the server ID which stores the corresponding original image.

Reference numeral 913 represents a numerical number uniquely assigned to an original image when the image is registered in the server. This numerical number may be a time when the registration process is executed.

In this embodiment, a print original image can be uniquely discriminated by using the center server name 911, server ID 912 and numerical number 913.

In FIG. 9B, reference numeral 902 represents an order ID which is partitioned into three parts by a delimiter ("/"). In this embodiment, the order ID is assigned to each print order placed by a user, and the center server 102 assigns the order ID when a print order is placed.

Reference numeral 914 represents a user ID for identifying the user who placed the print order.

Reference numeral 915 represents a server ID of the center server 102 which took the print order.

Reference numeral 916 represents a numerical number uniquely assigned to a taken print order when the print order is taken at the center server 102 which executes an order taking process. This numerical number may be a time when the order taking process is executed.

In this embodiment, a print order can be uniquely discriminated by using the user ID 914, server ID 915 and numerical value 916.

<Order Status Table>

FIG. 10 shows the order status table 415 used by the embodiment. The status table 415 is stored in HDD 1009 of the center server 102 as a database or searchable file. Mainly the image collector 405 controls each process to be later described with reference to flow charts, by managing the collection status of print images of each print order by using this table. This table may be used by storing it in RAM 1002 of the center server.

In FIG. 10, reference numeral 201 represents an order ID which identifies a print order taken by the center server and presently processed or already processed.

Reference numeral 202 represents a sub-order ID for identifying a sub-order and constituting the print order identified by the order ID.

Reference numeral 203 represents an image ID of a print original image used by the item constituting the sub-order identified by the sub-order ID 202.

Reference numeral 204 represents a collection status of print original images of the corresponding order and sub-orders. This collection status is represented by either "image being collected" or "image collected".

Data of the order status table 415 is stored in rows 211 to 214.

In FIG. 10, a cell with (-) indicates that the cell has no data. The table manages the status in the order and sub-order units as well as the preparation status of each print image. For example, the data in the fourth row 214 in FIG. 10 includes the order ID of "USR1/PC1/0002", the sub-order ID of "0001", the image ID of "CANON/PS5/1998902020027" and the status of "image collected". This means that the print image data already exists at the center server and that the preparation is completed such as transmission preparation to the print server. The data at the third row 213 indicates that print images are not still prepared for the image ID "CANON/PS5/1998901010758" of the sub-order ID of "0001". The data at the second row 212 indicates that preparation is not completed for the sub-order ID of "0001", and the data at the first row 211 indicates that preparation is not completed for the order ID of "USR1/PC1/0002".

Although each print order may be stored as one data structure, in this embodiment, each of the print order data is stored both in the order management table and order status table, so as not to change each process in each of the flow charts as much as possible, which change may be caused by additional information of a print order.

<Server Management Table>

FIG. 11 shows the server management table used by the embodiment. The server management table is stored in HDD 1009 of the center server 102 as a database or searchable file. This table manages information on all the image servers and print servers connected to the center server 102. In this embodiment, the table is used by an original image position determining process to be later described with reference to the flow chart shown in FIG. 15. This table may be stored in RAM 1002 of the center server.

In FIG. 11, reference numeral 1101 represents a server ID for definitely discriminating all the image servers and print servers connected to the center server.

Reference numeral 1102 represents an image acquisition priority order which is used as a judgement criterion when the same original image identified by an image ID is stored in a plurality of image servers and print servers. The image acquisition priority order 1102 has a preset relative value corresponding to a transmission cost necessary for transmitting image data to the center server during an original image collection process to be described later. The transmission cost used herein is a total cost which includes not only the network transmission cost but also a time to be taken for transmitting image data in response to a request from the center server. The image acquisition priority order 1102 takes a value from 1 to 999. The smaller the number, the smaller the transmission cost necessary for image acquisition.

For example, if the server is in the same LAN as viewed from the center server, the value is set to "100. If the server is not in the same LAN but is always connected to the network, the value is set to "200". If the server is not in the same LAN and is not always connected to the network but connected through dial-up, the value is set to "300". If the server has a low process efficiency because of high access occurrence frequency although it is in the same LAN, the value is set to "100"+"20".

<Original Image Position Management Table>

FIGS. 12A and 12B show original image position management tables used in the embodiment. The original image position management table is stored in HDD 1009 of the center server 102, HDD 1009 of the image server 111, and HDD 2009 of the print server 121 as a database or searchable file. This table is used for identifying a storage location of an original image necessary for printing during each process to be described later. An original image position management table A at the center server shown in FIG. 12A stores usable print image data stored in all the image servers and print servers connected to the center server. An original image position management table B at the image server or print server shown in FIG. 12B stores usable print image data stored in HDD 1009 or HDD 2009 of the server and in FDD 1010 or FDD 2010. The original image position table may be stored in RAM 1002 or RAM 2002 of the server.

In FIGS. 12A and 12B, reference numeral 1201 represents an image ID for each usable print image.

Reference numeral 1202 represents an owner ID for each print image which ID is definitely determined from the image ID. A cell of this owner ID is made blank if an image is publicized irrespective of whether it is free or not.

Reference numeral 1203 represents a keeping location of print image data of the corresponding image ID. In the original image position management table A of the center server 102, the keeping location 1203 is indicated by the server ID of the image server 111 or the server ID of the print server 121 having an image identified by the corresponding image ID, or the path name to the print image stored in HDD 1009 of the center server. A plurality of values may be stored for one image identified by an image ID. In the original image position management table B of the image server or print server, the keeping location 1203 is indicated by the path name of a print image stored in HDD. Each original image can be identified by a combination of the original image position management tables A and B. Namely, as will be later described, a client designates only an image ID and then the center server can recognize which server stores the image data identified by the image ID. The center server then passes the image ID and data acquisition request to the server. The image data can be acquired by using the path name stored in the original image position management table B of the server.

Reference numeral 1204 represents additional information which is used for deleting an original image file, or for judging whether an original image file can be transmitted to the client computer.

In the original image position management table B of the image server 111 or print server 121, the keeping location 1203 is indicated by the path name of a print image stored in HDD 1009 or HDD 2009.

Other items such as a registration date and an image size may also be stored. However, since these items are not relevant to the invention, they are omitted.

Examples of original image position management data 1211, 1212, 1213, 1214, 1215, 1216, and 1217 stored in the original image position management table are shown. FIG. 12A shows an example of an original image position management table of the center server 102, and FIG. 12B shows an example of an original image position management table of the image server or print server.

For example, the original image position management data 1211 indicates that the owner identified by a person identified by the owner ID of "USR123" has a proprietary right of print image data of an image identified by the image ID of "CANNON/PS01?1998ABC001" and the print image data is stored in HDD 2009 or FDD 2010 of the print server identified by the server ID of "PS01".

The original image position management data 1212 indicates that print image data of an image identified by the image ID of "CANNON/IS03/1998ABC002" is stored in HDD 1009 or FDD 1010 of the center server 102 as an image file identified by the path name of "E:\spool\image1.jpg". As will be later described, if a path name is stored as the keeping location of the original image position management table of the center server, as in the case of the original image position management data 1212, the print image file is a temporarily stored file in order to transmit it to the print server.

The original image position management data 1213 and 1214 indicate that print image data of an image identified by the image ID of "CANNON/IS03/1998ABC003" is stored both at an image server "IS02" and a print server "PS07". The original image position management table B is a table for the image server with the server ID of "IS01". The original image position management table 1215 of the table B corresponds to the original image position management data 1211 of the table A. Namely, in the table A, the server ID of "IS01" is stored in the keeping location 1203, and in the table B, the keeping location 1203 indicates the location of the image file identified by the path name of "E:\bank\image12.jpg" of the server.

In the original image position management table stored in the image server 111 or print server 121, the keeping location 1203 stores only the path name of the server or the volume name of a removable disk such as readable CD-ROM in FDD 1010 or FDD 2010 and the path name in the volume.

<Transmission Data Format>

Figure 13:
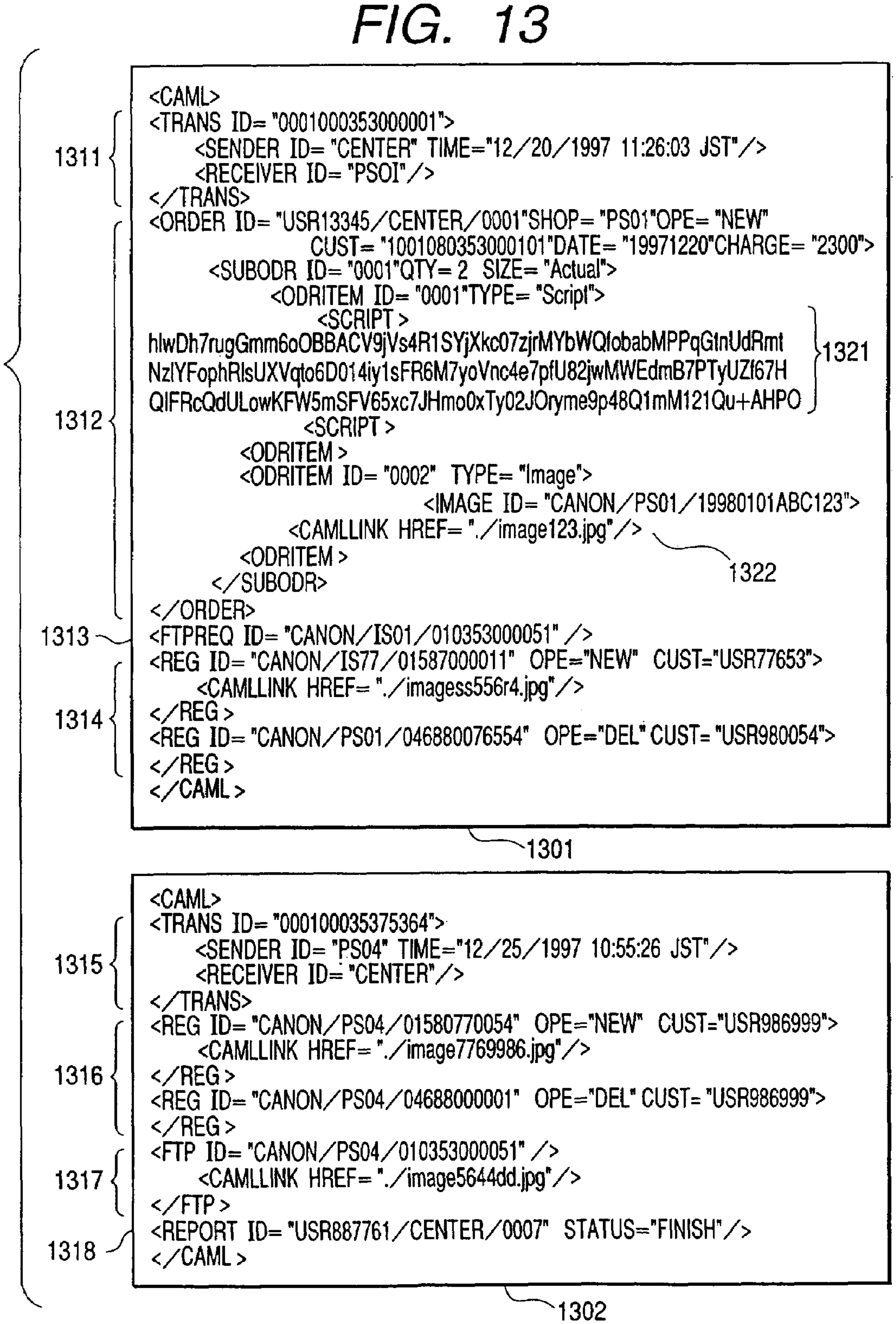
FIG. 13 is a diagram showing examples of a transmission data format used by the invention.

FIG. 13 is a diagram showing a transmission data format used in the embodiment. Transmission data to be transferred among the center server 102, image server 111 and print server 121 has the file format shown in FIG. 13.

The transmission data format used in the embodiment utilize "Standard General Mark-up Language" of ISO 8879.

In FIG. 13, reference numeral 1301 represents an example of a transmission file to be transmitted from the center server 102 to the print server 121, and reference numeral 1302 represents an example of a transmission file to be transmitted from the print server 121 to the center server 102.

As in the transmission file 1301, tags representative of the contents of various transmission data are stored in an area surrounded by a start tag <CAML> and an end tag </CAML>. In FIG. 13, reference numerals 1311, 1312, 1313, 1314, 1315, 1316, 1317, and 1318 represent transmission data. If the transmission data has a hierarchical structure inclusive of low level transmission data, tags for low level transmission data are stored between the start and end tags, such as <SUBODR> tag of the transmission data 1312. A character string at the top of each tag is a tag name which is an identifier of the contents of the tag.

One transmission file may store a plurality of transmission data of an optional type.

In FIG. 13, the transmission data 1311 is a transmission/reception header transmission data representative of a sender server and a receiver server of the transmission data file, and is stored as the first transmission data of the transmission data file. One set of the transmission/reception header transmission data 1311 is stored for one transmission data file.

The transmission data 1312 is an order transmission data used for transmitting a print order placed by a user to the print server 121. The order transmission data is used for transmitting the print order 801 described with FIG. 8. The order transmission data has lower tags of <SUBODR> and <ODRITEM> in order to store the data structure of the print order 801.

The transmission data 1313 is an original image transmission request transmission data which is used when the center server 102 requests the image server 111 or print server 121 to transmit a print original image file.

The transmission data 1314 is an image registration information transmission data which is used when the center server 102 requests the image server 111 or print server 121 to newly register or delete a print original image.

The transmission data 1315 is a transmission/reception header transmission data same as the transmission/reception header transmission data 1311.

The transmission data 1316 is an original image registration process transmission data which is used when the print server 121 requests the center server 102 to newly register or delete a print original image or transfer it to another print server or image server 111.

The transmission data 1317 is an original image transmission data which is used when the print server 121 transmits a print original image to the center server 102 in response to the original image transmission request transmission data 1313 transmitted from the center server 102.

The transmission data 1318 is a print result notice data which is used when the print server 121 notifies the center server 102 of a print process result of the print order in response to the order data 1312 transmitted from the center server 102.

Reference numeral 1321 represents various data stored in the transmission data file. If a symbol such as "<" is contained in the stored data, this symbol may be erroneously analyzed as a start tag when the center transmission/reception controller 407 analyzes transmission data. Therefore, as in the case of the transmission data 1312, data different from the transmission data tag is stored as internal codes.

Reference numeral 1322 represents another file such as image data different from the transmission data file. This file 1322 stores its file name as a parameter in the tag.

<Script>

Figure 14:
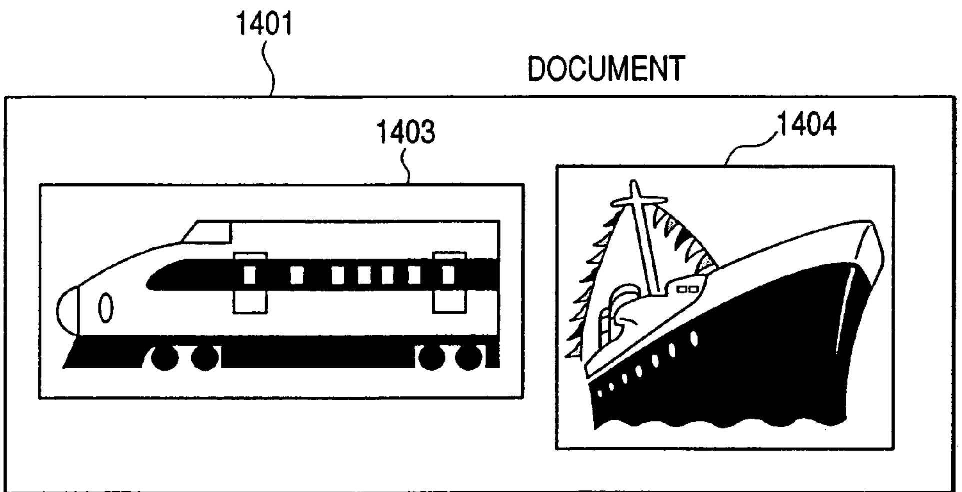
FIG. 14 is a diagram showing examples of a script written with a page descriptive language used by the invention.

FIG. 14 shows an example of a script written by a page descriptive language used in the embodiment.

In FIG. 14, reference numeral 1401 represents a document created by the data processor 501 of the client computer 101, the document being finally printed by the print server 102. Reference numerals 1403 and 1404 represent images contained in the document. The document is created by DTP (desk-top publishing) and is a file containing characters, figures and image data.

Reference numeral 1402 represents a script obtained by converting the document 1401 by the data processor 501 of the client computer 101 by using the page descriptive language. The script is transmitted to the print server 102 via the center server 102 and analyzed by the print controller 702.

The data processor 501 edits a document by acquiring edit images of a low resolution from the center server 102, so that the data transfer amount on the network can be reduced and a memory capacity necessary for editing can be reduced.

For an image description (image ( )) in the script 1402, the data processor 501 stores the image Ides of the image data 1403 and 1404. The data processor 501 uses edit images of a low resolution, whereas the print controller 702 uses print original images. Therefore, the path name of an image file to be used by the data processor 510 or print controller 702 is stored in a corresponding table of imagetab ( ) at the top of the script.

<Description of Operation>

First, the overall operation of the embodiment will be described with reference to FIG. 1.

First, the image server 111 or print server 121 registers print original images. The image server 111 of this embodiment is called a contents server and stores images mainly supplied from a legal person running this server and usable by all users. The print server 121 of this embodiment is a print shop at which photographs are developed and which stores mainly personal images of each user usable only by the user. However, in order to reduce a transmission load of print images, the print server 121 may resister print images same as those registered by the image server 111.

The image server 111 or print server 121 assigns each print image registered by the server with an identifier (image ID). The image server 111 and print server 121 generate display/edit images of a low resolution which the client computer 101 browses and edits. The display image is a thumbnail image, and the edit image is, for example, of ¼ base although it depends on a display resolution. In generating such images, a print image of a high resolution is thinned and smoothed. An image at a low layer of the FlashPix (registered trademark) format may be used as the display/edit image.

The image server 111 or print server 121 transmits the display/edit images and image registration information to the center server 102, and the center server 102 stores the transmitted display/edit images and image registration information.

By using the client computer 101, a user acquires usable edit images and information on the print servers 111, 112 and 11N stored in the center server 102, and after a desired edit designation is made, selects one or more images and a desired print server 121 and place a print order to the center server 102.

The center server stores information of the taken print order and thereafter, identifies a keeping location of a print image identified by each image ID contained in the print order by using the image registration information stored in the center server 102, and if necessary, transmits an image acquisition request to the image server 111, 112 or 11N or print server 121, 122 or 12N.

The image server or print server received the image acquisition request identifies the image file by using the image registration information of the server, and transmits the image file to the center server 102.

The center server 102 receives print images from the image server or print server and stores them in the center server 102.

When all the print images necessary for the print order are collected at the center server 102 or the selected print server 121, the center server 102 transmits the print original images and print order to the print server 121.

The print server 121 received the print order and print original images from the center server 102, executes a print process in accordance with the print order, and thereafter transmits a print completion notice to the center server 102.

The center server 102 receives the print completion notice from the print server 121, and if necessary, deletes the print images collected for the print order and updates the image registration information.

<Image Registration at Print Server>

A registration process of print original images to be executed by the print server 121 will be described. The location at which the print server 121 is installed is usually a shop such as a DPE shop. This shop performs a registration of image data mainly supplied by a user.

The print image register 704 of the print server 121 registers image data of the user, and the local transmission/reception controller 703 transmits transmission data representative of the registration information to the center server 102. Registration of the transmission data by the transmission/reception controller is performed by storing a transmission file in the local transmission box 713.

In addition to new registration of original images, the print image register 704 deletes already registered original images, moves and copies original images to another print server 122 or image server 112.

In this embodiment, it is assumed that each user acquires in advance a user ID allowing to use this embodiment system.

Figure 15:
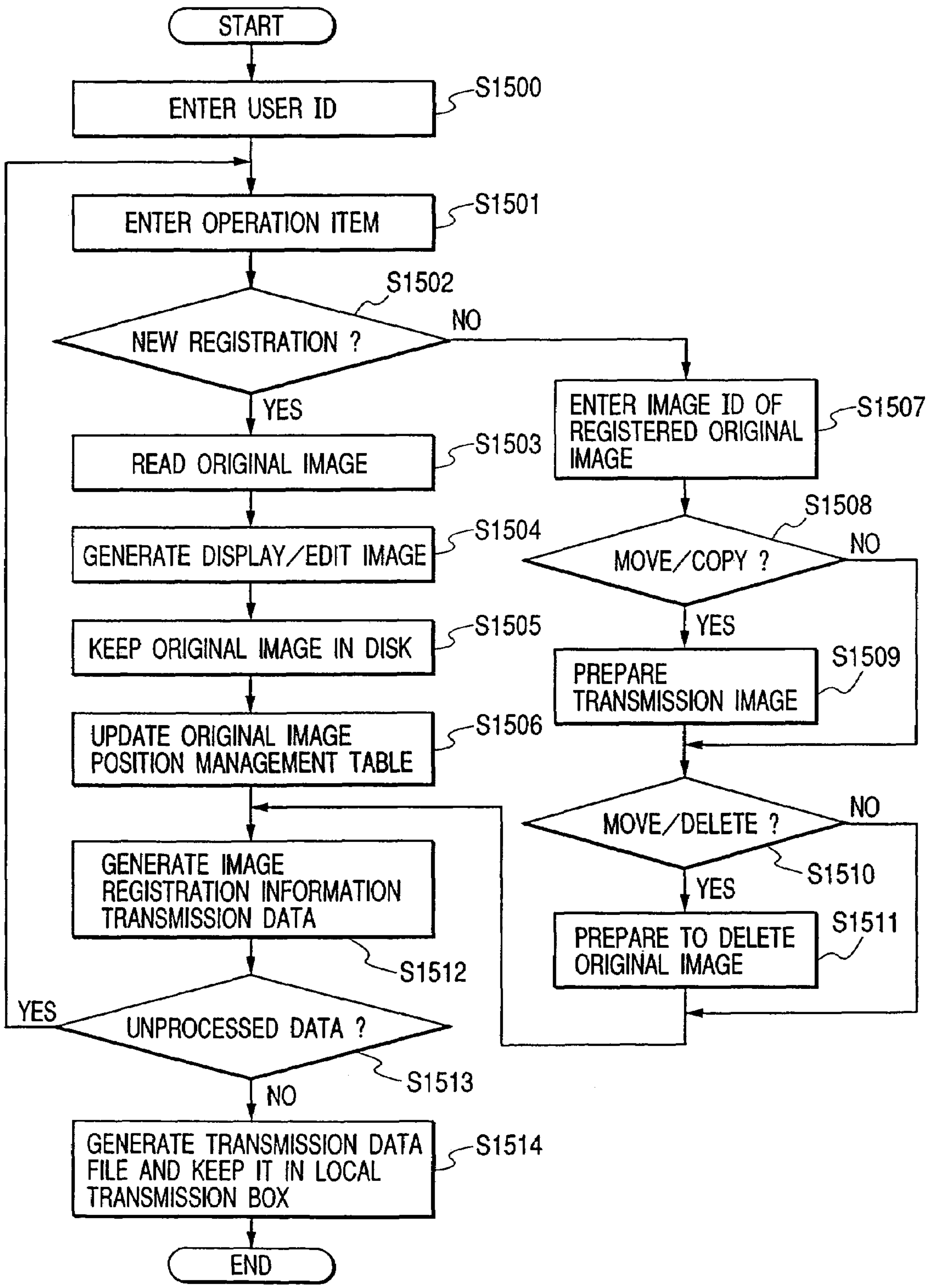
FIG. 15 is a flow chart illustrating an original image registration process to be executed by the print server.

FIG. 15 is a flow chart illustrating an image registration process to be executed by the print image register 704. A process of image registration, move, copy and delete to be executed by the print image register 704 will be described with reference to the flow chart of FIG. 15.

At Step S1500 a user enters a user ID already acquired and confirmed from a membership card or the like by using KB 2008 to store the user ID in RAM 2002.

At Step S1501, a code (hereinafter called an operation code) discriminating an operation item is entered from KB 2008 to store it in RAM 2002. The operation item includes "new registration", "move", "copy", "delete" and the like of image data.

At Step S1502 the operation code stored at Step S1501 is checked. If the operation code indicates "new registration", the flow advances to Step S1503, whereas if not, the flow advances to Step S1507.

At Step S1503, an original image stored in a removable disk is read into RAM 2002 by using FDD 2010, or a printed image is read with the scanner 2014 and stored in RAM 2002. At this time, a unique value is generated in the print server 121 by using a time or the like, which is used as the image ID shown in FIGS. 9A and 9B and assigned to the image. The image ID is stored in RAM 2002.

At Step S1504 the original image stored in RAM 2002 at Step S1503 is converted into a display/edit image having a lower resolution and a reduced image size and file size, the display/edit image being stored in the local transmission box 713. The format of the display/edit image generated at Step S1504 is made so that it can be processed by the data processor 501 and expander 503 of the client computer 101. The image format used is a format which allows to write additional information such as a comment, for example, a JFIF (JPEG Interchange Format) which is one of the image data formats using JPEG compression algorithms. The image ID of the image generated at Step S1503 and stored in RAM 2002 is written as the additional information. The image data formats include JFIF, GIF, TIF, EXIF, ZIP and the like, and the registration process is executed by using the format desired by the user.

At Step S1505, the original image read into RAM 2002 at Step S1503 is kept in a removable disk of HDD 2009 or FDD 2010. The keeping location is designated by a manager of the print server 121 by using KB 2008, the keeping location being stored in RAM 2002.

At Step S1506, the user ID, image ID and keeping location stored in RAM at Steps S1500, S1503 and S1505 are stored in the original image position management table described with reference to FIG. 12. In the keeping location 1203, a path name of the original image file kept at Step S1505 or a volume name and a path name of a removable disk are stored. If the image data having the same image ID is already stored in the original image position management table 715, an error message is displayed on CRT 2006 and Step S1512 is not executed.

Steps S1507 to S1511 are executed if the operation code stored in RAM 2002 at Step S1501 is not "new registration", i.e., if the operation code is either "move", "copy", or "delete".

At Step S1507 the image ID of an already registered original image to be processed is entered from KB 2008 and stored in RAM 2002. In this case, the original image position management table 715 is searched and only those image Ides having the owner ID 1202 coincident with the user ID stored at Step S1500 are displayed on CRT 2006, and one of the image Ides is selected from KB 2008. If the entered image ID is not in the original image position management table 715 or if the owner ID 1202 of the corresponding data in the original image position management table 715 is not coincident with the user ID stored at Step S1500, then an error message is displayed on CRT 2006 to again execute Step S1507.

At Step S1508, the operation code stored at Step S1501 is checked. If the operation code is "move" or "copy", the flow advances to Step S1509, whereas if not, the flow advances to Step S1510.

At Step S1509 the original image position management table 715 is searched by using the image ID stored at Step S1507 to acquire the path name of the original image file corresponding to the image ID, to read the original image file from HDD 2009 or FDD 2010, and to copy it as a new image film in the local transmission box 713. The path name of the copied new image file is stored in RAM 2002.

At Step 51511 the operation code stored at Step S1501 is checked. If the operation code is "move" or "delete", the flow advances to Step S1511, whereas if not, the flow advances to Step S1512.

At Step S1511 the original image position management table 715 is searched by using the image ID stored at Step S1507 to store a flag representative of "possibly deleted" in the additional information 1204. The reason why the data and original image file in the original image position management table are not deleted at this time is that there is a possibility of placing a print order for this image. The data and original image film are actually deleted when the image position management table 412 of the center server 102 is updated and when a deletion request transmission data is transmitted from the center server 102.

Figures 16, 19:
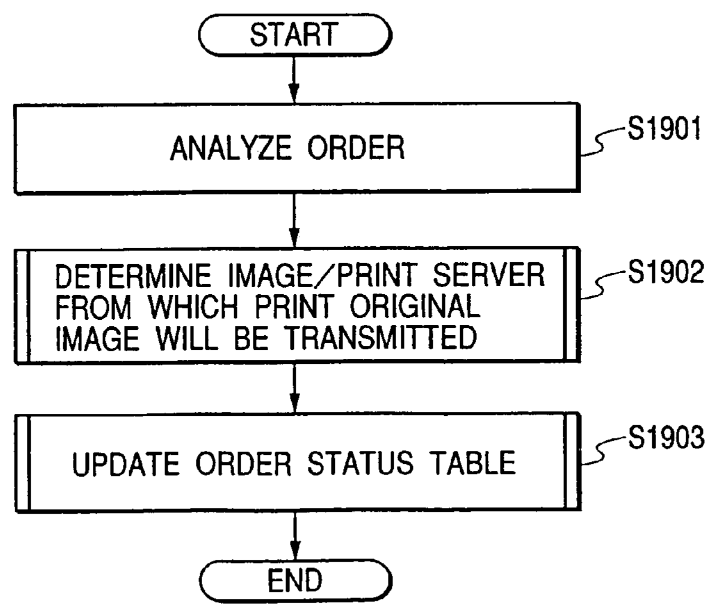
FIG. 16 is a diagram showing an example of image registration information transmission data.
FIG. 19 is a flow chart illustrating an image collection destination determining process to be executed by the center server.

At Step S1512 the image registration information transmission data such as shown in FIG. 16 is generated and stored in RAM 2002, by using the user ID, image ID, path name of the image file stored in the local transmission box 713, respectively stored or generated at each of the above Steps, and a server ID of the print server 121 stored in advance in HDD 2009.

At Step S1513, the number of original images to be processed for the user is checked, and if there is an original image still not processed, the flow returns to Step S1501.

At Step S1514 a transmission data file is generated by combining all image registration information transmission data stored in RAM 2002 at Step S1512, and stored in the local transmission box 713. Transmission control information ("TRANS" tag) such as shown in FIG. 13 is added to the top of the transmission data file.

A message confirming whether Step S1504 is executed or not is displayed on CRT 2006 before Step S1504 is executed. In accordance with an entered operation designation by a user from KB 1008, Step S1504 is not executed. This process is performed for the case wherein when a print original image is moved or copied from another image server 111 or print server 121, the print original image is not transmitted via the center server 102 by using the registration process and each process to be described later, but is stored in a storage medium such as a CD-ROM which is transported. In such a case, since the display/edit image is already registered in the center server 102, Step S1504 is not necessary to be executed.

If the image keeping location is to be moved or copied in the print server 121, only the data in the original image position management table 715 is updated without generating and transmitting the image registration information transmission data.

FIG. 16 shows an example of the image registration information transmission data generated at Step S1507. A tag "<REG>" indicates that the tag is image registration information transmission data. "OPE" indicates the operation code (new registration, delete, move, copy) of the transmission data. Parameters of "ID", "CUST" and "SHOP" indicate an image ID, user ID, and a server ID of the print server 121.

A parameter of "./im012345.jpg" is the path name of an image file stored in the local transmission box 713 at Step S1504. This item is not generated if the operation code is "delete" because it is unnecessary to transmit an image file.

<Image Registration by Image Server>

Next, a process of registering a print original image to be executed by the image server 111 will be described. An original image to be stored in the image server 111 is a commercially available image usable by all users irrespective of whether it is free or not. Such an image is sold or distributed in the form of a removable disk such as a CD-ROM.

The print image register 601 of the image server 111 registers image data, and the local transmission/reception controller 603 transmits the transmission data representative of the registration information to the center server 102. Registration of the transmission data by the transmission/reception controller is performed by storing the transmission data file in the local transmission box 613.

A process to be executed by the print image register 601 is similar to the print image register 704 of the print server 121 described with reference to FIG. 15. Therefore, only different points will be described with reference to the flow chart of FIG. 15 and the transmission data shown in FIG. 16.

The print image register 601 does not perform a different process for each user, and all users can use the print image register 601 when they acquire a display/edit image by using the client computer 101. Therefore, Step S1500 is not executed.

Also for the image ID input at Step S1507, the owner ID 1202 of the original image position management table 612 is not compared with the user ID, and the display range is not made narrow.

Also for the image registration information transmission data generated at Step S1512, the parameter of "CUST" shown in FIG. 16 is not generated.

A process other than those described above is similar to those which the print image register 704 of the print server 121 executes.

<Image Registration at Center Server>

Next, the image registration process to be executed by the center server 102 will be described with reference to FIG. 4. The image registration process by the center server 102 registers image information in the center server 102 in accordance with the image registration information transmission data and display/edit images transmitted by the image registration process by the print server 121 and the image registration process by the image server 111. In the following description, the "tag" or "parameter" in parentheses takes the value in the transmission data shown in FIGS. 13 and 16.

The center transmission/reception controller 407 receives the image registration information transmission data file (e.g., FIG. 16) and display/edit image file transmitted from the image server 111 or print server 121, and stores them in the center reception box 419.

Next, the center transmission/reception controller 407 sequentially analyzes the transmission data file stored in the center reception box 419. If the image registration information transmission data (<REG> tag) is contained therein, the transmission data is extracted from the transmission data file and stored in HDD 1009 as a temporary file. Next, the image register 404 of the center server 102 is read from HDD 1009 or the like and developed onto RAM 1002 to make it usable. The file name of the temporary file of the transmission data stored in HDD 1009 and the sender server ID described in the <TRANS> tag at the top of the transmission data file are therefore passed to the image register 404.

Figure 17:
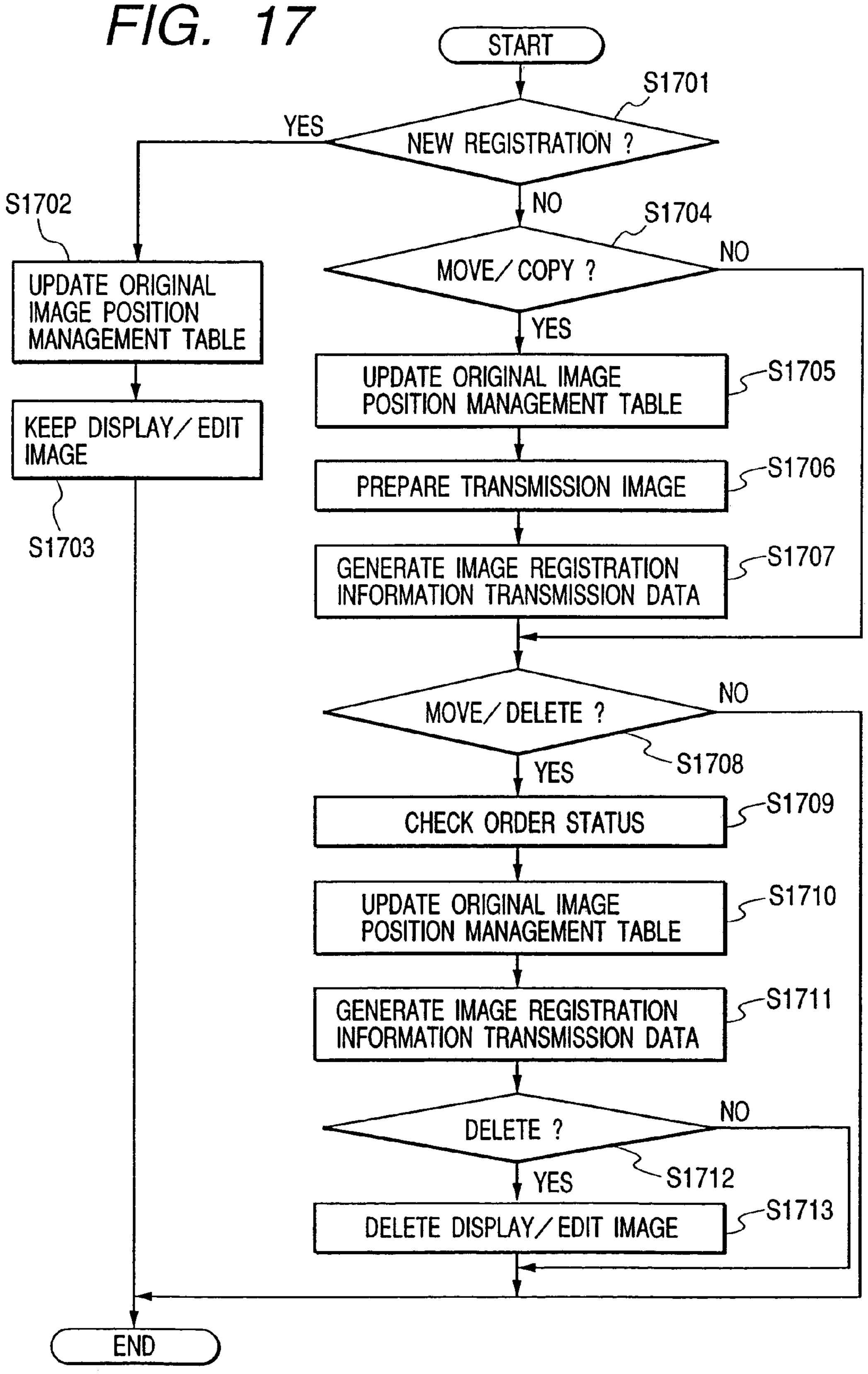
FIG. 17 is a flow chart illustrating an original image registration process to be executed by the print server.

FIG. 17 is a flow chart illustrating the image registration process to be executed by the image register 404 of the center server 102. The image register 404 performs a process such as a process of reading the image registration information transmission data from the image server 111 or print server 121 and reflects the read information upon the original image position management table 412.

The image register 404 opens the transmission file having the temporary file name passed from the center transmission/reception controller 407 at the activation time, analyzes the contents and stores the analyzed results in RAM 1002. Thereafter, the process illustrated in the flow chart of FIG. 17 is executed. The process to be executed by the image register 404 will be described with reference to the flow chart of FIG. 17.

At Step S1701 the operation code (<OPE> parameter) of the image registration information transmission data in RAM 1002 is checked. If the operation code is "new registration ("NEW"), the flow advances to Step S1702, whereas if not, the flow advances to Step S1705. As previously described with the process shown in FIG. 15, the operation codes include "move", "copy" and "delete" in addition to "new registration".

At Step S1702, new data is added to the original image position management table 412, the new data including the image ID (<ID> parameter) described in the image registration information transmission data and the sender server ID passed from the center transmission/reception controller 407 at the activation time. In this case, if the user ID ("CUST" parameter) is contained in the image registration information transmission data, this value is stored in the owner ID 1202 of the original image position management table 412 as addition data.

At Step S1703 the image file tag (<CAMLLINK>) in the image registration information transmission data is analyzed, and the display/edit image file designated by the tag is extracted from the center reception box 419 and moved to the display/edit image storage 411. In this case, if the user ID ("CUST" parameter) is contained in the image registration information transmission data, the display/edit image file is stored in a directory accessible by the document supplier 401 in the unit of each user. If the user ID is not described in the image registration information transmission data, it is stored in a directory which all the users can refer to.

Also at Step S1703, the path name of the display/edit image file stored by the above process and the image ID of the image are added as new data to the edit image position management table 417.

If display image information and edit image information are designated as different image files in the image registration information transmission data, Step S1703 is executed for each of the image files. The display image and edit image are stored in different directories. At Step S1704 the operation code (<OPE> parameter) of the image registration information transmission data in RAM 1002 is checked. If the operation code is "move" ("MOVE") or "copy" ("COPY"), the flow advances to Step S1705, whereas if not, the flow advances to Step S1708.

Steps S1705 to S1707 are executed if the operation code of the image registration information transmission data in RAM 1002 is either "move" or "copy". In this case, the original image position management table 412 is updated and the print original image is transferred to a "move"/"copy" receiver.

At Step S1705 the image ID and "move" or "copy" receiver ID are analyzed and extracted from the image registration information transmission data, and added to the original image position management table 412 as new data. The extracted image ID and "move" or "copy" receiver ID are stored in RAM 1002.

At Step S1706, the image file tag (<CAMLLINK>) in the image registration information transmission data is analyzed, the print original image designated by the tag is extracted from the center reception box 419 and moved to the center transmission box 418, and the file name is stored in RAM 1002.

At Step S1707 an image registration information transmission data file representative of registration of the print image is generated in accordance with the image ID stored at Step S1705 and the file name of the image file stored at Step S1706, and stored in the center transmission box 418. The receiver of this transmission data file is the server identified by the "move" or "copy" receiver server ID stored at Step S1705.

At Step S1708 the operation code (<OPE> parameter) of the image registration information transmission data in RAM 1002 is checked. If the operation code is either "move" ("MOVE") or "delete" ("DEL"), the flow advances to Step S1709, whereas if not, the flow is terminated.

Steps S1709 to S1713 are executed if the operation code of the image registration information transmission data in RAM 1002 is either "move" or "delete". In this case, transmission data notifying a registration process completion at the center server 102 is transmitted to the sender server of the image registration information transmission data. Upon reception of this completion notice transmission data, the sender server can delete the original image in the sender server.

At Step S1709 the order status table to be later described with reference to FIG. 10 is searched by using the image ID in the image registration information transmission data and the sender server ID passed from the center transmission/reception controller 407 at the activation time, to check whether there is any print order which uses the print image, and the check results are stored in RAM 1002. The image ID in the image registration information transmission data is stored in RAM 1002.

At Step S1710, the original image position management table 412 is searched by using the image ID stored in RAM 1002 and the sender server ID passed from the center transmission/reception controller 407 at the activation time. If at Step S1709 the corresponding data exists in the order status table 415 (i.e., if an image file to be possibly deleted is used by a print order still not processed), a "possibly deleted" flag is added to the additional information 1204 of the corresponding data in the original image position management table 412. If at Step S1709 the corresponding data does not exist in the order status table 415 (i.e., if an image file to be possibly deleted is not used by an already taken print order), the corresponding data in the original image position management table 412 is deleted.

If the data is deleted from the original image position management table 412 at Step S1710, then at Step S1711 an image registration information transmission data file for notifying a deletion permission to the sender server of the image registration information transmission data is generated in accordance with the image ID stored at Step S1709 and the sender server ID passed from the center transmission/reception controller 407 at the activation time, and stored in the center transmission box 418. The image registration information transmission data generated is the data indicated at 1314 of FIG. 13 or the data shown in FIG. 16. This data is generated in accordance with the image ID stored at Step S1709 and "delete" is set to the operation code ("OPE" parameter). The sender server ID passed from the center transmission/reception controller 407 at the activation time is set to the sender in the transmission/reception header data 1311 of the image registration information transmission data file. If a flag is set at Step S1710 to the additional information 1204 of the original image position management table, any operation is not performed at Step S1711.

At Step S1712 the operation code (<OPE> parameter) of the image registration information transmission data in RAM 1002 is checked whether the operation code is "delete". If the operation code is not "delete", the process is terminated. If the operation code is "delete", the original image position management table 412 is searched to check whether there is the data which satisfies the conditions that the image ID 1201 in the original image position management table 412 is the same as the image ID stored at Step S1709, that the value stored in the keeping location is the server ID, and that the server ID is different from the sender server ID passed from the center transmission/reception controller 407 at the activation time. If there is the data satisfying the above conditions, the process is terminated, whereas if there is no data, the flow advances to Step S1713.

At Step S1713 the edit image position management table 417 is searched in accordance with the image ID in the image registration information transmission data and the sender server ID passed from the center transmission/reception controller 407 at the activation time, to thereby delete the corresponding data. In accordance with the path name of the display/edit image file stored in the keeping location 1203 of the corresponding data, the display/edit image file corresponding to the image ID is deleted from the display/edit image storage 411.

<Order Placing Process>

Figure 18:
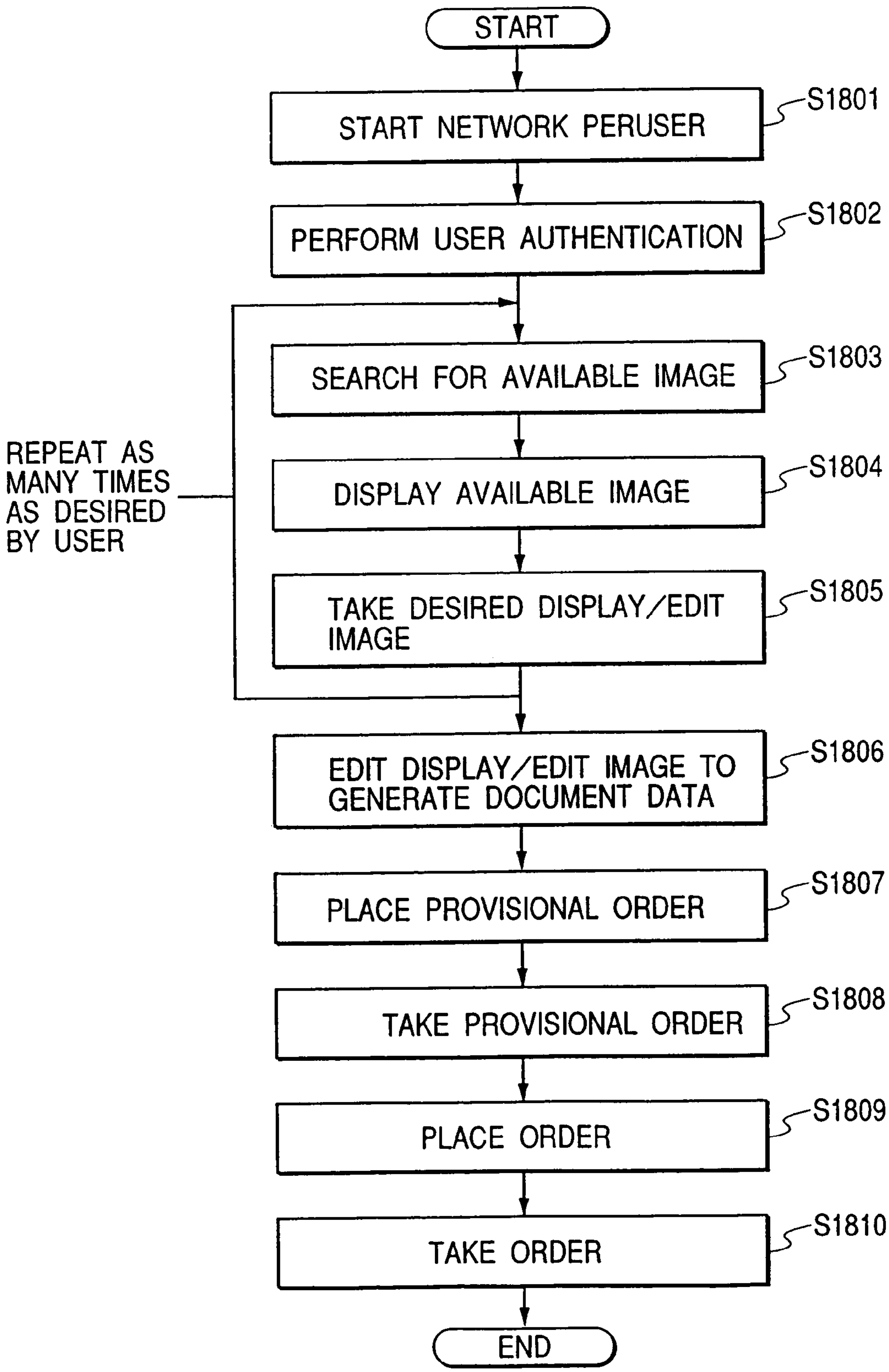
FIG. 18 is a flow chart illustrating a print order placing/taking process to be executed by the print server.

FIG. 18 is a flow chart illustrating a process of placing a print order from the client computer 101 and a process of taking the order at the center server 102. The network browser 502 of the client computer 101 and the document supplier 401 of the center server 102 communicate with each other by using HTTP (Hyper Text Transfer Protocol) or FTP (File Transfer Protocol) which are a transmission protocol commonly used by the Internet, and the data processor 501 and expander 503 exchange data by using an inter-process communications function.

At Step S1801, a user reads the network browser 501 from HDD 1009 or the like by using the function of the data processor 501 and developing it onto RAM 1002 to make it usable and connect the center server 102. The network browser 502 reads the expander 503 from HDD 1009 or the like and develops it onto RAM 102 to make it usable.

At Step S1802 the user is urged to enter the user ID and a password by using the function of the document supplier 401 to authenticate the user. If the user cannot be authenticated, an error process is executed without executing the following Steps.

At Step S1803 the document supplier 401 reads the edit image supplier 402 from HDD 1009 or the like and develops it onto RAM 1002 to make it usable. The edit image supplier 402 searches usable images from the edit image position management table 417 and passes the image ID of each searched image and URL's (names which can be referred to from the network browser 502 and expander 503) to the expander 503. The usable images to be processed include an image possessed by the user and registered by the print server 121 and an image usable by all users registered by the image server 111. Since there are a plurality of images to be processed, the user may enter a display condition from KB 2008, which condition is sent by the expander 503 to the edit image supplier 402 to reduce the number of image IDes and URL's to be sent from the edit image supplier 402 to the expander 503.

At Step S1804, the expander 503 requests the document supplier 401 to supply images, by using URL's acquired by the edit image supplier 402 at Step S1803. The document supplier 401 extracts the designated display/edit image file from the display/edit image storage 411 and sends it to the expander 503. The expander 503 operates to display the image file on CRT 1006 via the network browser 502.

At Step S1805, the user selects a desired image from images such as thumbnail images displayed on CRT 1006 at Step S1804. The user enters the image ID of the selected image from KB 1008 so that the expander 503 sends the designated image ID and the display/edit image file corresponding to the selected image to the data processor 501. A desired image may be selected by clicking a thumbnail image with an unrepresented pointing device such as a mouse. The data processor 501 stores the display/edit image file in HDD 1009 as a temporary file and generates a correspondence table between the image ID and the stored image file name and stores it in RAM 2002. If the display/edit image file is of the format which can write additional information and if the image ID is written in the image file by the image server 111 or print server 121, the correspondence table is unnecessary.

Steps S1803 to S1805 are repeated as many times as desired by the user.

At Step S1806, document data of a print image is generated by using the edit image and the like acquired at Step S1805 and by supplying the data processor 501 with necessary information from KB 1008. The document data is the document 1401 shown in FIG. 14, and the edit images acquired at Step S1805 are displayed on CRT 1006 as the image data 1403 and 1404. The data processor 501 generates script data 1402 shown in FIG. 14 and describing the edit contents of the document data. The data processor 501 searches the correspondence table between the edit image and image ID stored at Step S1805 or reads the image ID written in the edit image film, and stores the image ID of the image data used in the document 1401 in the script 1402. The edited document 1401 is stored in HDD 1009 as a temporary file or in RAM 1002. The user repeats Step S1806 as many times as desired to generate the document data.

At Steps S1807 and S1808, a provisional order placing and taking process is executed. With a provisional order placing process, the sub-orders 802 and order items 803 constituting a print order are transmitted from the client computer 101 to the center server 102 which stores them.

At Step S1807, by using KB 1008 the user selects one or more sets of document data to be printed, and adds additional information such as the number of copies to thereby place an order to the data processor 501. Next, the data processor 501 reads the script corresponding to the designated document data from HDD 1009 or RAM 1002 and sends it to the expander 503. Next, the expander 503 instructs the document supplier 401 of the center server 102 to activate the order taker 403. Next, the document supplier 401 received the activation instruction reads the order taker 403 from HDD 1009 or the like and develops it onto RAM 1002 to make it usable, and thereafter passes the script received from the expander 503 to the order taker 403.

At Step S1808 the order taker 403 analyzes the script received from the document supplier 401 at Step S1807, extracts information constituting the sub-orders 802 described with FIG. 8 such as edit information and image IDes, and stores the extracted information in the order management table 416. In this case, the order ID 902 is issued in accordance with the user ID and stores it in RAM 1002. The order taker 403 checks whether each image ID extracted at Step S1808 exists in the original image position management table 412 and whether the additional information 1204 has the flag "possibly deleted" not set. If the image ID does not exist in the original image position management table 412 or the flag "possibly deleted" is set, an error message is transmitted to the expander 503 which operates to display the contents of the error message on CRT 1006 to notify the user of the error contents.

At Steps S1809 and S1810, the provisional order placed at Steps S1807 and S1808 is provided with necessary information to make it an actual order.

At Step S1809 the order taker 403 searches the server management table 413 to read the server ID of the print server and transmits it together with the order ID issued and stored at Step S1808 to the expander 503. The expander 503 operates to display a list of server Ides on CRT 1006, and the user selects a desired print server as the print output site and supplies the expander 503 with the server ID of the selected print server, by using KB 1008. Next, the expander 503 transmits the supplied server ID to the order taker 403.

At Step S1810 the order taker 403 executes a charge process such as calculating a charge necessary for print output, and stores the received server ID, the number of copies and the like in the order management table 416 to complete the print order.

With the above process, the print order is placed and taken.

If the data processor 501 and expander 503 are not used, the document supplier 401 of the center server 102 operates to directly display the display image and its image ID on the network browser 502, and the user directly supplies the network browser 502 with print order data such as the image ID and the server ID of the output print server 121 by using KB 1008. The network browser 502 transmits the supplied print order data to the order taker 403 of the center server 102.

<Image Collection Server Determining Process>

After a print order is taken by the print order placing and taking process, the center server 102 selects a server having the smallest transmission cost among the servers which keep the print original image identified by the image ID contained in the print order, the transmission cost being required to transmit the print image to the output print server 121 via the center server 102.

This process is executed by the image collector 405. When the order placing and taking process is completed, the order taker 403 reads the image collector 405 from HDD 1009 or the like and develops it onto RAM 1002 to make it usable. At this time, the order ID of the print order taken by the order taker 403 during the order placing and taking process is passed to the image collector 405.

FIG. 19 is a flow chart illustrating the image collection server determining process to be executed by the image collector 405.

At Step S1901 by using the order ID passed from the order taker 403, the image collector 405 searches the order management table 406 to read the print order data, to store it in RAM 1002, and to add it to the order status table 415. Of the data added to the order status table 415, each data having the value in the image ID is set with "before image collection" in the status 204. Of the data added to the order status table 415, each data having no value in the image ID is set with "image being collected" in the status 204.

At Step S1902, the data stored in the order status table at Step S1901 is sequentially read and the keeping location of a print original image is searched to determine from which image server 111 or print server 121 the original image is transmitted. The details of this process will be later given with reference to the flow chart of FIGS. 20A and 20B.

At Step S1903, the data processed at Step S1901 is checked again. If it is not necessary to collect an image, the order progress manager 406 is activated to transmit the order to the print server 121. The details of this process will be given later with reference to the flow chart of FIG. 21.

With the above process, an original image transmission request is transmitted to the image server 111 or print server 121 which stores the image ID contained in the print order, and the order status data is set.

Figure 20:
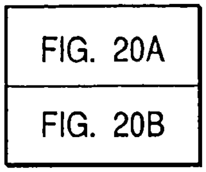
FIG. 20 which is comprised of FIGS. 20A and 20B are flow charts illustrating a process of determining a collection destination for print original image in the image collection destination determining process.
Figure 20A:
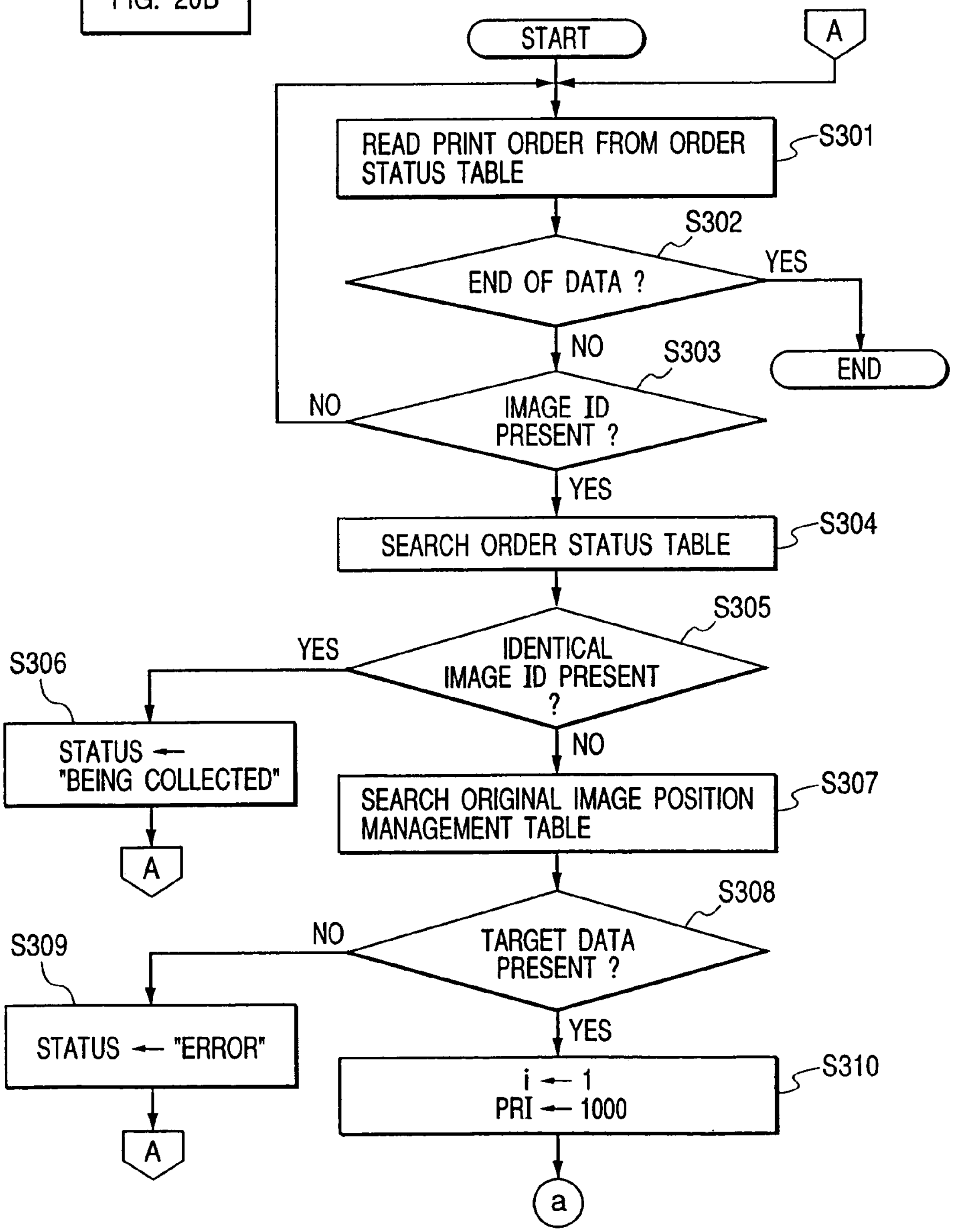
Figure 20B:
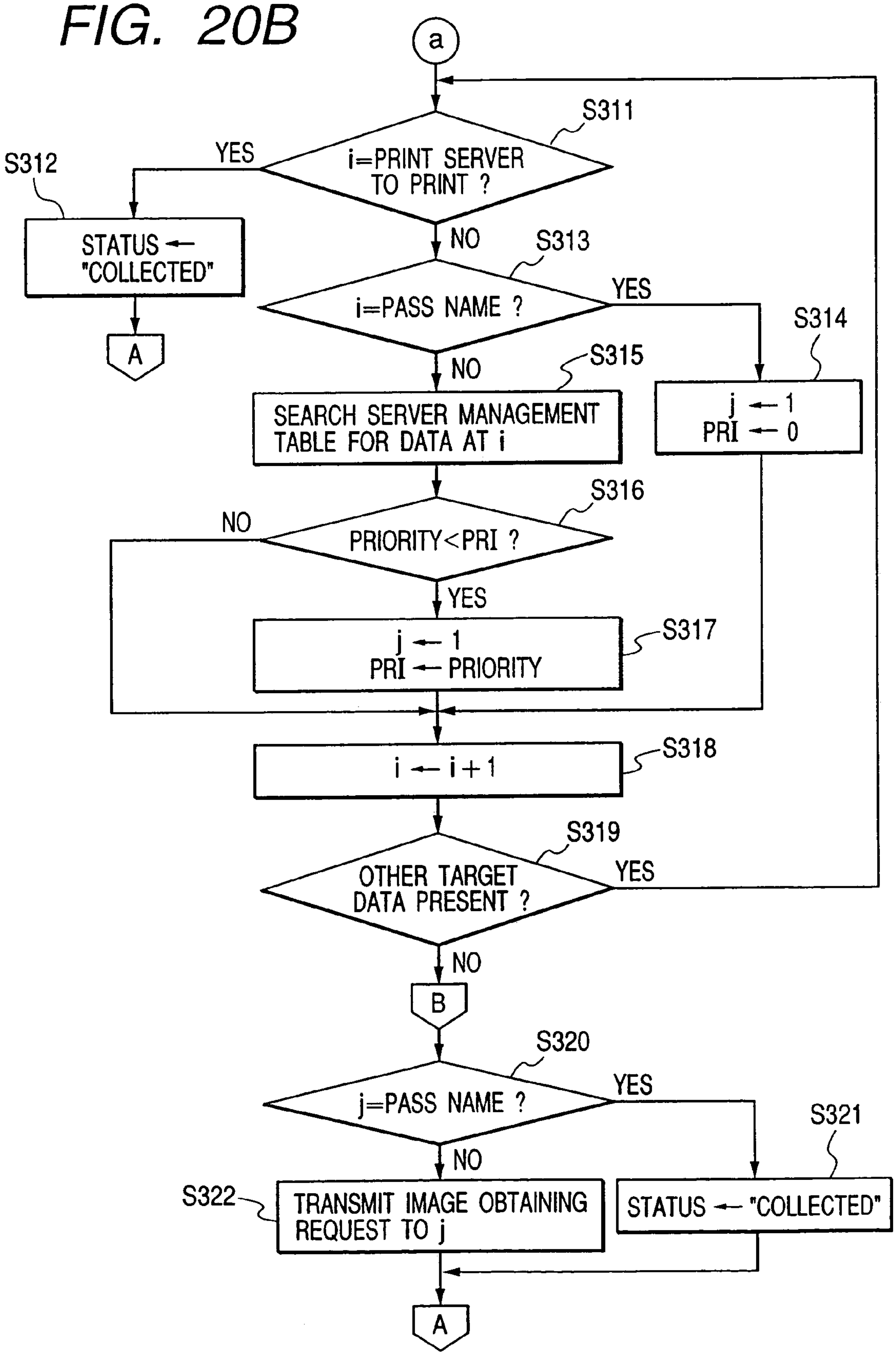

FIGS. 20A and 20B are flow charts illustrating the collection server determining process to be executed at Step S1902 for determining an image collection server.

At Step S301 the image collector 405 reads one set of print order data stored at Step S1901 shown in FIG. 19 and stores it in RAM 1002.

At Step S302 the image collector checks whether all sets of the print order data stored at Step S1901 shown in FIG. 19 have been read. If all sets of the print order data have been read and there is no corresponding data, the process is terminated.

At Step S303, the image collector 405 checks the value of the image ID 203 in the order status table stored at Step S301. If the value is stored, the flow advances to Step S304, whereat if not, the flow returns to Step S301.

At Step S304 the order status table 415 is searched to check whether the data having the value of the image ID 203 of other data in the order status table 415, the value being the same as the value of the image ID stored at Step S301, and also having the status 204 of "image being collected", exists in the order status table 415.

At Step S305 the check results at Step S304 are judged. If the data matching the search conditions at Step S304 exists in the order status table 415, the flow advances to Step S306, whereas if not, the flow advances to Step S307.

At Step S306, since the image ID is in a state of "image being collected" for another print order, the status 204 in the order status data stored at Step S301 is set with "image being collected" to thereafter return to Step S301.

At Step S307, by using the image ID in the order status data stored at Step S301, the image collector 405 searches the original image position management table 412 to extract one or more sets of data having the image ID and store them in RAM 1002.

At Step S308, the image collector 405 checks the search results at Step S307. If there is one or more sets of the corresponding data in the original image position management table 412, the flow advances to Step S310, whereas if not, the flow advances to Step S309.

At Step S309, since there is no original image corresponding to the image ID, the status 204 of the order status data stored at Step S301 is set with "error" and this data is written in the order status table 415 to thereafter return to Step S301.

At Step S310 a preparation for the following Steps is made for each of one or more sets of the data in the original image position management table stored at Step S307. The value i is an index value of the original image position management table data stored at Step S307. At Step S310, "1" is set to the value i. In the following description, the value of the i-th original image position management table data item is called a "keeping location (i)". A value PRI stores the value of the minimum image acquisition priority order (i) in the server management table 413. At Step S310, "1000" larger than the maximum value of the image acquisition priority order 1102 is set to the value PRI. The values i and PRI are stored in RAM 1002.

At Step S311 the image collector compares the value of the keeping location (i) of the original image position management table data with the value of the output print server ID for the print order stored in RAM 1002. If both the values are coincident, the original image exists at the output print server so that the original image is not necessary to be transmitted. This original image is used for printing at the print server, and the flow advances to Step S312.

At Step S312, since the original image is not necessary to be collected, the status 204 of the stored order status data is set with "image collected" to complete the order status data processing and return to Step S301.

At Step S313 it is checked whether the value of the keeping location (i) of the original image position management table data has the path name format. If it has the path name format, the flow advances to Step S314.

Step S314 is executed if it is judged at Step S313 that the value of the keeping location (i) has the path name format. This means that the original image is already stored in the temporary image storage 414 of the center server 102. It is therefore unnecessary to transmit the original image and collect it. Therefore, the value i is stored in RAM 1002 as a value j, and the minimum value 0 is set to PRI. Thereafter, the flow advances to Step S318.

At Step S315 the image collector 405 searches the data having the server ID 1101 same as the keeping location (i) from the server management table 413, and stores the image acquisition priority order 1102 of the data in RAM 1002.

Next, at Step S316 the image acquisition priority order and PRI stored at Step S310 are compared with each other. If the value of the image acquisition priority order is smaller, the server designated by the data is used as an image acquisition candidate to execute Step S317.

At Step S317 the image collector 405 stores the index value i in RAM 1002 and sets the value of the image acquisition priority order of the data to PRI, to thereby use the server designated by the data searched at Step S315 as the image acquisition candidate.

At Step S318, the index value i is incremented by "1" to prepare for the next data of the original image position management table stored in RAM 1002 to thereafter return to Step S311. If all sets of the original image position management table data have been processed, the flow advances to Step S320.

At Steps S320 to S322, the original image position management table data (j) designated by the index (j) is used as the image collection server, the index (j) of the original image position management table data stored in RAM 1002 having as the keeping location 1203 the server ID of the server having the smallest image acquisition priority order during the process from Step S311 to Step S319.

At Step S320 it is checked whether the keeping location (j) has the path name format. If it has the path name format, the flow advances to Step S321, whereas it not, the flow advances to Step S322.

At Step S321, since the print original image designated by the original image position management table data (j) already exists in the temporary image storage 414 of the center server 102, the status 204 of the order status data stored in RAM 1002 is set with "image collected" to thereafter return to Step S301.

At Step S322, by using the image ID and keeping location (j) stored in RAM 1002, a transmission data file is generated and stored in the center transmission box 418. The transmission data file is constituted of the original image transmission request transmission data such as that shown by the <FTPREQ> tag in FIG. 13 and the common data at the top such as that shown by the <TRANS> tag in FIG. 13. Thereafter the flow returns to Step S301.

<Order Status Table Updating Process>

Figure 21:
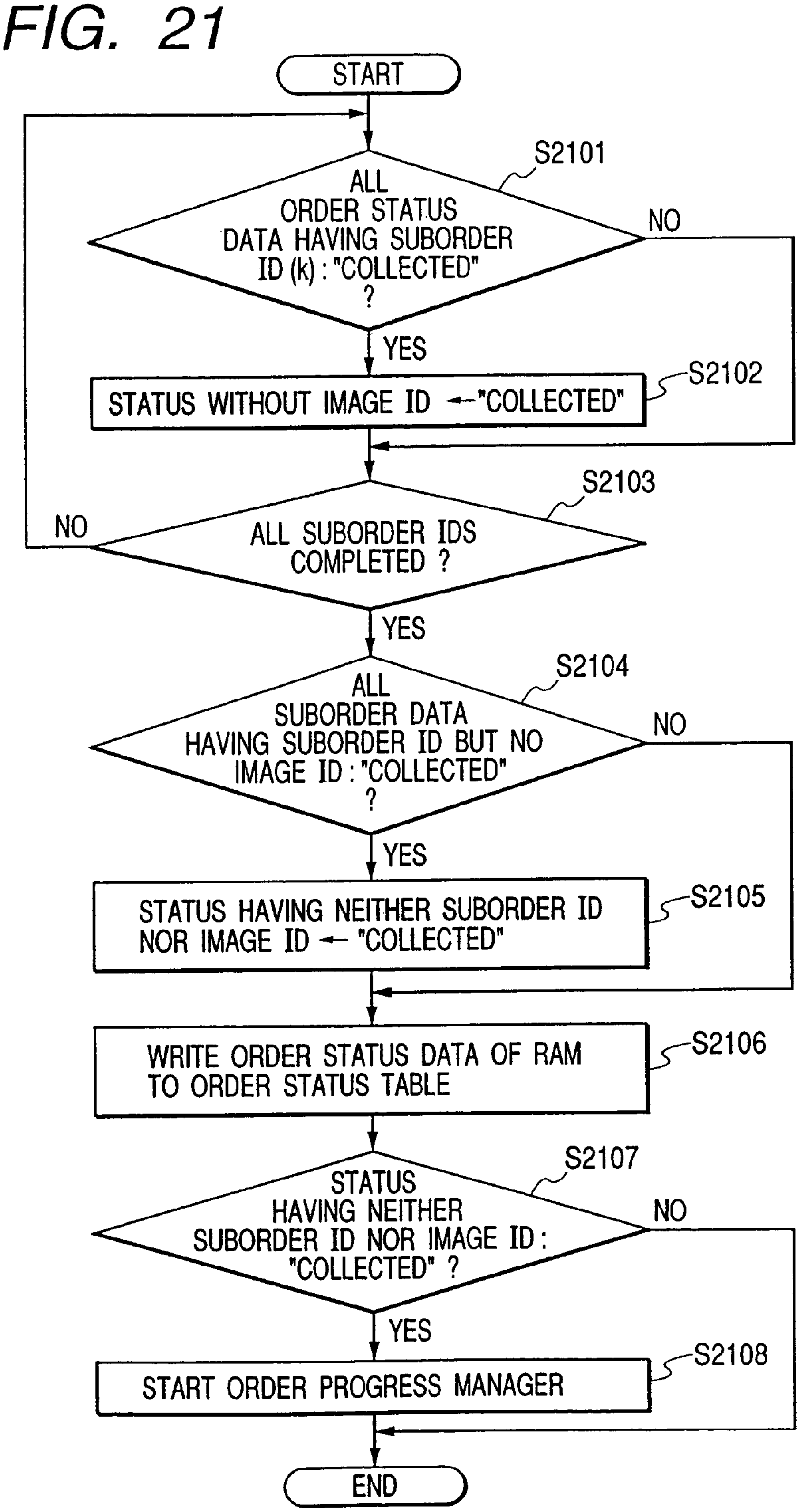
FIG. 21 is a flow chart illustrating an order status table updating process in the image collection destination determining process.

FIG. 21 is a flow chart illustrating the order status table updating process to be executed at Step S1903 for determining the image collection server.

Steps S2101 and S2102 are executed in the unit of sub-order of the order status data stored in RAM 1002. In the following description, the sub-order ID of a sub-order to be processed is represented by "sub-order ID (k)".

At Step S2101 the image collector 405 checks the status of the data having the same sub-order ID as the sub-order ID (k), among the order status data. If the status is all "image collected", the flow advances to Step S2102, whereas if not, the flow advances to Step S2103.

At Step S2102 the image collector 405 sets "image collected" to the status 204 of the data having the same sub-order ID as the sub-order ID (k) and no value of the image ID, among the order status data.

At Step S2103 the image collector 405 increments the index k by "1" to process the next sub-order ID. If all the sub-order Ides have been processed, the flow advances to Step S2104, whereas if there is the next sub-order ID (k+1), the flow returns to Step S2101.

At Step S2104 the image collector 405 checks all sets of the data having a value in the sub-order ID 202 and no value in the image ID 203, among the order status data, to check whether the status 204 of all sets of the data is “image collected”. If the status is all “image collected”, the flow advances to Step S2105, whereas if not, the flow advances to Step S2106.

At Step S2105 the image collector 405 sets “image collected” to the status 204 of the data having no value of the sub-order ID 202 and image ID 203, among the order status data.

At Step S2106 the order status data stored in RAM 1002 is written in the order status table 415.

At Step S2107 the image collector 405 checks the data having no value of the sub-order ID 202 and image ID 203, among the order status data. If the status 204 of the data is set with “image collected”, the flow advances to Step S2108, whereas if there is the data whose the status 204 is set with a value different from “image collected”, the process is terminated.

At Step S2108 the image collector 405 reads the order progress manager 406 from HDD 1009 or the like and develops it onto RAM 1002 to make it usable and pass the order ID of the order status data to the order progress manager 406.

<Original Image Transmission Process>

The image server 111 or print server 121 selected as the original image collection server by the image collection server determining process and received the original image transmission request transmission data transmits the print original image identified by the image ID designated by the original image transmission request transmission data to the center server 102. This process is executed by the print image transmitter 602 of the image server 111 or by the print image transmitter 705 of the print server 121. The functions of the print image transmitters 602 and 705 are the same. In the following, therefore, only the process to be executed by the print image transmitter 602 of the image server 111 will be described.

Figures 22, 23:
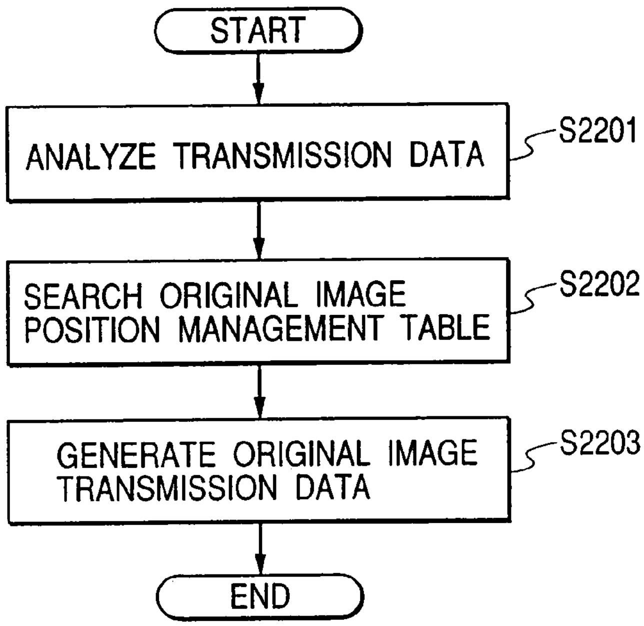
FIG. 22 is a flow chart illustrating an original image transmission process to be executed by the image server or print server.
FIG. 23 is a diagram showing an example of the contents of an original image transmission data file.

FIG. 22 is a flow chart illustrating a process to be executed by the print image transmitter 602. When the local transmission/reception controller 603 receives an image transmission request transmission data file, the local transmission/reception controller 603 reads the print image transmitter 602 from HDD 1009 or the like and develops it onto RAM 1002 to make it usable. In this case, the print image transmitter 602 receives the file name of the image transmission request transmission data file received by the local transmission/reception controller 603 from the local transmission/reception controller 603 via RAM 1002.

At Step S2201, by using the file name of the image transmission request transmission data file received via RAM 102 when the print image transmitter 602 is activated, the image transmission request transmission data file is read and the image ID in the image transmission request transmission data is extracted from the read file and stored in RAM 1002.

At Step S2202, the original image position management table 612 is searched to read the data having the same image ID 1201 as the image ID stored at Step S2201 and store it in RAM 1002.

At Step S2203 a print original image file designated by the path name in the keeping location 1203 of the original image position management table data stored at Step S2202 is copied to the local transmission box 613. The original image transmission data file such as that shown in FIG. 23 is generated by using the file name of the copied file and the image ID stored at Step S2201, and stored in the local transmission box 613.

FIG. 23 shows an example of the contents of the original image transmission data file generated during the original image transmitting process by the print image transmitter 602. The original image transmission data is discriminated by a <FTP> tag shown in FIG. 23.

<Image Receiving Process>

The original image transmission data generated during the original image transmitting process by the print image transmitter 602 of the image server 111 or by the print image transmitter 705 of the print server 121 is transmitted to the center server 102 via the local transmission/reception controller 603 or 703, and received by the center transmission/reception controller 407 of the center server 102. This communications may be performed either through dial-up or on-line using a dedicated cable.

Upon reception of the original image transmission data, the center transmission/reception controller 407 stores the data in the center reception box 419 as an original image transmission data file, thereafter reads the image collector 405 from HDD 1009 or the like and develops it onto RAM 1002 to make it usable and pass the file name of the original image transmission data file in the center reception box 419 to the image collector 405. The image collector 405 analyzes the original image transmission data file to keep the received image file and update the order status table.

Figure 24:
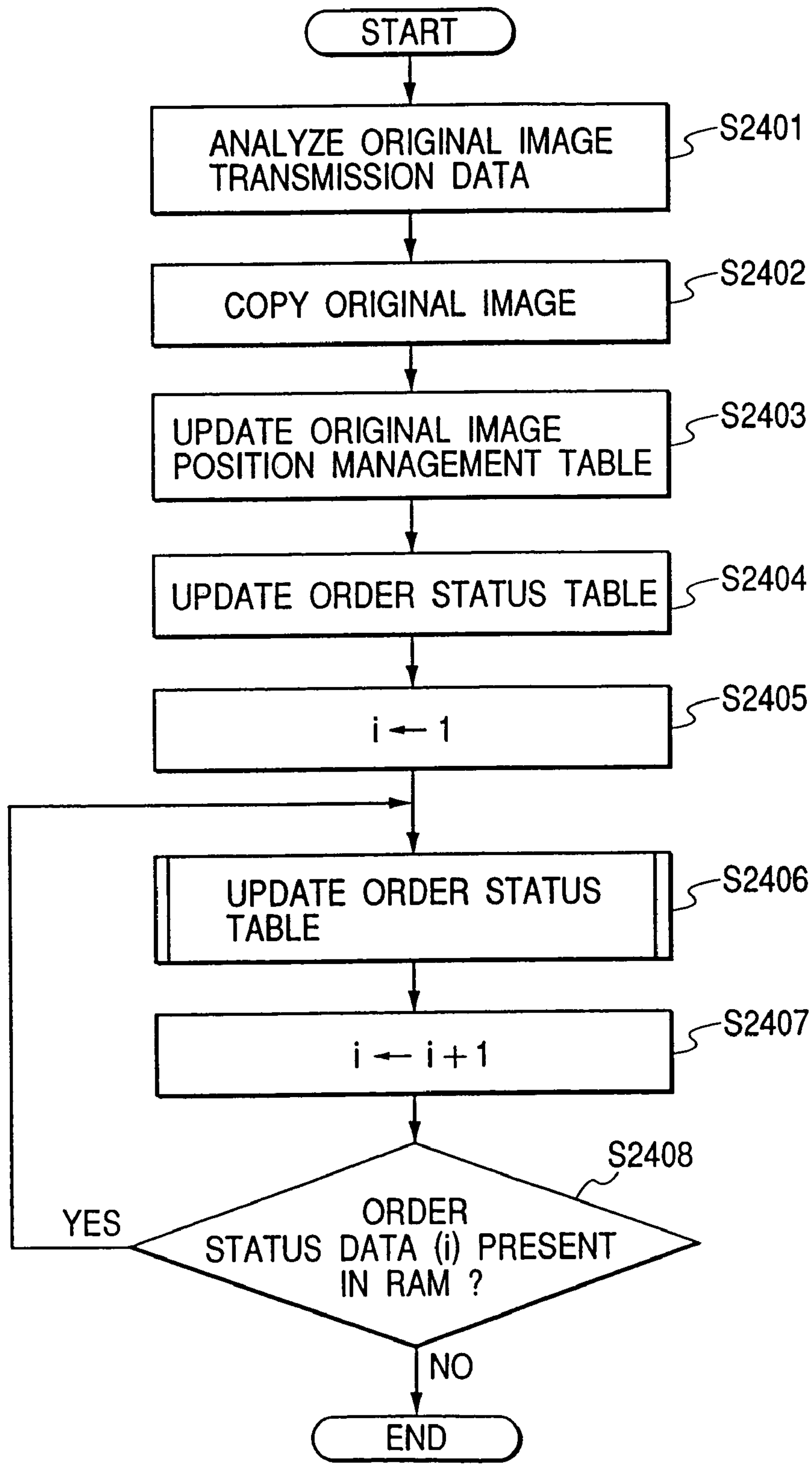
FIG. 24 is a flow chart illustrating an image reception process to be executed by the center server.

FIG. 24 is a flow chart illustrating the above-described process to be executed by the image collector 405. This process will be described with reference to the flow chart of FIG. 24.

At Step S2401, by using the original image data file passed from the center transmission/reception controller 407 at the activation time, the image collector 405 writes the contents of the file in RAM 1002 and analyzes the contents to store the image ID and the file name of the original image file contained in the data file into RAM 1002.

At Step S2402 by using the file name of the original image file stored at Step S2401, the image collector 405 copies the file to the temporary image storage 414 and stores the path name of the copied file in RAM 1002.

At Step S2403 the image collector 405 generates original image position management table data by using the image ID stored at Step S2401 and the path name of the file stored at Step S2402, and adds the generated table data to the original image management table 412.

At Step S2404 the image collector 405 searches the order status table 415 to extract all sets of the data having the same image ID 203 as the image ID stored at Step S2401, and stores the extracted data in RAM 1002. Next, the status 204 of the extracted data is set with “image collected” and the order status table 415 is updated.

Steps S2405 to S2408 are executed for each set of the order status data stored in RAM 1002 at Step S2404. In the following description, the data to be processed is represented by the order status data (i) where (i) is the index.

At Step S2405 the index (i) is initialized to “1” in order to sequentially process the order status data.

At Step S2406 the image collector 405 checks whether the status 204 of all sets of the order status data (i) is set with “image collected”. If the status is all set with “image collected”, the order progress manager 406 is activated to transmit an order to the print server 121. The details of Step S2406 are the same as the order status table updating process while the image collector 405 executes the original image collection server determining process described with reference to FIG. 21.

At Step S2407 the index i is incremented by “1” to prepare for the process of the next order status data.

At Step S2408 the image collector 405 checks whether the order status data (i) is in RAM 1002. If exists, the flow returns to Step S2406, whereas if not, the process is terminated.

<Print Order Transmitting Process>

When the print original images necessary for the print order processed by the image collecting process or image receiving process executed by the image collector 405 of the center server 102 are all prepared, the image collector 405 reads the order progress manager 406 from HDD 1009 or the like and develops it onto RAM 1002 to make it usable and pass the order ID of the print order to the order progress manager 406 via RAM 1002.

Upon reception of the order ID at the activation time, the order progress manager 406 generates order transmission data by using the order ID, stores it in the center transmission box 418, and transmits it to the print server 121.

Figure 25:
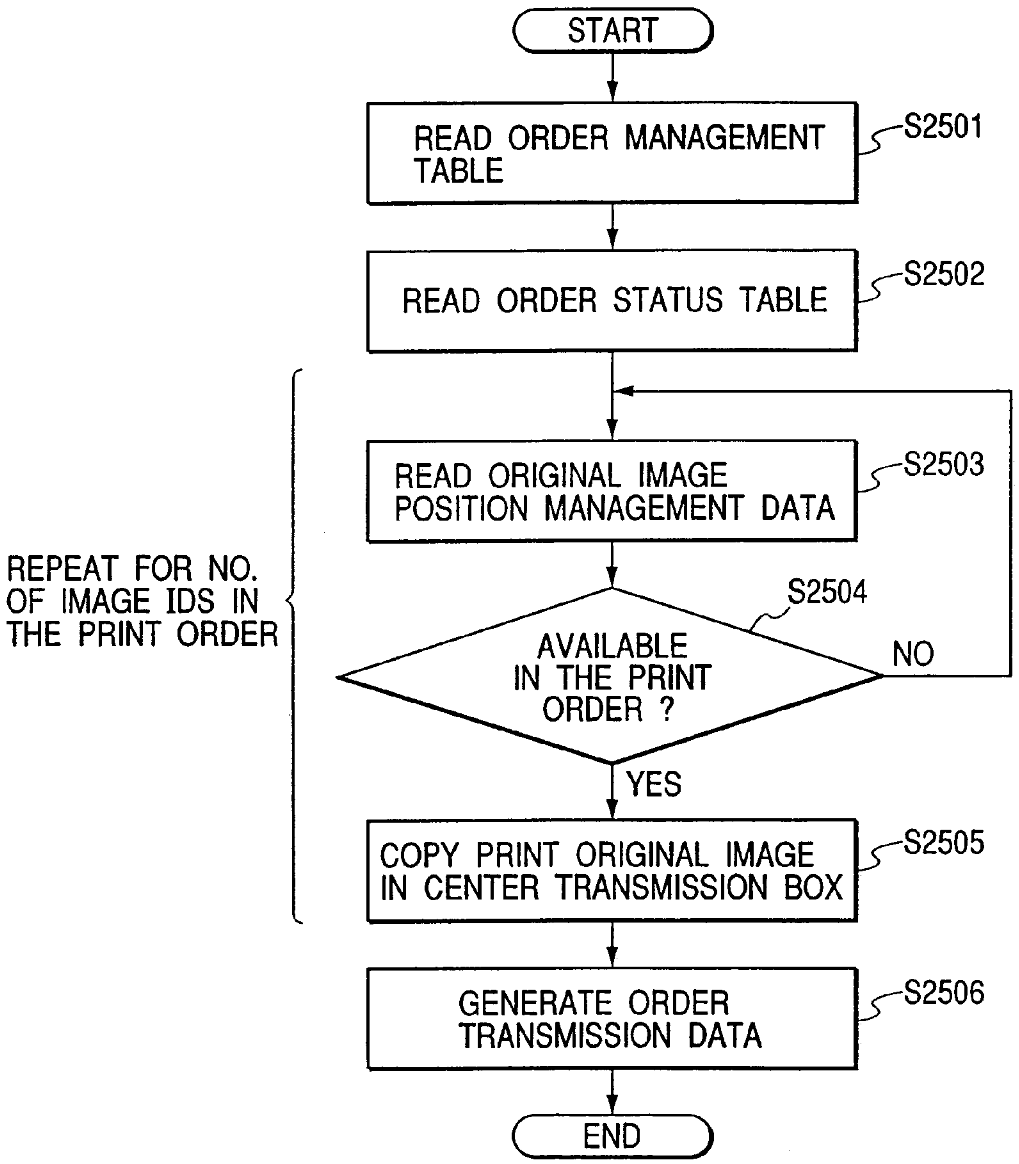
FIG. 25 is a flow chart illustrating a print order transmission process to be executed by the center server.

FIG. 25 is a flow chart illustrating the print order transmitting process to be executed by the order progress manager 406.

At Step S2501 the order progress manager 406 searches the order management table 416 by using the order ID received at the activation time to read the print order data 801 and lower level data 802, 803 and 804 designated by the order ID and store them in RAM 1002.

At Step S2502 the order progress manager 406 searches the order status table 415 by using the order ID received at the activation time to read all sets of the order status data having the same order ID 201 as the order ID and store them in RAM 1002.

Steps S2503 to S2505 are repeated for each set of the order status data having a value in the image ID 203, among the order status data stored at Step S2502. In the following description of Steps S2503 to S2505, the data value of the order status data to be processed is represented by "image ID (i)".

At Step S2503 the order progress manager 406 searches the original image position management table 412 by using the image ID (i) to read one set of the original image position management table data having the same image ID 1201 as the image ID (i) and store it in RAM 1002.

At Step S2504 the order progress manager 406 checks the keeping location 1203 of the original image position management table data stored at Step S2503, to check whether the keeping location is the path name in the temporary image storage 414 or whether the keeping location is coincident with the server ID of the output print server in the print order data stored at Step S2501. If this condition is satisfied, the flow advances to Step S2505, whereas if not, the flow returns to Step S2503 whereat one set of the next original image position management table data having the same image ID 1201 as the image ID (i) is read from the original image position management table 412.

At Step S2505, in accordance with the path name of the print original image file stored at the keeping location 1203 of the original image position management table data stored at Step S2503, the print original image file is copied to the center transmission box 418 and the copied file name together with the image ID (i) is stored in RAM 1002.

At Step S2506 the order progress manager 406 generates order transmission data such as shown in FIG. 13 by using the print order data stored at Step S2501 and a plurality of image Ides and file names stored at Step S2505, adds the transmission/reception transmission header 1311 to the order transmission data to generate the order transmission data file which is stored in the center transmission box 418. In this case, each tag and parameter of the order transmission data are edited by using the print order data stored at Step S2501.

If there is the image ID 805 in the print order data and the image ID exists in the plurality of image Ides and file names stored at Step S2505, the file name of the print original image file copied to the center transmission box 418 at Step S2505 and corresponding to the image ID is edited as the <CAMLLINK> tag as indicated at 1322 in FIG. 13, in order to designate the relation to the print original image file copied to the center transmission box 418 at Step S2505.

If the script 1402 exists in the print order data as the edit data 804, the editing process is performed by converting this edit data into the format of the internal code 1321.

The actual order transmission data file is added with information such as a user name and address by searching the user information stored in HDD 1009 of the center server 102 by using the additional information of user ID in the print order, in order to identify the user who placed the print order on the reception side of the print server 121. However, this is not relevant to the invention and omitted.

<Print Order Receiving Process>

The order transmission data generated during the print order transmitting process by the order progress manager 408 of the center server 102 is transmitted to the print server 121 via the center transmission/reception controller 407 and received by the local transmission/reception controller 703 of the print server 121.

Upon reception of the order transmission data, the local transmission/reception controller 703 of the print server 121 stores the order transmission data in the local reception box 714 as an order transmission data file, and also stores the print original image file group received at the same time in the local reception box 714. Next, the order output manager 7-1 is read from HDD 2009 or the like and developed onto RAM 2002 to make it usable and pass the file name of the order transmission data file in the local reception box 714 to the order output manager 701. The order output manager 701 analyzes the order transmission data file and stores the received print order data in the order management table 711.

Figure 26:
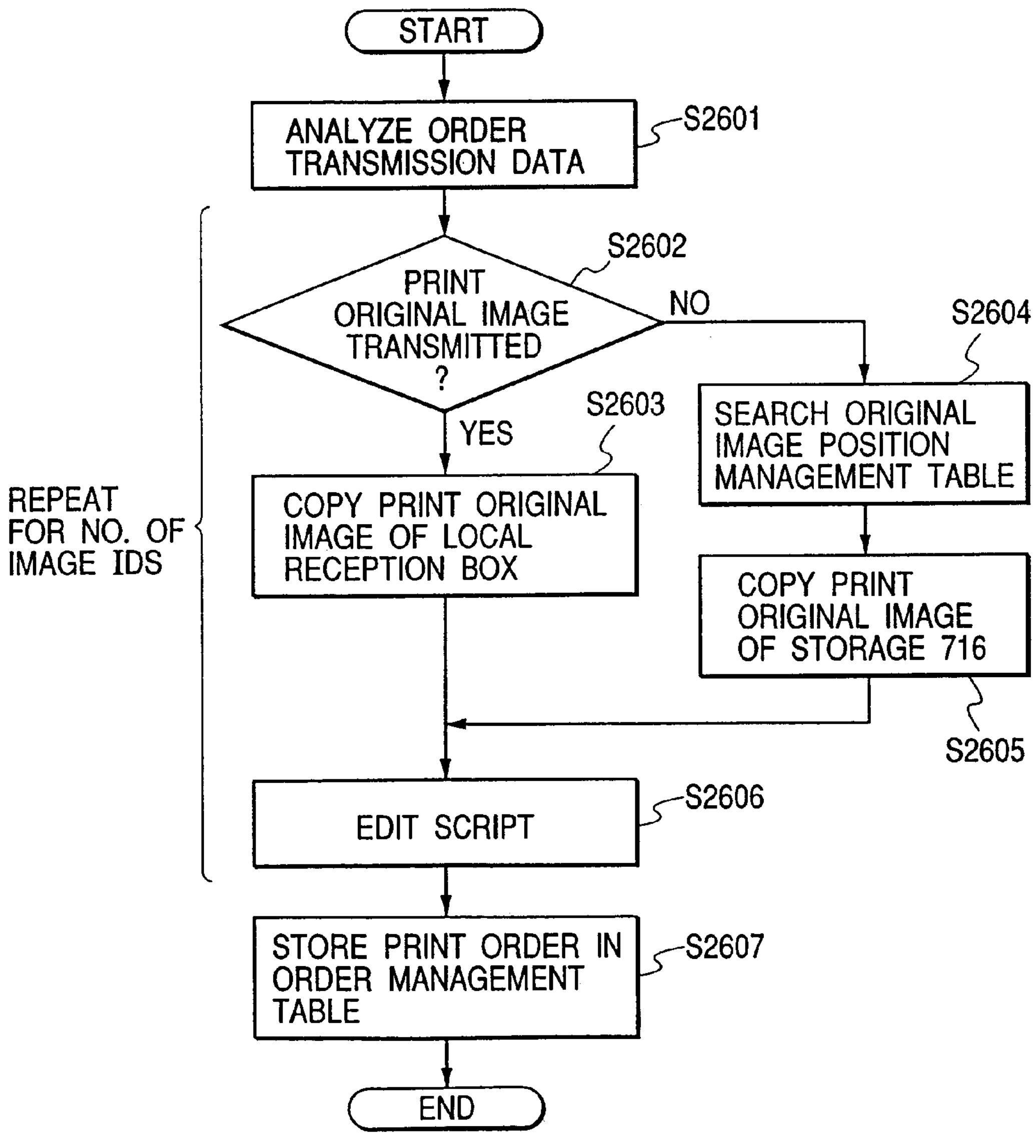
FIG. 26 is a flow chart illustrating a print order reception process to be executed by the print server.

FIG. 26 is a flow chart illustrating the print order receiving process to be executed by the order output manager 701.

At Step S2601 by using the file name of the order transmission data file passed from the local transmission/reception controller 703, the order output manager 701 reads the order transmission data file from the local reception box 714 and analyzes the contents of the order transmission data file to store the contents in RAM 2002 in the format of the data structure of the print order data shown in FIG. 8. The output order manager 701 extracts the tag 1322 of the print original image described in the order transfer data file to store the print original image file name in the tag into RAM 2002 as the additional information of the image ID 805 corresponding to the print order data. The internal code format of the script 1402 written in the order transmission data file is analyzed and converted into the original format before the internal code format changed by the center server 102 during the print order transmitting process, and the converted script 1402 is stored in RAM 2002.

Steps S2602 to Step S2606 are repeated for each image ID in the print order data stored at Step S2601. In the following description, the image ID to be processed is represented by "image ID (i)" and the print original image file name corresponding to the image ID (i) is represented by "print original image file name (i)".

At Step S2602 the order output manager 701 checks whether a value is present in the print original image file name (i), i.e., whether the print original image file has been transmitted from the center server 102. If there is the value, the flow advances to Step S2603, whereas if not, the flow advances to Step S2604.

At Step S2603 the order output manager 701 extracts the print original image file identified by the print original image file name (i) from the local reception box 714 and copies it to the print spool 712. The file name of the copied file is stored in RAM 2002.

At Step S2604 the order output manager 701 searches the original image position management table 715 to read the data having the same image ID 1201 as the image ID (i) and store it in RAM 2002.

At Step S2605 the order output manager 701 extracts from the print original image storage 716 the print original image file identified by the file name of the print original image file stored in the keeping location 1203 of the original image position management data stored at Step S2604, and copies it to the print spool 712. The file name of the copied file is stored in RAM 2002.

At Step S2606 the order output manager 701 extracts from the script stored at Step S2601 the data (data represented by "imagetab ( )" in FIG. 14) describing the file name of the image ID (i). The file name described in the data is replaced by the file name of the print original image file in the print spool 712 stored at Step S2603 or S2604.

At Step S2607 the order output manager 701 stores the print order data stored at Step S2601 in the order management table 711. This print order data contains the script data edited at Step S2606 as the edit data 804.

<Printing Process>

Figure 27:
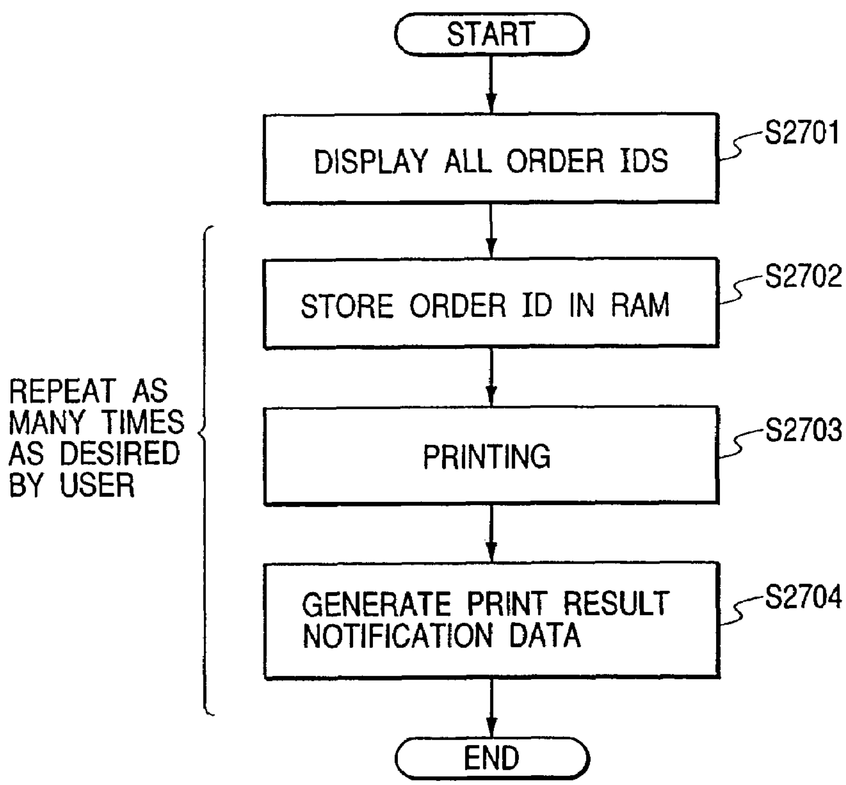
FIG. 27 is a flow chart illustrating a print process to be executed by the print server.

FIG. 27 is a flow chart illustrating the printing process for a print order to be executed by the order output manager 701 of the print server 121. During the printing process, as the operator operates upon KB 2008, the order output manager 701 is read from HDD 2009 or the like and developed onto RAM 2004 to make it usable by the operator.

At Step S2701 the order output manager 701 reads the order management table 711 and displays the order Ides of all the print orders 801 stored in the order management table 711 on CRT 2006.

At Step S2702 the order output manager 701 stores the order ID of a print order selected by the operator from KB 2008 in RAM 2002.

At Step S2703 by using the order ID stored at Step S2702, the order output manager 701 reads the order management table 711 to read the script or edit data 804 of the print order corresponding to the order ID and store it in the print spool 712 as a file. Next, the print controller 702 is read from HDD 2009 or the like and developed onto RAM 2002 to make it usable and pass the script file name. The print controller 702 reads the script file from the print spool 712 and analyzes it to extract the print original image file from the print spool 712 by using the print original image file written in the script and to generate the print data which is passed to PRTC 2011 to print out it with PRT 2012. After the printing is completed, the print controller 702 returns the result data representative of a success or a failure back to the order output manager 701.

At Step S2704 the order output manager 701 edits the print result notice data 1318 shown in FIG. 13 by using the order ID stored at Step S2702 and the result data received from the print controller at Step S2703, adds the transmission/reception header 1311 to the print result notice data to generate the print result notice data file which is stored in the local transmission box 713. The order output manager 701 deletes the print order data corresponding to the order ID from the order management table 711.

Steps S2702 to S2704 are repeated as many times as desired by the operator.

In the print server 121, after the image register of the print image register 704 stores the print original image in the print original image storage 716 and the image information is stored in the original image position management table 715, the print order data may be generated by the print image register 704 or order output manager 701 and stored in the order management table 711. Further, by using this print order data stored in the order management table 711, the printing for the print order may be performed by using the printing process. In this case, the assumption of the data transmission/reception to and from the center server 102 and the order placing process by the client computer 101 are not applied.

<Printing Completion Process>

Upon reception of the print completion notice data file from the print server 121, the center transmission/reception controller 407 of the center server 102 stores the print completion notice data file in the center reception box 419, and thereafter reads the order progress manager 406 from HDD 1009 or the like and develops it onto RAM 1002 to make it usable and pass the file name of the print completion notice data file in the center reception box 419 to the order progress manager 406 via RAM 1002.

Figure 28:
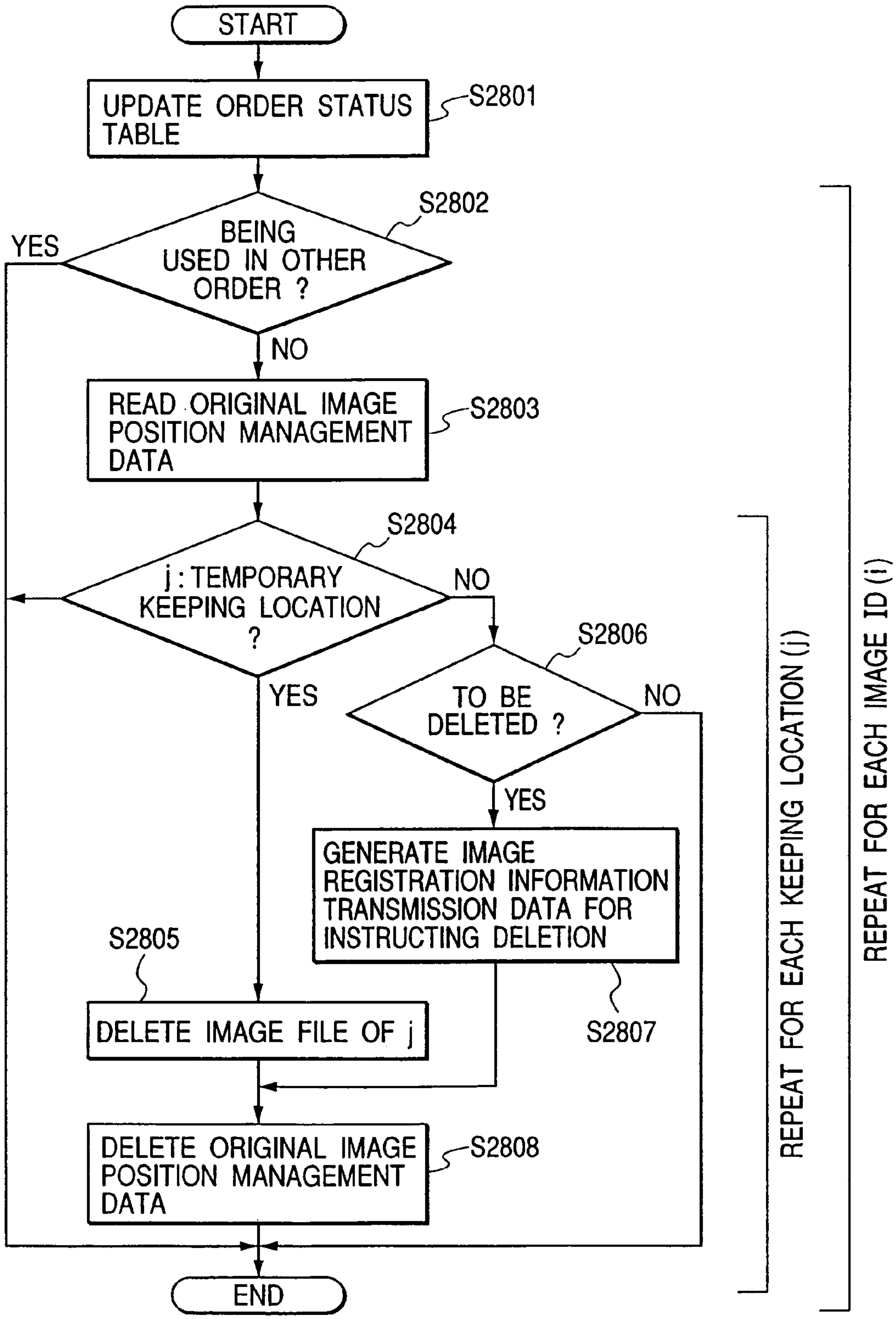
FIG. 28 is a flow chart illustrating a print completion process to be executed by the center server.

FIG. 28 is a flow chart illustrating the print completion process to be executed by the order progress manager 406 of the center server 102.

At Step S2801 by using the file name of the print completion notice data file passed from the center transmission/reception controller 407 at the activation time, the order progress manager 406 reads the file and extracts the order ID recorded in the file which order ID is stored in RAM 1002. Next, the order progress manager 406 searches the order status table 415 by using the order ID and sets "print completion" to the status 204 of all sets of the order status data having the same ID 201 in the order status table 415 as the order ID stored in RAM 1002 at Step S2801 to thereafter update the order status table. The image ID 203 in the order status data is stored in RAM 1002.

Steps S2802 to S2808 are repeated for each image ID stored at Step S2801. In the following description, the image ID to be processed among those stored in RAM 1002 is represented by "image ID (i)".

At Step S2802 the order progress manager 406 searches the order status table 415 by using the image ID (i) to check whether there is the data having the same image ID 203 in the order status table 415 as the image ID (i) and the status 204 without "print completion". If there is such order status data, the flow advances to Step S2803, whereas if not, the flow returns to Step S2802 whereat the next image ID (i+1) after the image ID (i) is processed.

At Step S2803 the order progress manager 406 searches the original image position management table 412 by using the image ID (i) to read all sets of the original image position management table data having the same image ID 1201 in the original image position management table as the image ID (i) and store them in RAM 1002.

Steps S2804 to S2808 are repeated for each set of the original image position management table data stored at Step S2803. In the following description, the original image position management table data item to be processed among those stored in RAM 1002 is represented by "keeping location (j)".

At Step S2804 the keeping location (j) is checked as to whether the keeping location (j) is the path name of the image file in the temporary image storage 414. If the keeping location (j) is the path name of the image file in the temporary image storage 414, the flow advances to Step S2805, whereas if not, the flow advances to Step S2806.

At Step S2805 the order progress manager 406 deletes the image file designated by the path name in the keeping location (j) from the temporary image storage 414.

At Step S2806 the order progress manager 406 checks the original image position management table data as to whether the keeping location (j) is the server ID of the center server 111 or print server 121 and whether the flag of "possibly deleted" is set in the additional information (j). If the keeping location (j) and additional information (j) satisfy the above conditions, the flow advances to Step S2807, whereas if not, the flow returns to Step S2804 whereat the next original image position management table data is processed.

At Step S2807 the order progress manager 406 generates an image registration information transmission data file for deletion instruction in order to delete the print original image represented by the original image position management table data from the image server 111 or print server 121 storing the print original image. The image registration information transmission data is the data such as that indicated at 1314 in FIG. 13 or shown in FIG. 16, and is generated by using the image ID (i) and by setting "delete" is set to the operation code (OPE parameter). The receiver in the transmission/reception header data 1311 of the image registration information transmission data is set with the server ID stored in the keeping location (j) of the original image management table data. Next, the generated image registration transmission data file is stored in the center transmission box 418.

At Step S2808 the order progress manager 406 deletes the original image position management table data processed from the original image position management table 412.

<Original Image Move/Copy/Delete Process>

In the image server 111 or print server 121, when the image registration information transmission data file is received from the center server 102, the print image register 601 or 704 deletes the print original image file designated by the image ID for deletion in the image registration information transmission data from the print original image storage 611 or 716, and also deletes the data designated by the image ID from the original image position management table 612 or 715.

In this process, the image registration information transmission data transmitted from the center server 102 has three operation codes ("OPE") including move ("MOVE"), copy ("COPY") and delete ("DEL").

The print original image move/copy/delete process is the same for both the print image register 601 of the image server 111 and the print image register 704 of the print server 121. Therefore, only the process contents to be executed by the print image register 704 of the print server 121 will be described. Upon reception of the image registration information transmission data file from the center server 102, the local transmission/reception controller 703 of the print server 121 stores this file in the local reception box 714, and then reads the print image register 704 from HDD 1009 or the like and develops it onto RAM 1002 to make it usable and pass the file name of the image registration information transmission data file stored in the local reception box 714 to the print image register 704 via RAM 1002. If the original image file described by the format at 1322 shown in FIG. 13 exists in the image registration information transmission data file, this original image file is stored also in the local reception box 714.

Figure 29:
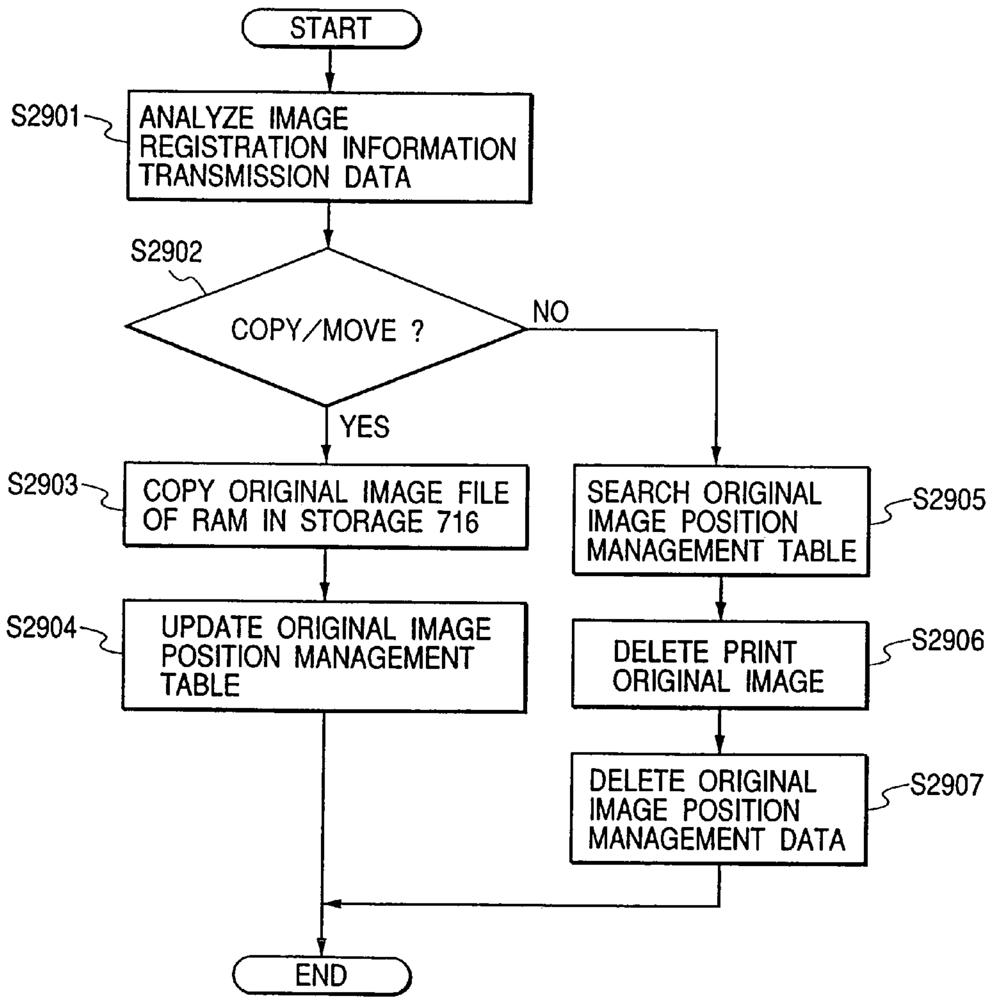
FIG. 29 is a flow chart illustrating a print original image move/copy/delete process to be executed by the image server or print server.

FIG. 29 is a flow chart illustrating the original image move/copy/delete process to be executed by the print image register 704 of the print server 121.

At Step S2901 by using the file name of the image registration information transmission data file passed from the local transmission/reception controller 703 at the activation time, the print image register 704 reads the image registration information transmission data file from the local reception box 714 and analyzes the contents of the file to store the image ID ("ID" parameter), operation code ("OPE" parameter) and original image file name respectively contained in the image registration information transmission data in RAM 1002.

At Step S2902 the print image register 704 checks the operation code stored in RAM 1002. If the operation code is copy ("COPY") or move ("MOVE"), the flow advances to Step S2903, whereas if not, i.e., if the operation code is delete ("DEL"), the flow advances to Step S2905.

At Step S2903 by using the file name of the original image file stored in RAM 1002, the print image register 704 reads the original image file from the local reception box 714 and copies it to the print original image storage 716, and the file name of the copied file is stored in RAM 1002.

At Step S2904 the print image register 704 generates the original image position management table data by using the image ID and the file name of the print original image copied to the print original image storage 716 respectively stored in RAM 1002, and adds the generated original image position management table data to the original image position management table 715.

At Step S2905 the print image register 704 searches the original image position management table 715 by using the image ID stored in RAM 1002 to read the original image position management table data having the same image ID 1201 as the image ID stored in RAM 1002 and store it in RAM 1002.

At Step S2906 the print image register 704 deletes the print original image file represented by the file name stored in the keeping location 1203 of the original image position management table data stored at Step S2905, from the print original image storage.

At Step S2907 the print image register 704 deletes the original image position management data stored at Step S2905 from the original image position management table 715.

<Transmission Box>

Figure 30:
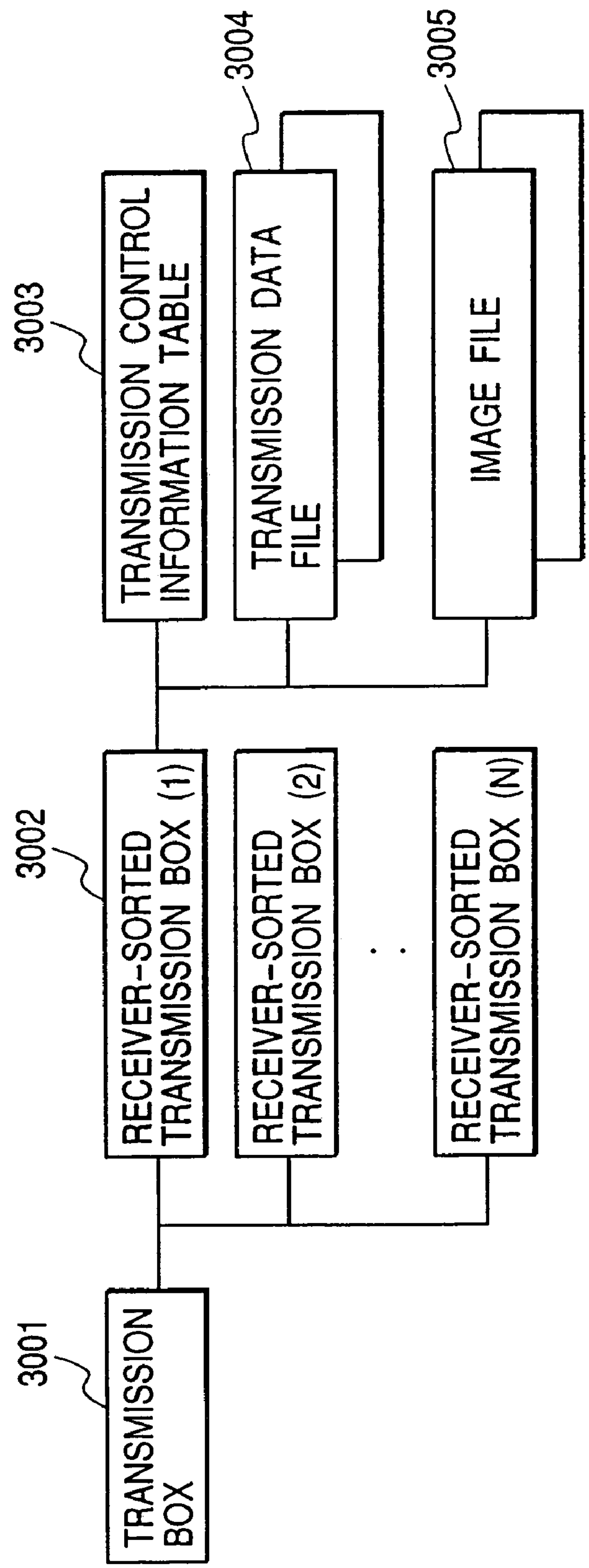
FIG. 30 is a block diagram showing the data structure in a transmission box.

FIG. 30 is a block diagram showing the internal data storage structure of the center transmission box 418 of the center server 102, local transmission box 613 of the image server 111, and local transmission box 713 of the print server 121. The functions of the transmission boxes 418, 613 and 713 are the same. In the following description, therefore, only a transmission box 3001 shown in FIG. 30 will be described.

The transmission box is the data group stored in HDD 1009 or HDD 2009. Although the data group can be stored by using, for example, a commercially available relational database, a widely used hierarchical file system (file storage method) is used in this embodiment. This file system can store a file in a storage unit called a hierarchical directory.

In FIG. 30, reference numeral 3001 represents a transmission box which is the same as the center transmission box 418 of the center server 102, the local transmission box 613 of the image server 111, and the local transmission box 713 of the print server 121. The transmission box 3001 corresponds to a directory.

Reference numeral 3002 represents a receiver-sorted transmission box which corresponds to a lower level directory (sub-directory) of the transmission box 3001. By assigning a server ID of the receiver as the directory name, transmission data can be stored for each receiver.

Reference numeral 3003 represents a transmission control information table which is a file provided in each of the receiver-sorted transmission boxes. Information such as the file name of a transmission data file 3004 is stored in the transmission control information table 3003.

The transmission data file 3004 has the format described with FIG. 13. A plurality of transmission data files 3004 are stored in each receiver-sorted transmission box 3002.

Reference numeral 3005 represents a file having a format different from that described with FIG. 13. The file 3005 is referred to by the <CAMLLINK> tag in the transmission data file 3004. This file 3005 is hereinafter called simply an image file. A plurality of image files 3005 are stored in each of the receiver-sorted transmission box 3002.

<Reception Box>

Figure 31:
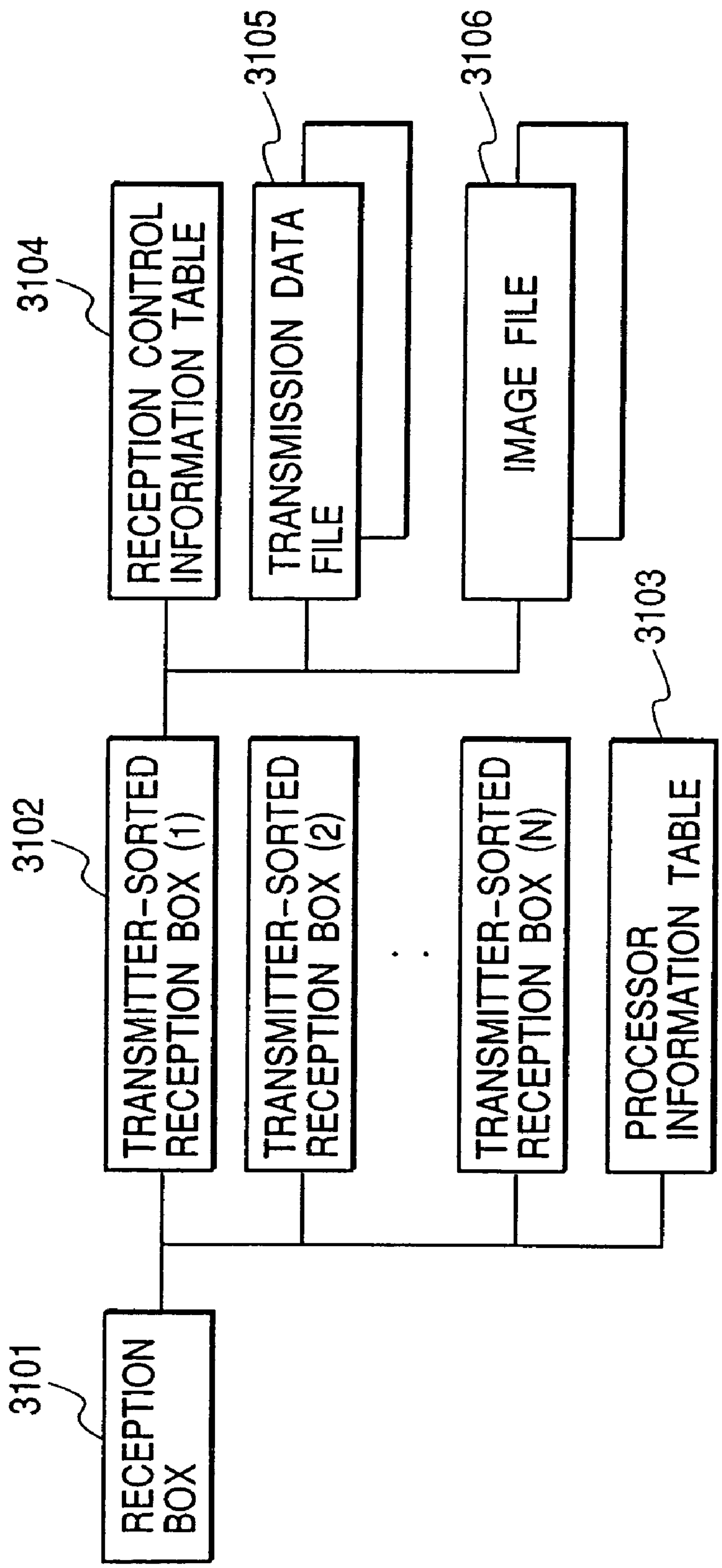
FIG. 31 is a block diagram showing the data structure in a reception box.

FIG. 31 is a block diagram showing the internal data storage structure of the center reception box 419 of the center server 102, local reception box 614 of the image server 111, and local reception box 714 of the print server 121. The functions of the reception boxes 419, 614 and 714 are the same. In the following description, therefore, only a reception box 3101 shown in FIG. 31 will be described.

The reception box is the data group stored in HDD 1009 or HDD 2009. Although the data group can be stored by using, for example, a commercially available relational database, a widely used hierarchical file system (file storage method) is used in this embodiment. This file system can store a file in a storage unit called a hierarchical directory.

In FIG. 31, reference numeral 3101 represents a reception box which is the same as the center reception box 419 of the center server 102, the local reception box 614 of the image server 111, and the local reception box 714 of the print server 121. The reception box 3101 corresponds to a directory.

Reference numeral 3102 represents a transmitter-sorted reception box which corresponds to a lower level directory (sub-directory) of the reception box 3101. By assigning a server ID of the transmitter as the directory name, reception data can be stored for each transmitter.

Reference numeral 3103 represents a processor information table which stores the name of a processor, a processor starting method and the like, the processor being activated in accordance with the tag in the transmission data in the transmission data file 3105 when the center transmission/reception controller 407, local transmission/reception controller 603 or local transmission/reception controller 607 receives the transmission data file 3105.

Reference numeral 3104 represents a reception control information table which is a file provided in each of the transmitter-sorted reception boxes. Information such as the file name of a reception data file 3105 is stored in the reception control information table 3103.

The reception data file 3105 has the format described with FIG. 13. A plurality of reception data files 3105 are stored in each transmitter-sorted reception box 3102.

Reference numeral 3106 represents a file having a format different from that described with FIG. 13. The file 3106 is referred to by the <CAMLLINK> tag in the reception data file 3105. This file 3106 is hereinafter called simply an image file. A plurality of image files 3106 are stored in each of the transmitter-sorted reception box 3102.

<Transmission/Reception Control Information Table>

Figure 32:
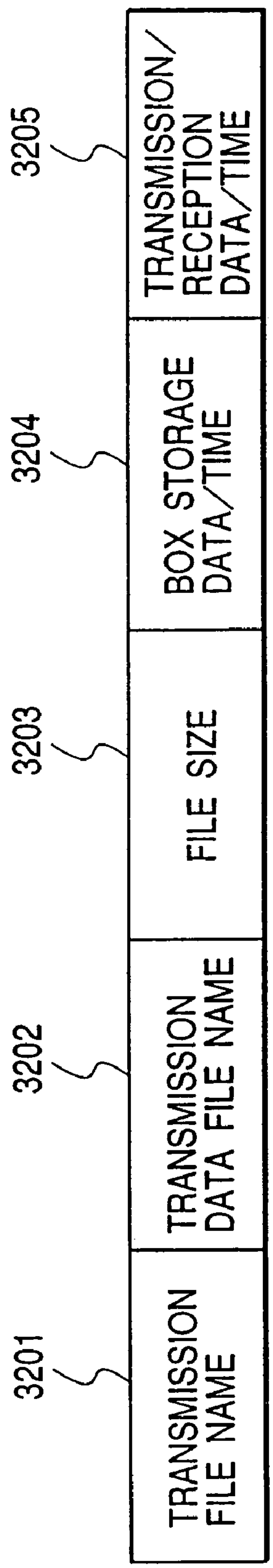
FIG. 32 is a diagram illustrating a transmission control information table in the transmission box and a reception control information table in the reception box.

FIG. 32 is a diagram showing data items to be stored in the transmission control information table 3003 and reception control information table 3104. The data items stored in the transmission control information table 3003 and reception control information table 3104 are the same. In the following description, therefore, the transmission control information table 3003 and reception control information table 3104 are collectively called a transmission/reception control information table.

The transmission/reception control information table stores a plurality of data records each being the data group described with referent to FIG. 32. Each data record is definitely identified by the value of a transmission file name 3201.

The transmission file name 3201 is the file name of the transmission data file 3004, reception data file 3105, image file 3005 or image file 3106.

Reference numeral 3202 represents a transmission data file name which stores the file name of the transmission data file 3004 or reception data file 3105 containing the <CAMLLINK> tag indicating the image file, if the transmission file name 3201 designates the image file 3005 or 3106. If the transmission file name 3201 designates the transmission data file 3004 or reception data file 3105, the transmission data file name has no value.

Reference numeral 3203 represents a file size which stores the size of a file designated by the transmission file name as the number of bytes.

Reference numeral 3204 represents a box storage date/time which stores the date/time when the file designated by the transmission file name 3201 is stored in the transmission box 3001 or reception box 3101.

Reference numeral 3205 represents a transmission/reception date/time which stores the date/time when the file designated by the transmission file name 3201 is transmitted or received.

The transmission/reception control information table stores attributes of each of the transmission data file 3004, reception data file 3105, image file 3005 and image file 3106, as described above.

<Processor Information Table>

Figure 33:
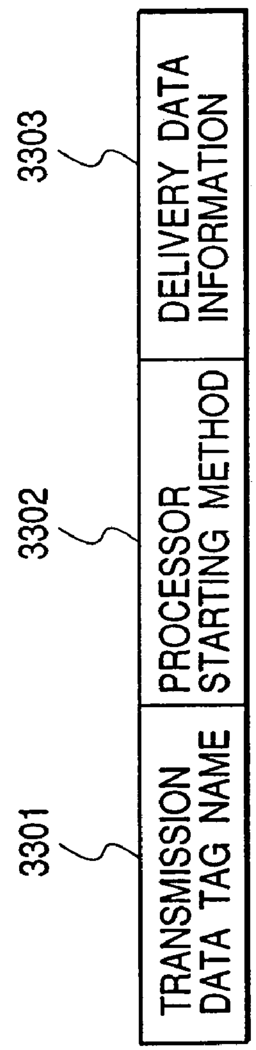
FIG. 33 is a diagram illustrating a processor information table in the reception box.

FIG. 33 is a diagram showing data items stored in the processor information table 3103 of the reception box 3101.

The processor information table 3103 stores a plurality of data records each being the data group described with referent to FIG. 33. Each data record is definitely identified by the value of a transmission data tag name 3103. In this embodiment, it is assumed that data records having correct values are stored in advance in the processor information table 3103.

The transmission data tag name 3301 stores a tag name for identifying transmission data having the transmission data format described with reference to FIG. 13.

Reference numeral 3302 represents a processor starting method which stores a method of starting a processor which processes the transmission data designated by the transmission data tag name 3301. The starting method stores a program file name of an application program if this application program is used by developing it onto RAM 1002. The center transmission/reception controller 407, local transmission/reception controller 603, or local transmission/reception controller 703 reads the application program from HDD 1009 or HDD 2009 and develops it onto RAM 1002 to make it usable.

Reference numeral 3303 represents a delivery data information which stores the name of a data item passed to the processor via RAM 1002 or RAM 2002 after the processor is activated in accordance with the processor starting method 3302 by the center transmission/reception controller 407, local transmission/reception controller 603, or local transmission/reception controller 703. The name of the data item is, for example, the file name of the transmission data file 3105.

<Transmission File Registration Process>

Figure 34:
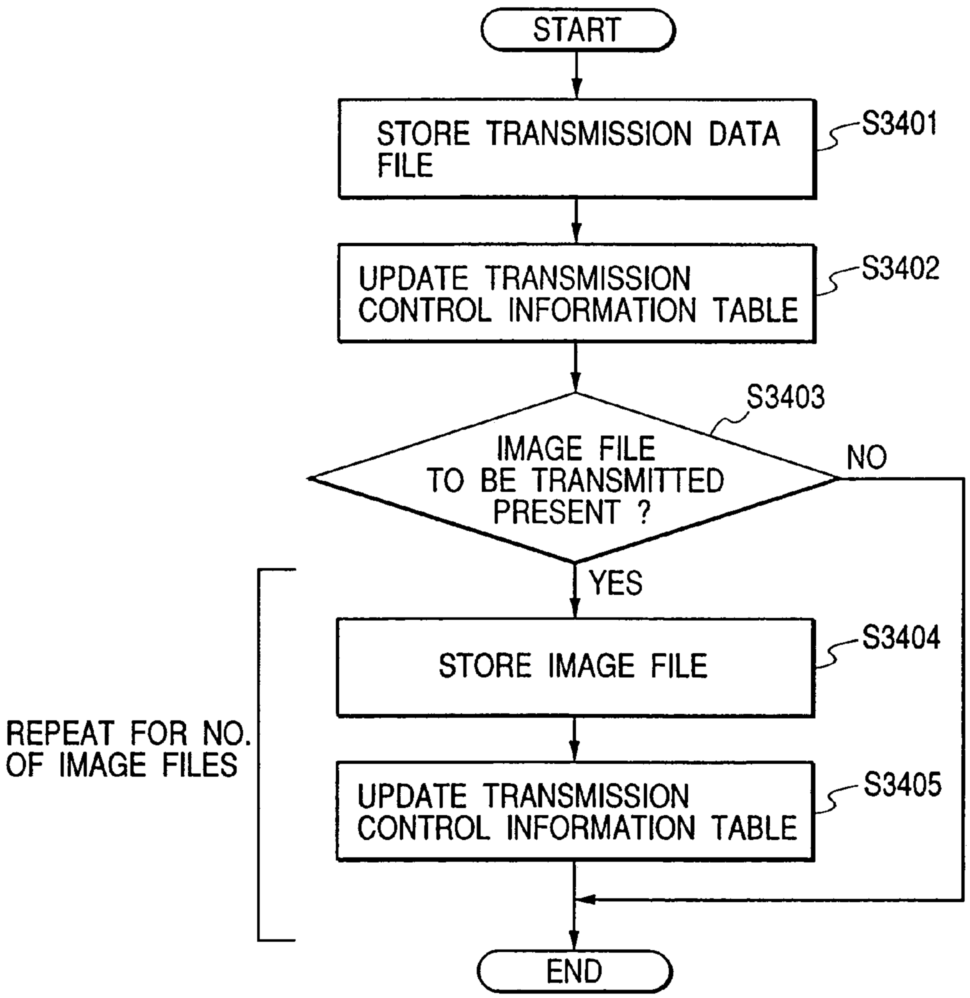
FIG. 34 is a flow chart illustrating a process of registering a transmission file in the transmission box.

FIG. 34 is a flow chart illustrating the transmission file registration process to be executed by the center server 102, image server 111 or print server 121. The transmission file registration process registers the transmission data file or the like in the transmission box 3001, and is executed by each processor of the center server 102, image server 111 or print server 121. For each processor executing this process, it is assumed that the transmission data is already generated, that the transmission data can be stored as the transmission data file 3004 having the format shown in FIG. 13, and that the server ID of the receiver is already stored in RAM 1002 or RAM 2002. Furthermore, the file names of the transmission data file 3004 and image file 3005 are required to be different from those of already stored files, by entering a process time and a random number into the file name.

At Step S3401 the transmission data is stored as the transmission data file 3004 in the receiver-sorted transmission box 3002 having the same name as the server ID of the receiver stored in RAM 1002 or RAM 2002.

At Step S3402 the transmission/reception control information data described with FIG. 32 is generated by using the file name of the transmission data file 3004 stored at Step S3401, the file size of the file, and a present process time, and writes the generated transmission/reception control information data in the transmission control information table 3003.

At Step S3403 it is checked whether the <CAMLLINK> tag is contained in the transmission data. If contained, the flow advances to Step S3404, whereas if not, the process is terminated.

Steps S3404 and S3405 are repeated as many times as the number of files such as images designated by the <CAMLLINK> tag in the transmission data.

At Step S3404 the file designated by the <CAMLLINK> tag in the transmission data is stored as the image file 3005 in the receiver-sorted transmission box 3002 having the same name as the server ID of the receiver stored in RAM 1002 or RAM 2002.

At Step S3405 the transmission/reception control information data described with FIG. 32 is generated by using the file name of the image file 3005 stored at Step S3404, the file name of the transmission data file 3004 stored at Step S3401, the file size of the image file, and a present process time, and writes the generated transmission/reception control information data in the transmission control information table 3003.

<Data Transmission/Reception Process at Print Server>

The center server 102 and print server 121 can be interconnected via the network 103 by dial-up connection or permanent connection on the side of the printer server 121. The network 103 may use a desired network configuration. In this embodiment, the widely used Internet is used. The protocol of the network 103 may use a desired protocol. This embodiment uses HTTP (Hyper Text Transfer Protocol), FTP (File Transfer Protocol) or the like which is commonly used by the Internet. The local transmission/reception controller 703 and center transmission/reception controller 407 of the print server 121 transfers data to and from the network 103 by using the protocol. It is assumed that a connection method from the print server 121 to the center server 102 is set in advance to the print server 121.

Figures 35, 35A:
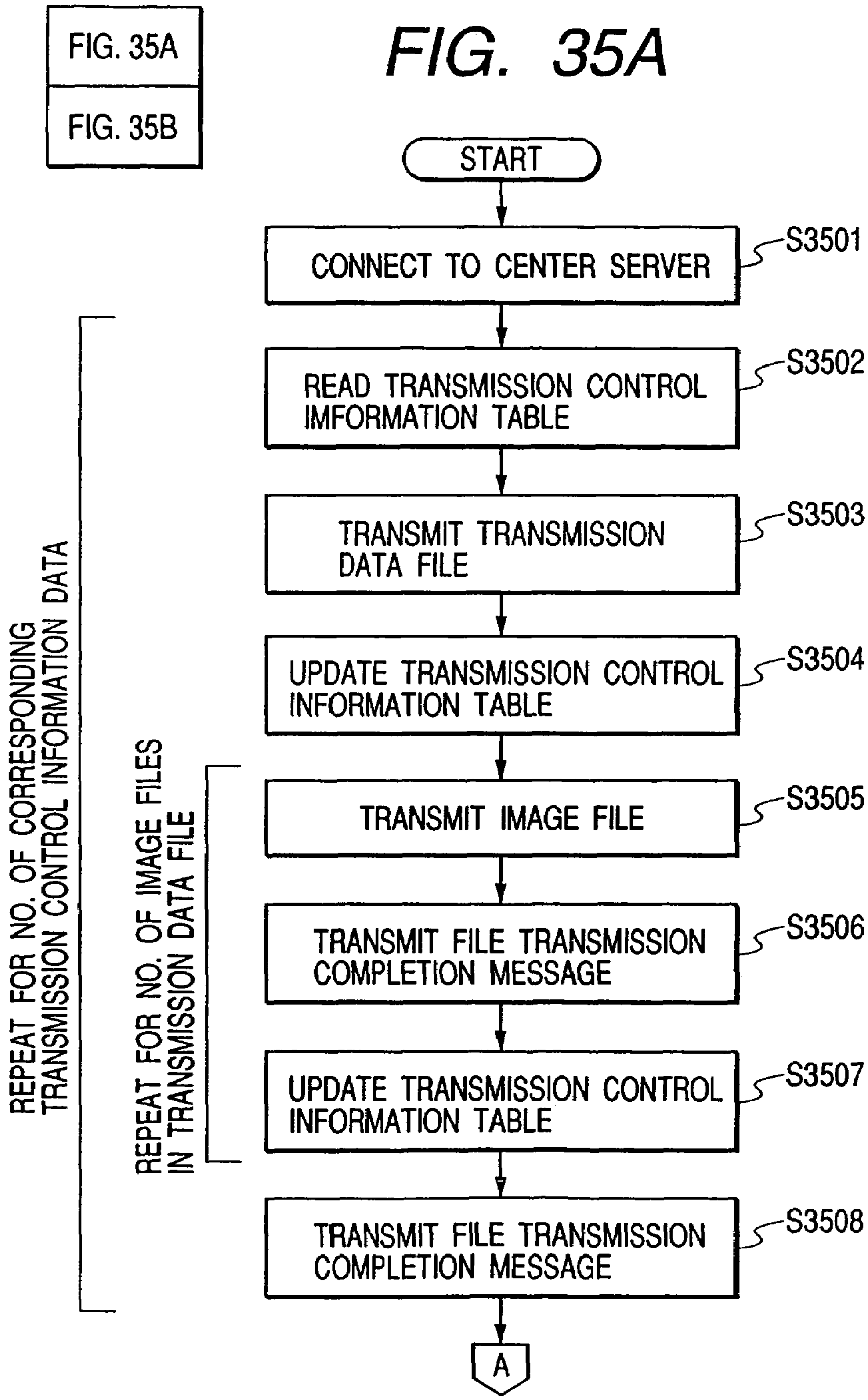
FIG. 35 which is comprised of FIGS. 35A and 35B are flow charts illustrating a data transmission/reception process to be executed by the print server.
Figure 35B:
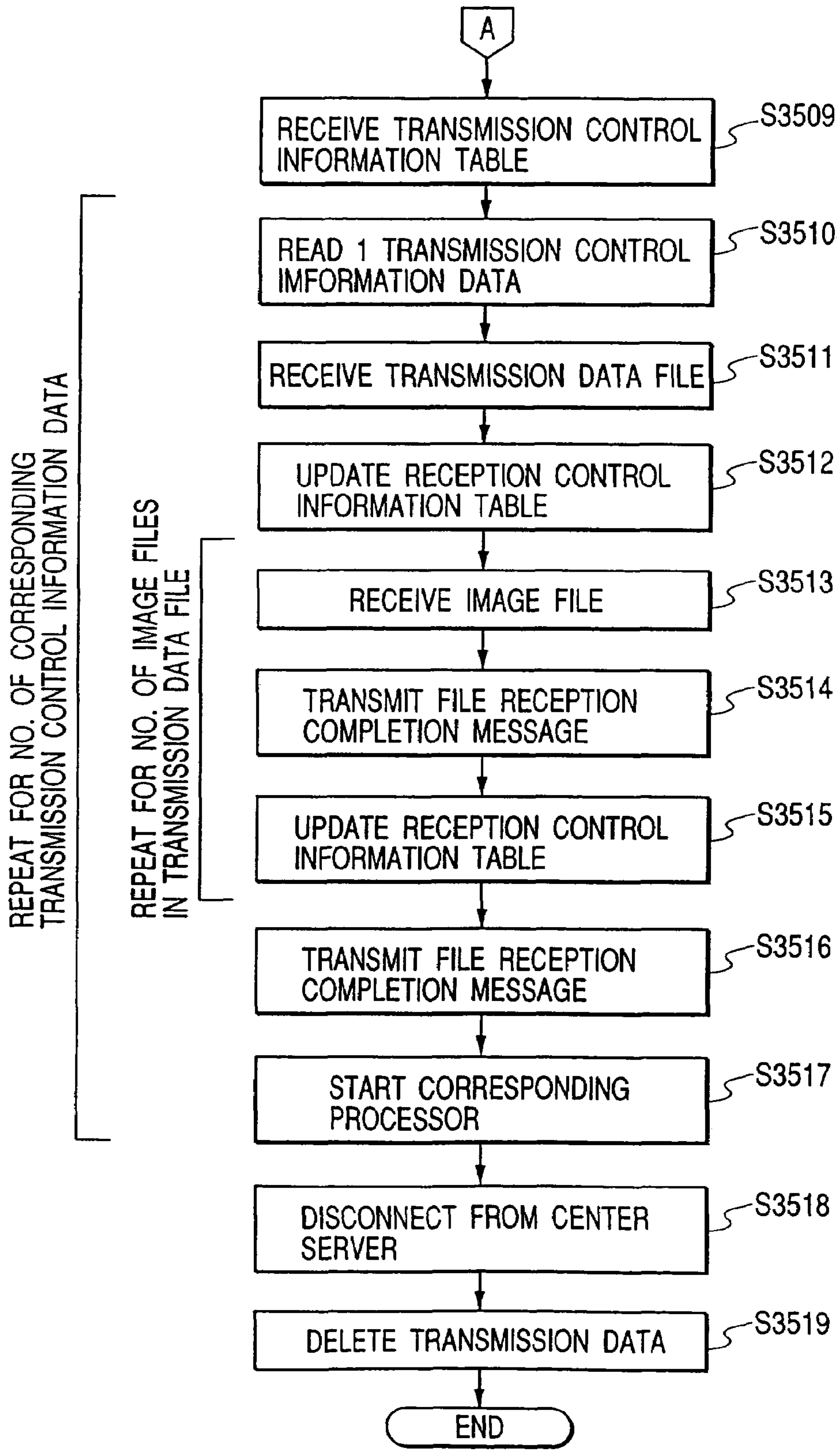

FIGS. 35A and 35B are flow charts illustrating the data transmission/reception process to be executed by the local transmission/reception controller 603 of the image server 111 or the local transmission/reception controller 703 of the print server 121. Since the processes by the local transmission/reception controller 603 of the image server 111 and the local transmission/reception controller 703 of the print server 121 are the same, only the process to be executed by the local transmission/reception controller 703 of the print server 121 will be described in the following. The corresponding process to be executed by the center transmission/reception controller 407 of the center server 102 will be later described with reference to FIG. 36.

A "message" to be used in the description of FIG. 35 and in the description to follow is assumed to be text data containing the server ID of the print server 121, a process request and the like, the text data being transmitted and received by HTTP or the like. A file is transmitted and received by FTP.

In response to an operation by the operator from KB 2008 or at a preset time interval, the local transmission/reception controller 703 of the print server 121 is read from HDD 2009 and developed onto RAM 2002 to make it usable.

At Step S3501 in accordance with the connection method to the center server 102 preset to the print server 121, the local transmission/reception controller 703 requests a connection to the center server 102 through dial-up or the like to thereby establish a connection to the center server 102. Next, a message is transmitted to the center server 102, which message requests the directory names of the transmitter-sorted reception box 3102 and receiver-sorted transmission box 3002 for the print server 121 in the center server 102, and a message including the directory names is received from the center server 1002 and stored in RAM 2002.

Steps S3502 to S3507 are repeated for each set of the data having no value in the transmission data file name 3202 and transmission completion date/time 3205, i.e., the data of a transmission data file still not transmitted, among the transmission control information data stored in the transmission control information table 3003 in the receiver-sorted transmission box 3002 for the center server 102. The transmission control information data is processed in the ascending order of the value of the box storage date/time, i.e., in the order of storage into the transmission box.

At Step S3502 the local transmission/reception controller 703 reads one set of the transmission control information data satisfying the above conditions from the transmission control information table 3003 in the receiver-sorted transmission box 3002 for the center server 102, and stores it in RAM 2002.

At Step S3503 the local transmission/reception controller 703 reads the transmission data file 3004 designated by the transmission file name 3201 of the transmission control information data stored at Step S3502, and transmits the transmission file so as to store it in the directory of the transmitter-sorted reception box 3102 of the center server 102 stored at Step S3501.

At Step S3504 the local transmission/reception controller 703 sets a present date/time to the transmission completion date/time 3205 of the transmission control information data stored at Step S3502, and overwrites the transmission control information data upon the data having the same transmission file name 3201 in the transmission control information table 3003 as the transmission data file name of the transmission control information data, to thereby update the transmission control information table 3003.

Steps S3505 to S3507 are repeated for each set of the transmission control information data having the same transmission data file name 3202 as the transmission data file name of the transmission control information data stored at Step S3502, among the transmission control information data in the transmission control information table 3003.

At Step S3505 the local transmission/reception controller 703 reads one set of the transmission control information data satisfying the above conditions from the transmission control information table 3003, and stores it in RAM 2002. Next, the local transmission/reception controller 703 reads the image file 3005 designated by the transmission file name 3201 of the transmission control information data, and transmits the image file so as to store it in the directory of the transmitter-sorted reception box 3102 of the center server 102 stored at Step S3501.

At Step S3506 the local transmission/reception controller 703 transmits a message which notifies a file transmission completion and contains the transmission control information data stored at Step S3505.

At Step S3507 the local transmission/reception controller 703 sets a present date/time to the transmission completion date/time 3205 of the transmission control information data stored at Step S3505, and overwrites the transmission control information data upon the data having the same transmission file name 3201 in the transmission control information table 3003 as the transmission file name of the transmission control information data, to thereby update the transmission control information table 3003.

At Step S3508 the local transmission/reception controller 703 transmits a message which notifies a file transmission completion and contains the transmission control information data presently processed and stored at Step S3502.

At Step S3509 the local transmission/reception controller 703 receives as a file the transmission control information table 3003 in the transmitter-sorted reception box 3102 for the print server 121 in the center server 102, from the center server 102, and temporarily stored in a temporary storage area of HDD 2009.

Steps S3510 to S3517 are repeated for each set of the data having no value in the transmission data file name 3202 and transmission completion date/time 3205, i.e., the data of a transmission data file still not transmitted, among the transmission control information data stored in the transmission control information table 3003 received from the center server 102 and stored in HDD 2009 at Step S3509. The transmission control information data is processed in the ascending order of the value of the box storage date/time, i.e., in the order of storage into the transmission box.

At Step S3510 the local transmission/reception controller 703 reads one set of the transmission control information data satisfying the above conditions from the transmission control information table received from the center server 102, and stores it in RAM 2002.

At Step S3511 the local transmission/reception controller 703 receives from the center server 102 the transmission data file designated by the transmission file name 3201 of the transmission control information data stored at Step S3510, and transmits the transmission data file so as to be stored as the transmission data file 3105 in the transmitter-sorted reception box 3102 for the center server 102.

At Step S3512 the local transmission/reception controller 703 sets a present date/time to the transmission completion date/time 3205 of the transmission control information data stored at Step S3510, and adds the transmission control information data to the transmission control information table 3104 of the transmitter-sorted reception box 3102 for the center server.

Steps S3513 to S3515 are repeated for each set of the transmission control information data having the same transmission data file name 3202 as the transmission file name of the transmission control information data stored at Step S3510, among the transmission control information data received from the center server 102.

At Step S3513 the local transmission/reception controller 703 reads one set of the transmission control information data satisfying the above conditions from the temporary storage area of HDD 2009 stored at Step S3509, and stores it in RAM 2002. Next, the local transmission/reception controller 703 receives from the center server 102 the image file designated by the transmission file name 3201 of the transmission control information data, and stores the image file as the image file 3106 in the transmitter-sorted reception box 3102 for the center server.

At Step S3514 the local transmission/reception controller 703 transmits a message which notifies a file reception completion and contains the transmission/reception control information data stored at Step S3513.

At Step S3515 the local transmission/reception controller 703 sets a present date/time to the transmission completion date/time 3205 of the transmission control information data stored at Step S3513, and adds the transmission control information data to the reception control information table 3104 of the transmitter-sorted reception box 3102 for the center server.

At Step S3516 the local transmission/reception controller 703 transmits a message which notifies a file reception completion and contains the transmission control information data presently processed and stored at Step S3510.

At Step S3517 the local transmission/reception controller 703 reads the transmission data file 3105 received and stored at Step S3511 and writes it in RAM 2002 to analyze the contents thereof and extract all the transmission data tags such as tags represented by the <ORDER> tag shown in FIG. 13. Next, by using each value of the transmission data tags, the processor information table 3103 is searched to extract the processor information data having the same transmission data tag name 3301 in the processor information table 3103 as the value of the extracted transmission data tag, and thereafter, the corresponding processor is activated in accordance with the processor starting method 3302 and delivery data information 3303 in the processor information data.

At Step S3518 the local transmission/reception controller 703 releases the connection to the center server 102 if the dial-up connection to the center server 102 is used.

At Step S3519 the local transmission/reception controller 703 searches the transmission control information table 3003 in the receiver-sorted transmission box 3002 for the center server 102 to delete the transmission control information data having the transmission completion date/time 3205 older by a predetermined period from the present time, from the transmission control information table 3003, and also to delete the transmission data file 3004 or image file 3005 designated by the transmission file name of the transmission control information data. The transmission control information data and each transmission file are not deleted immediately after the transmission completion because it may become necessary to transmit them again when a transmission trouble occurs.

The processor such as the order output manager 701 activated at Step S3517 deletes a corresponding transmission data file 3105 and image file 3106 at the lower level from the reception box 3101 when the process for the transmission data file is completed, and also deletes the data having the same transmission file name 3201 in the reception control information table 3104 as the file name of the deleted files.

In this embodiment, when the process is intercepted during the data reception by a network trouble, this process is again executed from the start. Also in this case, an already transmitted or received image file is not transmitted or received again.

<Transmission/Reception Process at Center Server>

Figure 36:
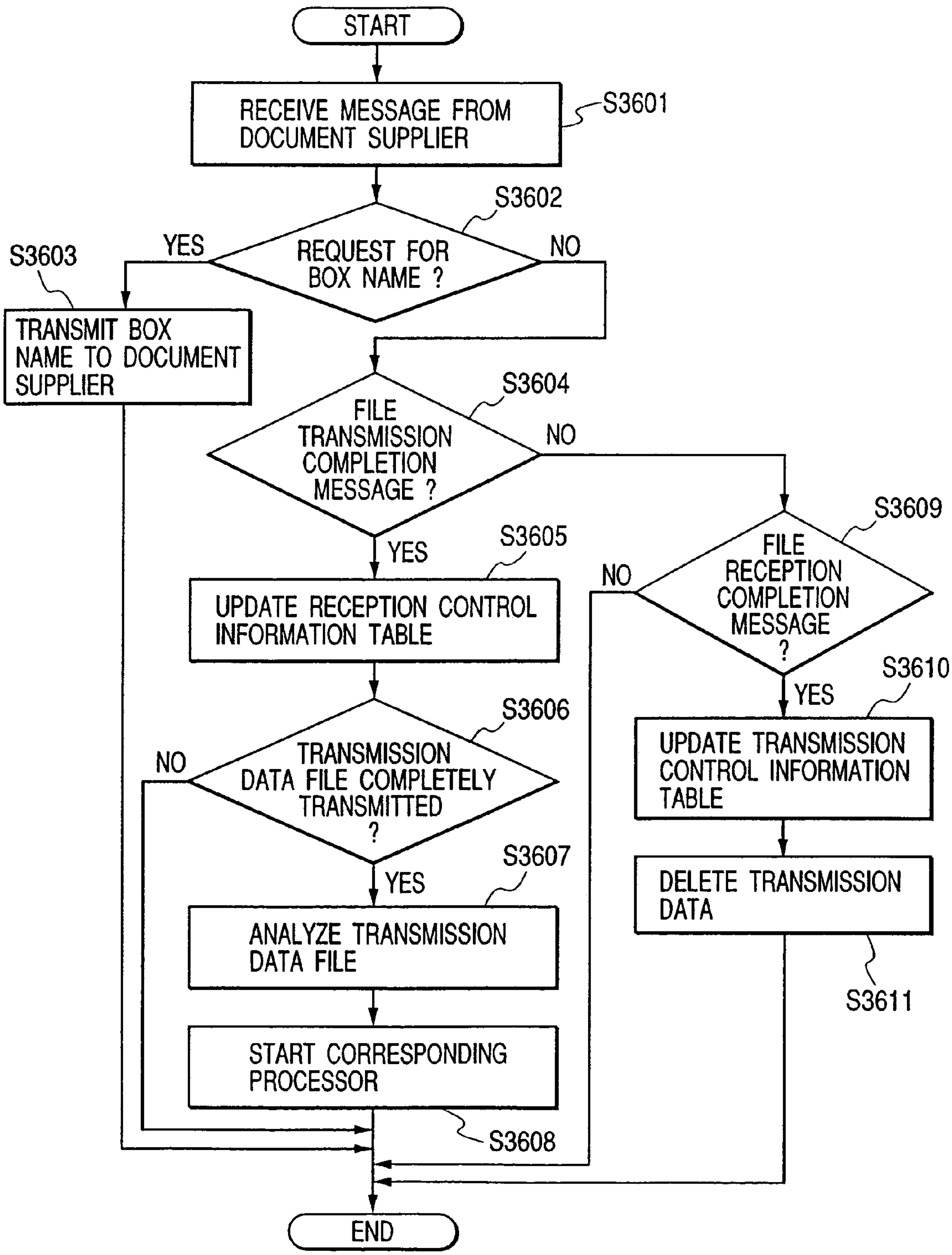
FIG. 36 is a flow chart illustrating a data transmission/reception process to be executed by the center server.

FIG. 36 is a flow chart illustrating the data transmission/reception process to be executed by the center transmission/reception controller 407 of the center server 102.

The center transmission/reception controller 407 executes the data transmission/reception process in response to a reception of a message from the local transmission/reception controller 603 of the image server 111 or the local transmission/reception controller 703 of the print server 121. In this embodiment, HTTP is used as the transmission protocol. The document supplier 401 receives a transmitted message and develops the center transmission/reception controller 407 onto RAM 1002 to activate it and execute the data transmission/reception process. The activation or starting method is the same as the starting method by the edit image supplier 402. The actual data transmission/reception is executed by the document supplier 401, and the transmission/reception data is exchanged between the document supplier 407 and local transmission/reception controller 703 via RAM 1002. The transmission/reception controller is stopped when one message is processed.

At Step S3601 shown in FIG. 36, the center transmission/reception controller 407 uses CPU to analyze a reception message received from the document analyzer 401 via RAM 1002 to thereby check the contents of the message.

At Step S3602 the center transmission/reception controller 407 checks whether the contents of the message checked at Step S3601 correspond to the message requesting the transmission/reception box directory name and transmitted at Step S3501 shown in FIG. 35. If the message requests the directory name, the flow advances to Step S3603, whereas if not, the flow advances to Step S3604.

At Step S3603 by using the server ID of the message sender image server 111 or print server 121 contained in the message analyzed at Step S3601, the center transmission/reception controller 407 checks the same directory name in the receiver-sorted transmission box 3002 and the same directory name in the transmitter-sorted reception box 3102 as the directory name of the server ID, and responds to the document supplier 401 by passing the checked directory name to the document supplier 401 via RAM 1002.

At Step S3604, the center transmission/reception controller 407 checks whether the contents of the message checked at Step S3601 correspond to the message notifying the file transmission completion and transmitted at Step S3505 or S3508 shown in FIG. 35A. If the message notifies the file transmission completion, the flow advances to Step S3605, whereas if not, the flow advances to Step S3609.

At Step S3605, the center transmission/reception controller 407 adds the transmission control information data contained in the message analyzed by CPU at Step S3601 to the reception control information table 3104.

At Step S3606, the center transmission/reception controller 407 checks the transmission data file name 3202 in the transmission control information data contained in the message analyzed by CPU at Step S3601. If the value is not in the transmission data file name, the flow advances to Step S3606, whereas if there is a value in the transmission data file name, the process is terminated.

At Step S3607 the center transmission/reception controller 407 reads the transmission data file 3105 designated by the transmission file name 3201 in the transmission control information data contained in the message analyzed by CPU at Step S3601 and writes it in RAM 1002 to analyze the contents thereof and extract all the transmission tags such as represented by the <REG> tag shown in FIG. 13. Next, by using each value of the transmission data tags, the processor information table 3103 is searched to extract the processor information data having the same transmission data tag name 3301 in the processor information table 3103 as the value of the extracted transmission data tag, and thereafter, the corresponding processor is activated in accordance with the processor starting method 3302 and delivery data information 3303 in the processor information data.

At Step S3609 it is checked whether the contents of the message checked at Step S3601 correspond to the message notifying a file reception completion and transmitted at Step S3512 or S3515 shown in FIG. 35B. If the message notifies a file reception completion, the flow advances to Step S3610, whereas if not, the process is terminated.

At Step S3610 by using the transmission file name 3201 in the transmission control information data contained in the message analyzed at Step S3601, the reception control information table is searched to write a present date/time in the transmission completion date/time of the corresponding transmission control information data.

At Step S3611, the transmission control information table 3003 of the receiver-sorted transmission box 3002 for the server ID of a message transmitter contained in the message analyzed at Step S3601 is searched to delete the transmission control information data having the transmission completion date/time 3205 older by a predetermined period from the present time, from the transmission control information table 3003, and also to delete the transmission data file 3004 or image file 3005 designated by the transmission file name 3201 of the transmission control information data. The transmission control information data and each transmission file are not deleted immediately after the transmission completion because it may become necessary to transmit them again when a transmission trouble occurs.

The center transmission/reception controller 407 may be made always resident on RAM 1002 so that direct data transmission/reception relative to the local transmission/reception controller 603 or local transmission/reception controller 703 becomes possible without intervening the document supplier 401. In this case, data transmission is monitored and when data is received, the process of the flow chart shown in FIG. 36 is executed and thereafter data transmission is monitored. Such a process is repeated.

Second Embodiment

Figure 37:
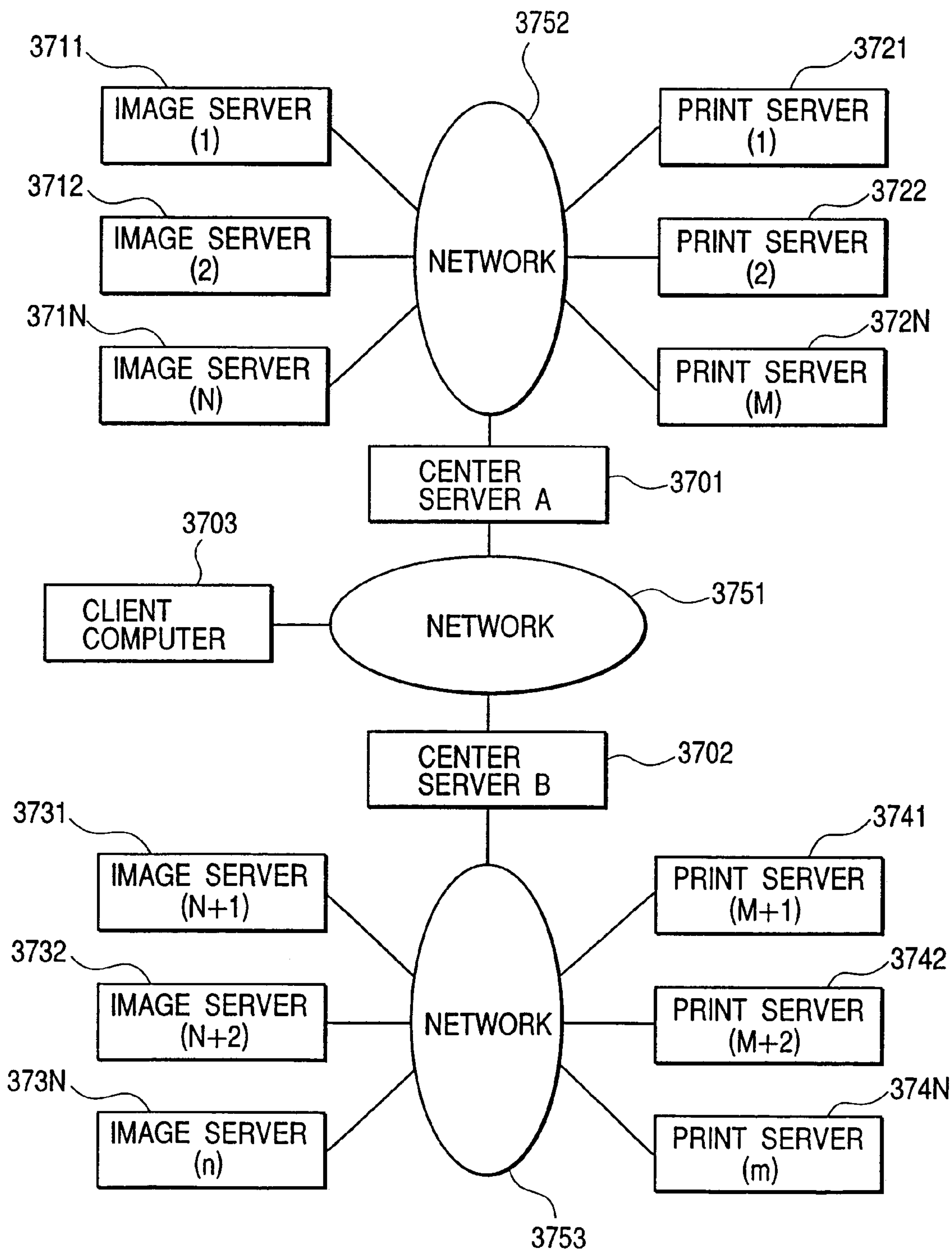
FIG. 37 is a diagram showing a system structure according to a second embodiment of the invention.

FIG. 37 is a block diagram showing the system structure according to the second embodiment of the invention. This embodiment is constituted of a plurality of systems of the first embodiment which are interconnected by networks. Even if a print order placed by one center server contains the image ID of an image at a print server or image server under management of another center server, it is possible to collect print original images designated by the image ID and print a document of the print order.

In FIG. 37, reference numerals 3701 and 3702 represent a center server which is similar to the center server 102 of the first embodiment. The center server 3701 is called a center server A, and the center server 3702 is called a center server B.

Reference numeral 3703 represents a client computer similar to the client computer 101 of the first embodiment.

Reference numerals 3711, 3712, 371N, 3731, 3732 and 373N represent an image server similar to the image server 111 of the first embodiment.

Reference numerals 3721, 3722, 372N, 3741, 3742 and 374N represent a print server similar to the print server 121 of the first embodiment.

The server Ides of the image servers 3711, 3712, 371N and print servers 3721, 3722 and 372N are stored in the server management table 413 of the center server A 3701.

The server Ides of the image servers 3731, 3732, 373N and print servers 3741, 3742 and 374N are stored in the server management table 413 of the center server B 3702.

Reference numerals 3751, 3752 and 3753 represent a network similar to the network 103 of the first embodiment. In FIG. 37, although the networks 3751, 3752 and 3753 are shown physically discrete, they may be a physically single network.

The embodiment may be reduced in practice even if four or more center servers are connected to the network.

In this embodiment, it is assumed that each center server has information of the names and connection methods of the other center servers. It is therefore possible for a client computer 3703 to acquire edit images from the center server A 3701 and place a print order of a document generated by using the edit images to the center server B 3702 which prints the document of the print order.

First, the client computer 3703 is connected to the center server A 3701. Edit images are acquired and a print document is edited by executing the order placing process at Steps S1801 to S1806 shown in FIG. 18 of the first embodiment.

Next, the client computer 3703 is connected to the center server B 3702. A print order is placed to the center server B 3702 by executing the order placing process at Step S807 and following Steps. The center server B 3702 takes the print order by executing the order taking process described with reference to FIG. 19 of the first embodiment.

Next, the center server B 3702 executes the print image collecting process described with reference to FIG. 20 of the first embodiment. In this case, if the center server name 911 of the image ID contained in the print order is not the same as the name of the center server B 3702, the image acquisition request transmission data as indicated at 1314 shown in FIG. 13 is transmitted to the center server designated by the center server name 911, for example, the center server A 3701. This transmission process is executed by using the center transmission/reception controller 407.

The center transmission/reception controller 407 of the center server A 3701 received the image acquisition request transmission data activates the order taker 403 to pass the image acquisition request transmission data to the image collector 405. By using the image acquisition request transmission data, the image collector generates a new print order having as the additional information the name of the center server of the transmitter of the image acquisition request transmission data, stores it in the order status table 415 and order management table 416, and thereafter activates the image collector 405.

The image collector 405 of the center server A 3701 executes the print image collecting process described with reference to FIG. 20 of the first embodiment, and after all the print images are collected, activates the order progress manager 406.

If the name of the center server of the transmitter of the image acquisition request transmission data is contained as the additional information in the print order to be processed, the order progress manager generates the original image transmission data as indicated at 1317 in FIG. 13 by using the print original images for the print order, and transmits the original image transmission data and print original images to the transmitter center server designated by the print order data, by using the center transmission/reception controller 407. After the transmission, the print completion process described with reference to FIG. 28 of the first embodiment is executed.

The center server B 3702 received the original image transmission data executes the processes from the image reception process to the print completion process described with reference to FIGS. 24 to 28 of the first embodiment, to thereby print the document of the print order placed by the client computer 3703.

According to the second embodiment of the invention described above, the storage and data transmission/reception controller are provided. The storage manages the transmission/reception data as a combination of the transmission/reception control information data of an SGML format and the transmission data such as image files. The data transmission/reception controller transmits and receives data asynchronously in a manner that the network connecting side such as an output apparatus positively processes data, in response to a transmission request from each transmission/reception requestor such as a software program when the transmission/reception control data and transmission data is transmitted and received. Accordingly, even in an environment such as a dial-up connection not always connected to the network, a large amount of data such as print data can be transmitted and received at the same time.

A manager for storing data transmission/reception history in the storage and the data transmission/reception controller having a function of transmitting/receiving only the data still not transmitted/received when the transmission/reception resumes after the transmission/reception failure by using the data transmission/reception history, are provided. Accordingly, even in an unstable network environment such as mobile communications, the dial-up connection can be used reliably.

Third Embodiment

In the third embodiment of the invention, the system structure to be described later is added to the system structure of the first embodiment, so that a list of print orders placed to the center server 102 by a user of the client computer 101 can be searched to modify or delete an order. It is also possible to return the order received by the print server 121 to the center server 102.

Figure 38:
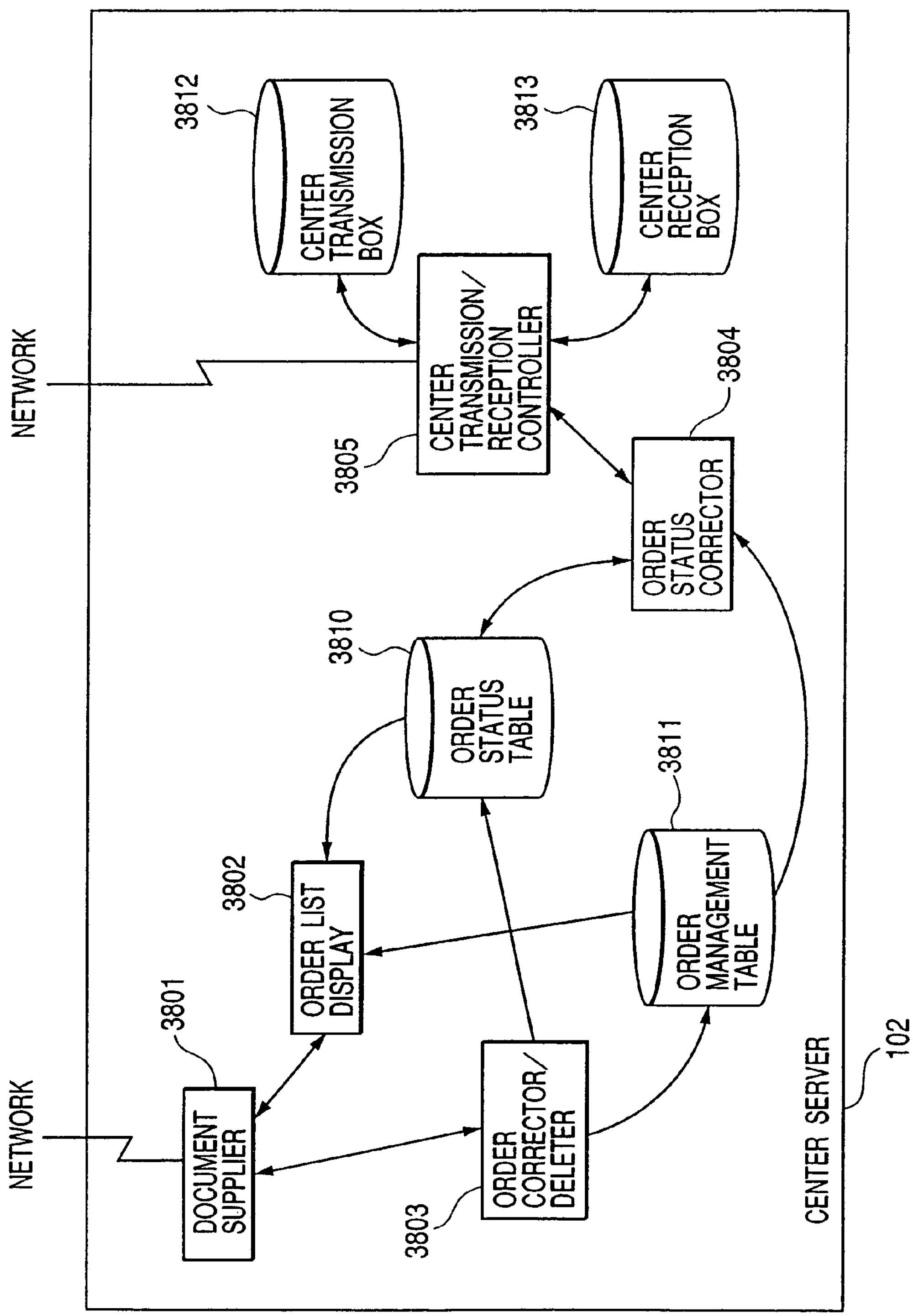
FIG. 38 shows the module structure of a center server according to a third embodiment of the invention.

FIG. 38 is a diagram showing the system structure obtained by adding processing components necessary for the third embodiment to the center server 102 described with reference to FIG. 4. In FIG. 38, components 404, 405, 406, 412, 413, 414, 411 and 417 shown in FIG. 4 are not shown because these components have no important meanings in terms of the embodiment description. The components 3801, 3810, 3811, 3805, 3812, and 3813 shown in FIG. 38 are similar to the components 401, 415, 416, 407, 418 and 419 shown in FIG. 4. The added processing components 3802, 3803 and 3804 are application programs which are read from ROM 1003, HDD 1009 or FDD 1010 and developed onto RAM 1002 to make them usable, similar to each processing component shown in FIG. 4.

An order list display 3802 is an application program which searches print order data requested by the client computer 101 from an order management table 3811 and order status table 3810 and transmits the searched print order data to the client computer 101 via a document supplier 3801.

An order corrector/deleter 3803 is an application program which receives a correction request, a deletion request or the like transmitted from the client computer 101 and executes the correction/deletion process for the order data.

An order status corrector 3804 is an application program which analyzes a return order data file 4501 acquired from the print server 121 to be described later and updates the order status table 3810.

<Print Server>

Figure 39:
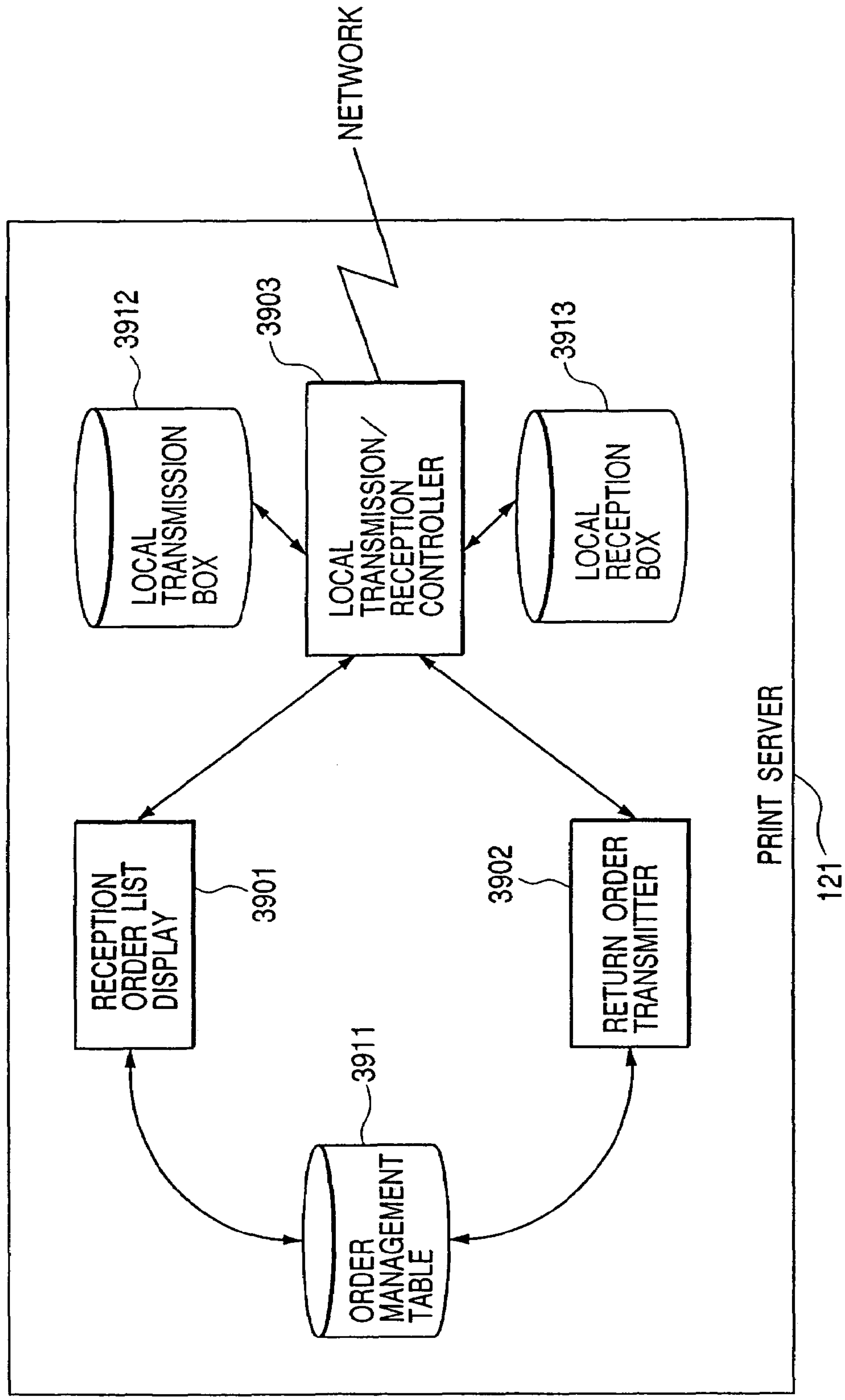
FIG. 39 shows the module structure of a print server according to the third embodiment of the invention.

FIG. 39 is a diagram showing the system structure obtained by adding processing components necessary for the third embodiment to the print server 121 described with reference to FIG. 7. In FIG. 39, components 701, 702, 704, 705, 712, 715, and 716 shown in FIG. 7 are not shown because these components have no important meanings in terms of the embodiment description. The components 3903, 3911, 3912, and 3913 shown in FIG. 39 are similar to the components 703, 711, 712 and 713 shown in FIG. 7. The added processing components 3901 and 3902 are application programs which are read from ROM 1003, HDD 1009 or FDD 1010 and developed onto RAM 1002 to make them usable, similar to each processing component shown in FIG. 7.

A reception order list display 3901 is an application program which acquires a list of print order data stored in an order management table 3911 in response to a request entered from an input means such as KB 1008 and displays the list on CRT 1006 of the print server 121.

A return order transmitter 3902 is an application program which executes a process of returning selected print order data to the center server in response to a request entered from the input means such as KB 1008.

The phrase "return an order" used in the description of the embodiment means to return print order data received for printing at the print server 121 from the center server 102 to the center server 102 to make it a state still not received.

<List Display Process>

Figure 40:
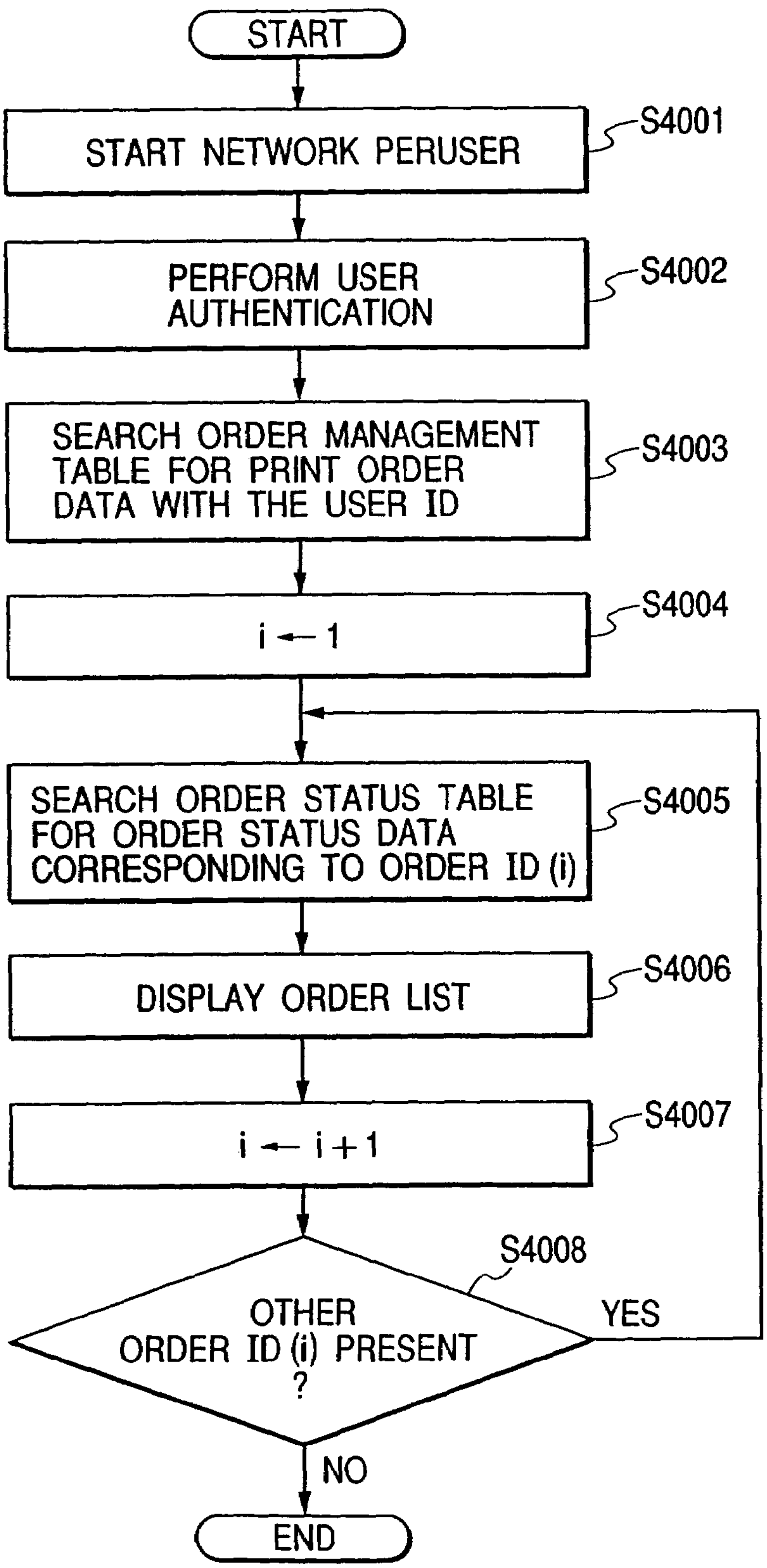
FIG. 40 is a flow chart illustrating a process of displaying a user order list to be executed by the center server.

FIG. 40 is a flow chart illustrating the process contents to be executed by the order list display 3802. A process of displaying a list of orders placed by a user will be described with reference to FIG. 40.

A user of the client computer 101 communicates with the document supplier 3801 of the center server 102 by using the network browser 503, and the order list display 3802 is read from HDD 1009 or the like and developed onto RAM 1002 to make it usable. After the user information passed from the client computer 101 is checked, the print orders presently placed and stored in the order management table 3811 in HDD 1009 are displayed on CRT 2008 by using the network browser 502 of the client computer 101. As the transmission protocol used between the client computer 101 and center server 102 and the data exchange means used by the client computer 101, those similar to those used during the order placing process described with reference to FIG. 18 are used.

Steps S4001 and S4002 are the same as the order placing process at Steps S1801 and S1802 described with reference to FIG. 18. Also in this case, if authentication of the user is failed, the flow does not advance to the next Step.

At Step S4003 the contents of print orders presently placed by the user authenticated at Step S4002 are displayed on the client computer 101. First, the print order data having the same value as the user ID is searched from the order management table 3811. The searched print order data is stored in RAM 1002.

In the following description, the data to be processed is represented by using an index i. The print order under processing is represented by "print order data (i)", and the order status data is represented by "order status data (i)". The order ID in the print order data is represented by "order ID (i)".

At Step S4004 the index i is initialized to "1" in order to sequentially process the print order data.

At Step S4005 the order status data matching the order ID (i) stored in RAM 1002 is searched from the order status table 3810. The searched data is stored in RAM 1002.

At Step S4006 the print order data (i) and order status data (i) stored in RAM 1002 are transmitted to the document supplier 3801. The client computer 101 displays them in a user order confirmation window to be described later of CRT 2006, by using the network browser 502.

At Step S4007 the index is incremented by "1" to prepare for the next print order data.

At Step S4008 it is checked whether the order ID (ii) exists in RAM 1002. If exists, the flow returns to Step S4005, whereas if not, the process is terminated.

<User Order Confirmation Window>

Figure 41:
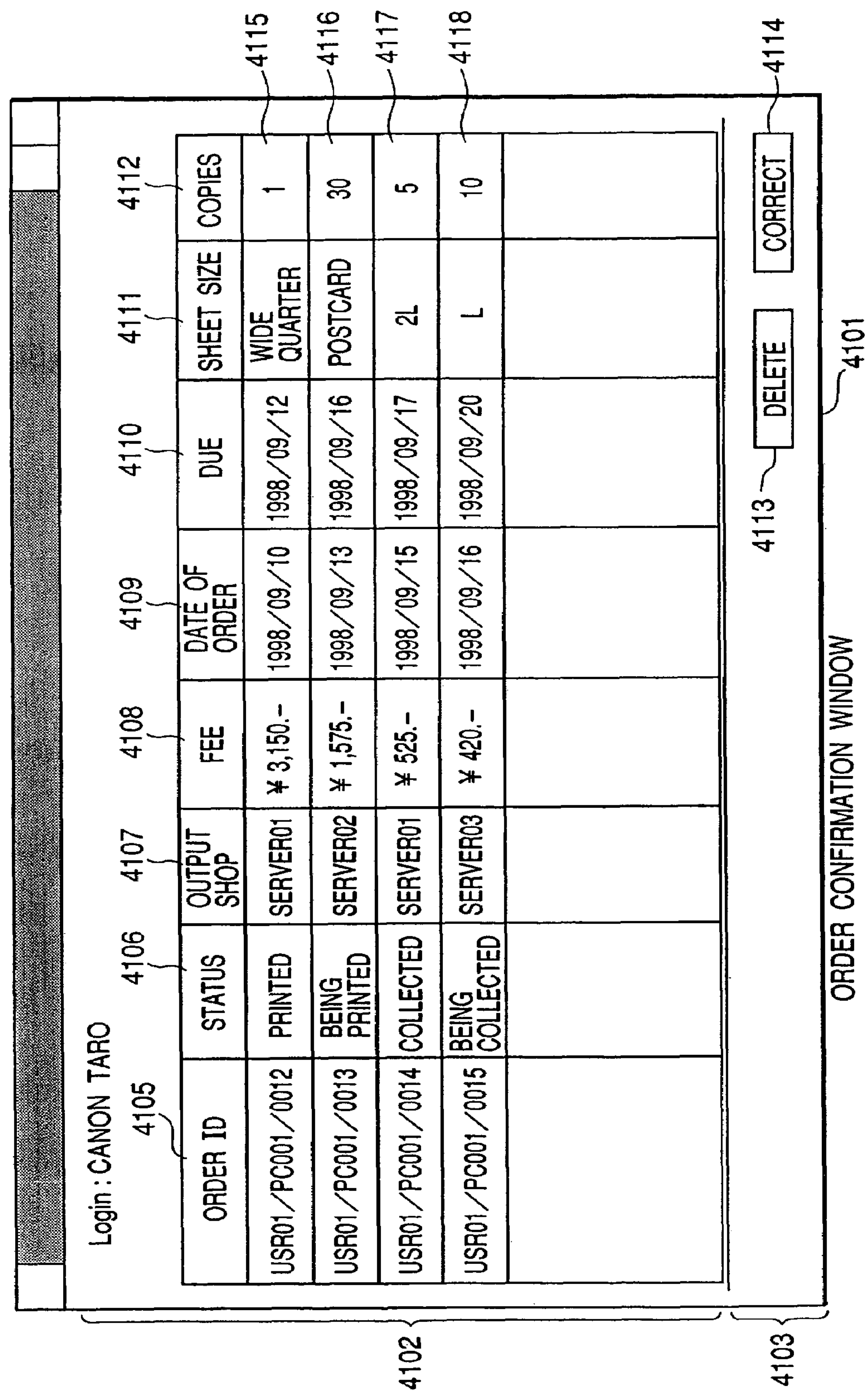
FIG. 41 shows a user order confirmation window displayed on a client computer.

FIG. 41 shows an example of the user order confirmation window used by the embodiment. A user order confirmation window 4101 is used for displaying a list of print order data presently placed by the user. The user order confirmation window 4101 is divided into an order contents display area 4102 and an order contents change activation area 4103.

During the above-described user order list display process, data is transmitted from the center server 102 to the network browser 502 of the client computer 101 by using the transmission protocol such as Hyper Text Transfer Protocol (HTTP). The transmitted data is displayed on CRT so as to make the user confirm it.

In the order contents display area 4102, information 4104 to 4112 of one print order can be displayed.

Reference numeral 4104 represents the information such as a user name with which the user of the client computer can be identified.

Reference numeral 4105 represents an order ID 902 for identifying the order acquired from the order management table 3811 of the center server 102.

Reference numeral 4106 represents a status 204 acquired from the order status table 3810 of the center server 102.

Additional data, if any, of the print order data is displayed as the information 4107 to 4112. For example, the information includes an output shop name, a fee, a date of order, a due date, a sheet size, and copies.

Examples of display data in the order contents display area 4102 are shown at 4115 to 4118. Each order can be selected by using the input means such as KB 2008 and a pointing device.

The order contents change area 4103 is used for displaying means for activating a correction process, a deletion process and the like for the print order data presently placed. In this embodiment, by an input operation from KB 2008 of the client computer 101 or the like, a process is requested to the center server 102 by the network browser 502 by using the transmission protocol HTTP.

Buttons 4113 and 4114 are used respectively for activating a deletion process and a correction process for the print order data. When the process is activated, the selected print order data and the activation type (deletion or correction) are transmitted to the center server.

The center server 102 stores the transmission data received via the document supplier 3801 in RAM 1002, and activates an order corrector/deleter 3803 to be described later.

<Order Corrector/Deleter>

Figure 42:
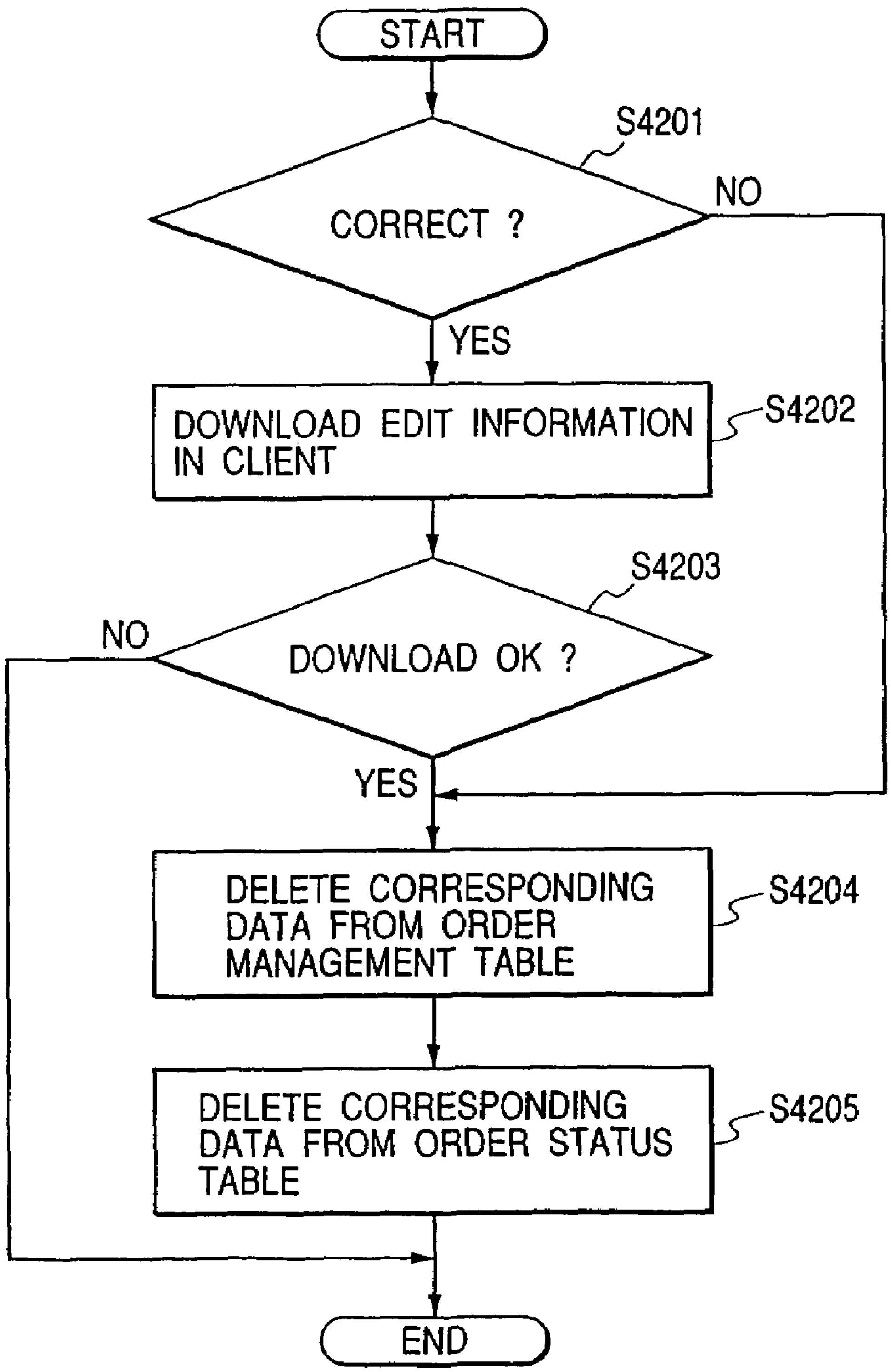
FIG. 42 is a flow chart illustrating an order correct/delete process to be executed by the center server.

FIG. 42 is a flow chart illustrating the process to be executed by the order corrector/deleter. Data transmission between the client computer 101 and center server 102 is performed by using the transmission protocol such as Hyper Text Transfer Protocol (HTTP) and File Transfer Protocol (FTP).

In this embodiment, when a user executes a correction process or a deletion process for print order data, the user order confirmation window 4101 displayed on CRT 2006 of the client computer 101 is used as described previously. The client computer 101 transmits information entered from the input means such as KB 2008 to the document supplier 3801 of the center server 102 by using the network browser 502. The center server stores the data supplied from the client computer 101 in RAM 1002, reads the order corrector/deleter 3803 from a storage medium such as HDD 1009 and develops it onto RAM 1002 to make the application program usable. The order corrector/deleter 3803 executes the process by judging the process type such as correction and deletion from the data supplied from the client computer 101 and stored in RAM 1002.

At Step S4201 the process type requested from the client computer 101 is discriminated by reading it from RAM 1002. If the process type is not "correction", the flow advances to Step S4204 without executing Steps S4202 and S4203.

Step S4202 is executed only if it is judged at Step S4201 that the discriminated process type is "correction". The print order data transmitted from the client computer 101 and stored in RAM 1002 is read and the additional information of the print image in the print order data is edited and stored in a storage medium such as HDD 1009 as a temporary file. This file is transmitted from the center server 102 to the client computer 101 by using the transmission protocol such as FTP. The client computer 101 received the temporary file refers to the edit information in the temporary file to again execute the order placing process described with reference to FIG. 18 to thereby correct the print order data.

At Step S4203 it is judged whether the transmission file at Step S4202 was correctly received at the client computer 101. If not, the following Steps are not executed and the process is terminated.

At Step S4204 the order ID in the print order data stored in RAM 1002 is read to delete all the data relevant to the order ID from the print order data stored in the order management table 3811 of the center server 102.

At Step S4205 all the data relevant to the order ID is deleted from the order status data stored in the order status table 3810 of the center server 102.

<Reception Order List Window>

Figure 43:
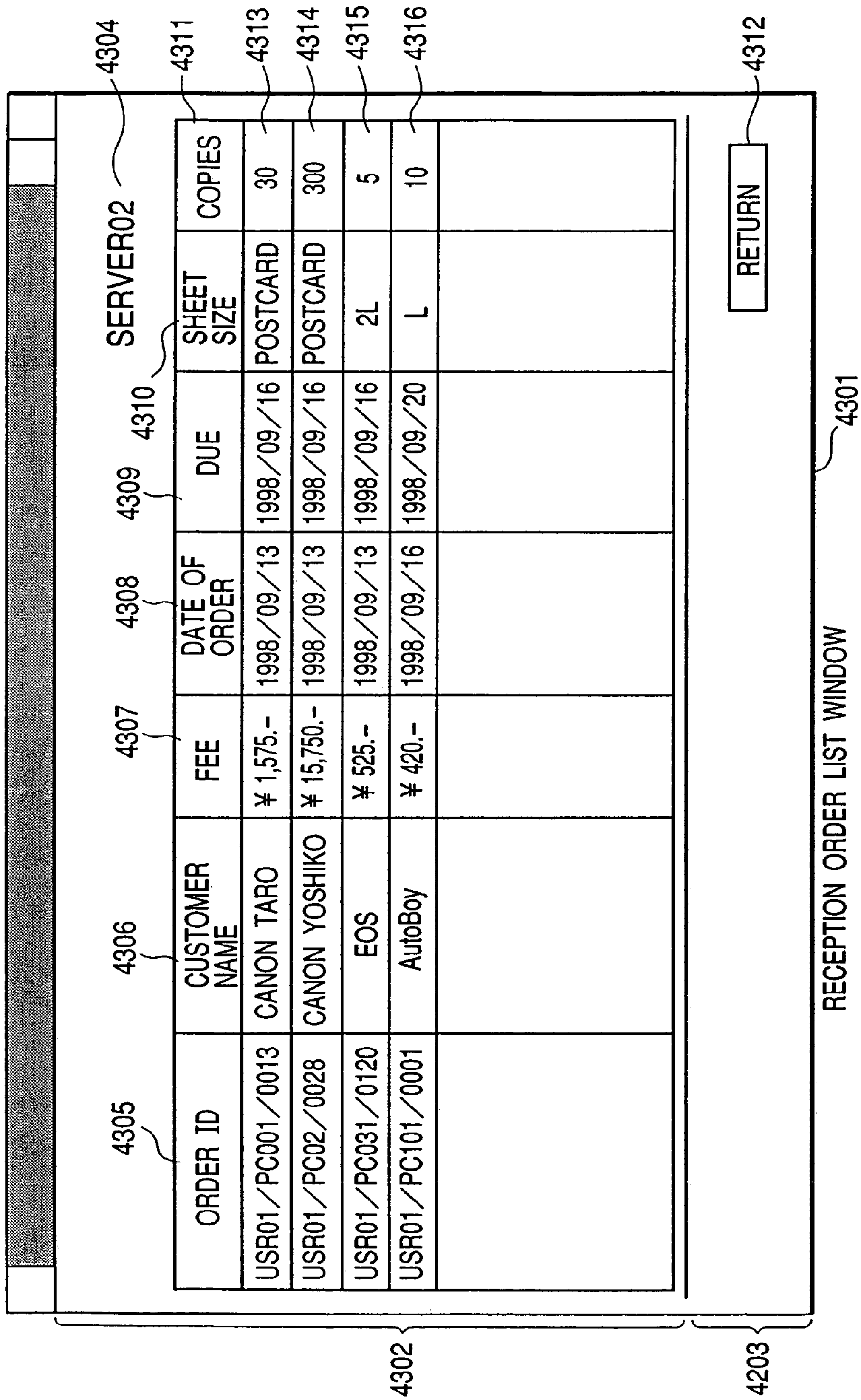
FIG. 43 shows a reception order list window displayed at the print server.

FIG. 43 shows an example of a reception order list window. The reception order list window 4301 is divided into a reception order data display area 4302 and a reception order process activation area 4303.

A process will be described, in which process an operator displays all the print order data presently received from the center server 102 on CRT 1006 of the print server and confirms the order taking status at the print server. It is assumed that the print order data 801 received from the center server 101 is already stored in the order management table 3911 of the printer server 121 by the local transmission/reception controller 3803.

In response to an operation from the input means such as KB 1008, the reception order list display 3901 of the print server 121 is read from ROM 1003, HDD 1009 or FDD 1010 and developed onto RAM 1002 to make it executable. The order list display 3901 searches all the print order data stored in the order management table 3911 and writes them in RAM 1002. The read print order data is displayed on CRT 1006 to notify it to the operator.

In the reception order data display area 4302, data items 4304 to 4311 can be displayed.

Reference numeral 4304 represents a name of the print server 121 which received orders.

Reference numeral 4305 represents an order ID of the print order data written into RAM 1002 from the order management table 3911 of the print server 121.

Reference numeral 4306 represents user information in the print order data written into RAM 1002 from the order management table 3911 of the print server 121.

Additional data, if any, of the print order data is displayed as the information 4307 to 4311. For example, the information includes a fee, a date of order, a due date, a sheet size, and copies.

Examples of display data in the reception order data display area 4302 are shown at 4313 to 4316. Each order can be selected by using the input means such as KB 1008 and a pointing device.

The reception order process activation area 4303 is constituted of a button for activating a process for presently received print order data. By an input operation from KB 1008 or the like, a designated process is activated. In this embodiment, a return button 4312 is displayed in this area to activate a return process to be described later.

<Return Order Transmission Process>

Figures 44, 45:
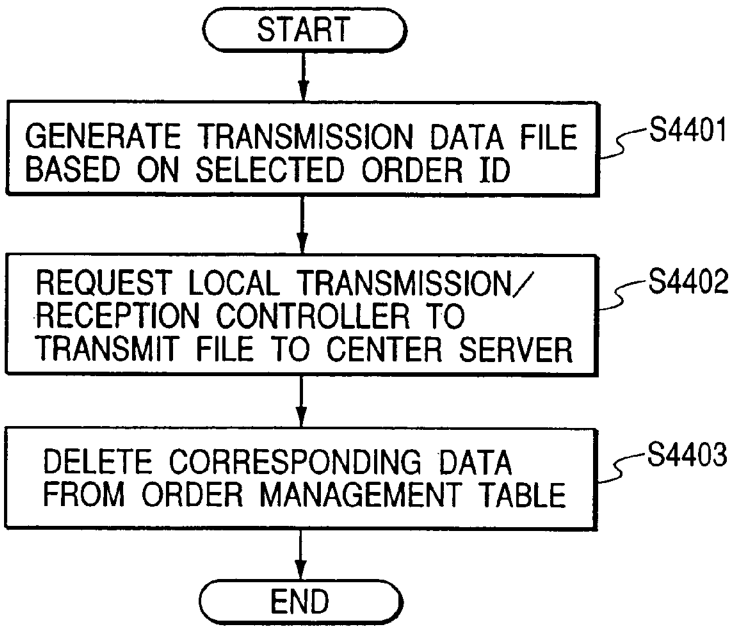
FIG. 44 is a flow chart illustrating a return order transmission process to be executed by the print server.
FIG. 45 shows an example of a script used for a return order reception process.

FIG. 44 is a flow chart illustrating a return order transmission process.

In this embodiment, the return order transmitter 3902 is activated by using the button 4312 of the reception order list window 4301. In this case, the order ID transmitted when the button 4312 is activated is stored in RAM 1002. The return order transmitter application program is read from ROM 1003, HDD 1009 or FDD 1010 and developed onto RAM 1002 to make it usable.

At Step S4401 the order ID stored in RAM 1002 is read, and a temporary file having an order return transmission data file format to be later described with reference to FIG. 45 is generated and stored in RAM 1002.

At Step S4402 the order return transmission data file stored in RAM 1002 at Step S4401 is stored in the local transmission box 3912 of HDD 1009. A file transmission request to the local transmission/reception controller 4303 is performed by the process of storing a file in the local transmission box 3912.

At Step S4403 all the data relevant to the order ID stored in RAM 1002 is deleted from the order management table 3911 in HDD 1009 of the printer server 121. With this process, the print server 121 takes the original state before the order is received.

<Return Order Process Transmission Data Format>

FIG. 45 shows the transmission data format to be used for the return process of this embodiment. This data is transmitted and received between the print server 121 and center server 101.

The transmission data format used in this embodiment uses "Standard General Mark-up Language" (SGML) of ISO 8879 similar to that shown in FIG. 13. Similar to that shown in FIG. 13, the transmission file stores tags representative of various transmission data contents in an area between the start tag <CAML> and end tag </CALM>. The transmission/reception header transmission data 1311 is omitted in FIG. 45 because the same data is also used in this embodiment.

As indicated at 4501, a return order ID which is used when the print server 121 requests the center server to execute the return process is written in an <ORDER> tag, and OPE="CANCEL" representative of the return process is written in the "ORDER" tag.

<Return Order Reception Process>

Figure 46:
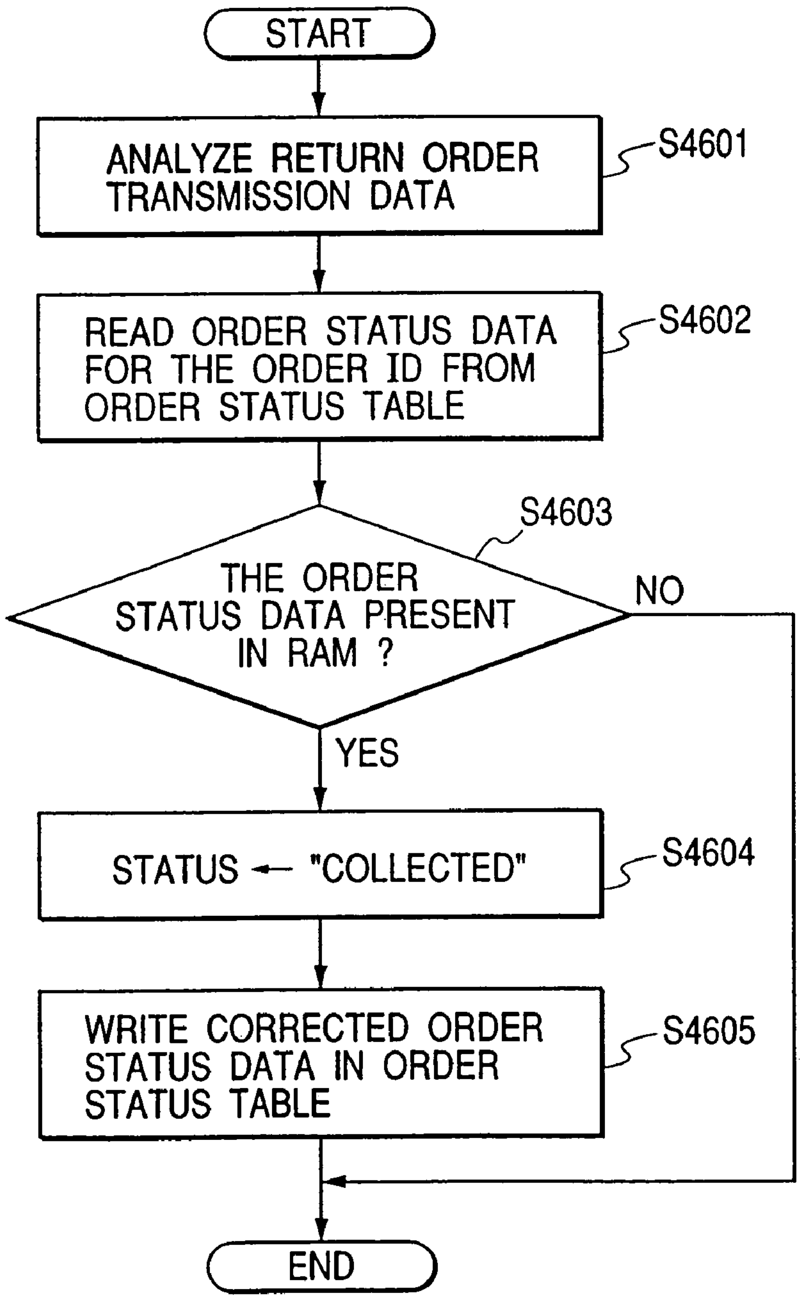
FIG. 46 is a flow chart illustrating a return order reception process to be executed by the center server.

FIG. 46 is a flow chart illustrating the return order reception process to be executed by the order status corrector 3804. This process will be described with reference to FIG. 46.

The return transmission/reception data generated by the return order transmission process executed by the print server 121 is transmitted via the local transmission/reception controller 3903 to the center server 102 and received by the center transmission/reception controller 3805 of the center server 102. Upon reception of the return order transmission data, the center transmission/reception controller 3805 stores it in the center reception box 3813 as a return transmission data file. Next, the order status corrector is read from ROM 1003, HDD 1009 or FDD 1010 and developed onto RAM 1002 to make it usable and pass the file name of the return order transmission data file stored in the center reception box 3813 to the order status corrector 3804. The order status corrector 3004 analyzes the return order transmission data file to update the order status table 3810.

At Step S4601 the order status corrector writes the return order transmission data file passed from the center transmission/reception controller 3805 into RAM 1002 and analyzes the contents thereof to store the order ID in the file in RAM 1002.

At Step S4602 the order status data containing the order ID stored at Step S4601 is read from the order status table 3810 and written in RAM 1002.

At Step S4603 it is checked whether the order status data read at Step S4602 exists in RAM 1002. If it does not exist, the process is terminated.

At Step S4604 the status 204 of the order status data written in RAM 1002 is corrected to "image collected"

At Step S4605 the data stored in the order status data before this process is replaced by the corrected order status data in RAM 1002.

According to this embodiment, the image collecting apparatus is provided with: the order taker for taking and analyzing a print order placed by a user; the edit image supplier for storing edit images selected by the user for editing a print image and supplying only usable images to the user; the original image position manager having a function of managing keeping locations of print original images; the image collector for selecting the keeping location having the smallest image data transmission cost among the keeping locations of print original images necessary for printing the print order and transmitting an image acquisition request; and the order progress manager for transmitting the print order to the print controller when all images are collected and deleting unnecessary temporarily stored images when a print completion notice is received from the print controller; wherein the function of transmitting print original images in response to an image acquisition request from the image collector of the print controller; the function of analyzing the print order transmitted from the image collecting apparatus and printing the print order; and the function of transmitting the print completion notice when the print order is printed, are provided. Accordingly, it is possible to provide an image collector/transmitter with the smallest cost without lowering user service contents such as selection of an output server.

The order list display for displaying a list of print order status after a user places print orders is also provided. Therefore, the user can confirm the present status of print orders placed by the user.

The order collector/deleter for allowing a user to correct/delete a print order is also provided. Therefore, even if a print server is changed, it is easy to change the number of copies and the like so that a simple order miss can be avoided. The work amount of the user entered an erroneous order can be reduced.

The return order transmitter allowing the printer server to execute a return order process is also provided. Therefore, if a print order received from the center server cannot be printed because of any operation trouble, the print order can be returned to the center server and a user can change an output server if necessary.

Fourth Embodiment

In this embodiment, during the data reception process described with reference to FIGS. 35A and 35B of the first embodiment, the operator selects the data in accordance with the data amount, the number of copies, sheet size, and due date in the reception data list. Also in this embodiment, the operator sets standard reception maximum amounts such as the total data amount, the total reception time, and the total number of copies, and data can be automatically received in the order of earlier due date.

Figure 47:
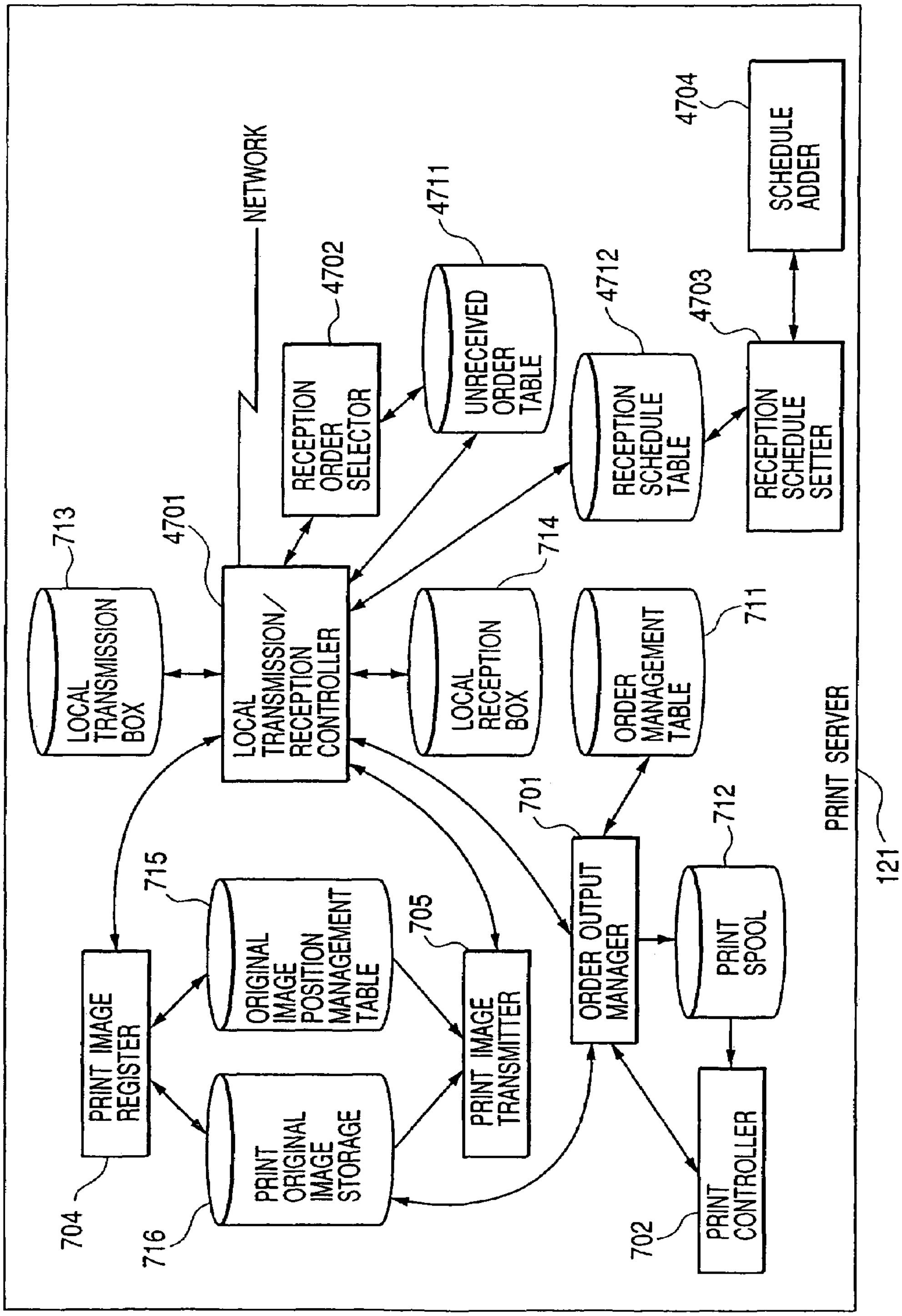
FIG. 47 is a diagram showing a system structure according to a fourth embodiment of the invention.

FIG. 47 is a diagram showing the system structure according to the fourth embodiment of the invention. Components 701, 702, 704, 705, 711 to 716 are similar to those of the first embodiment shown in FIG. 7.

Application programs 4701 to 4704 shown in FIG. 47 are read from ROM 2003, HDD 2009 or FDD 2010 and developed onto RAM 2002 to make them usable.

The local transmission/reception controller 4701 has the same function of the local transmission/reception controller 703 of the first embodiment shown in FIG. 7, and in addition, a function of storing a list of unreceived orders from the center server 102 in an unreceived order table 4711 and a function of executing a print order reception process in accordance with a schedule registered in a reception schedule table 4712.

A reception order selector 4702 has a function of displaying the list stored in the unreceived order table 4711 on CRT 2006 to allow the operator to select an order from the displayed list to thereby receive the order via the local transmission/reception controller 4701.

A reception schedule setter 4703 is an application program having a function of setting an automatic reception of print orders.

A schedule adder 4704 is an application program having a function of adding a schedule time to the reception schedule setter 4703.

The unreceived order table 4711 is a database or searchable file stored in HDD 2009 and stores unreceived order information received by the local transmission/reception controller 4701.

The reception schedule table 4712 stores information for performing an automatical reception in the form of database to be stored in the HDD 2009 or a retrievable file.

The center server 102 stores the transmission data received via the document supplier 3801 in RAM 1002, and activates an order corrector/deleter 3803 to be described later.

In this embodiment, in the process of selecting a print order to be received, some functions are added to Step S3509 shown in FIG. 35B in order to receive only the order selected by the reception order selector 4702 and the order not exceeding the maximum amounts set by the reception schedule setter. In this process of the embodiment, the local transmission/reception controller 4701 receives at Step S3509 the list of unreceived orders, the operator selects an order to be received, by using the reception order selector 4702, a file of the selected order is requested to the center server 102, which file is stored in the transmission control information table 3003 in the transmitter-sorted reception box 3102 for the print server 121, and only the corresponding order is received from the center server. The data transmission/reception process after Step S3509 is similar to Step S3510 and following Steps shown in FIG. 35B. Namely, the center server transmits the list of print orders to the print server (print shop) and thereafter transmits the print order requested from the print server and the image data used by the print order.

It is therefore possible for the operator to receive the list of unreceived orders from the center server 102 by using the local transmission/reception controller 4701 and then to select a print order to be received from the list and receive it. It is possible to select the print order in accordance with the information such as the data amount, the number of copies and the due date respectively contained in the list of unreceived orders. The details of the reception order selector 4702 will be later given.

It is also possible to set the automatic reception schedule by using the maximum amounts such as the data amount of the print order to be received, the maximum amounts being set by using the reception schedule setter 4703 and schedule adder 4704. The details of the reception schedule setter 4703 and schedule adder 4704 will be later given.

<Reception Order Selector>

Figure 48:
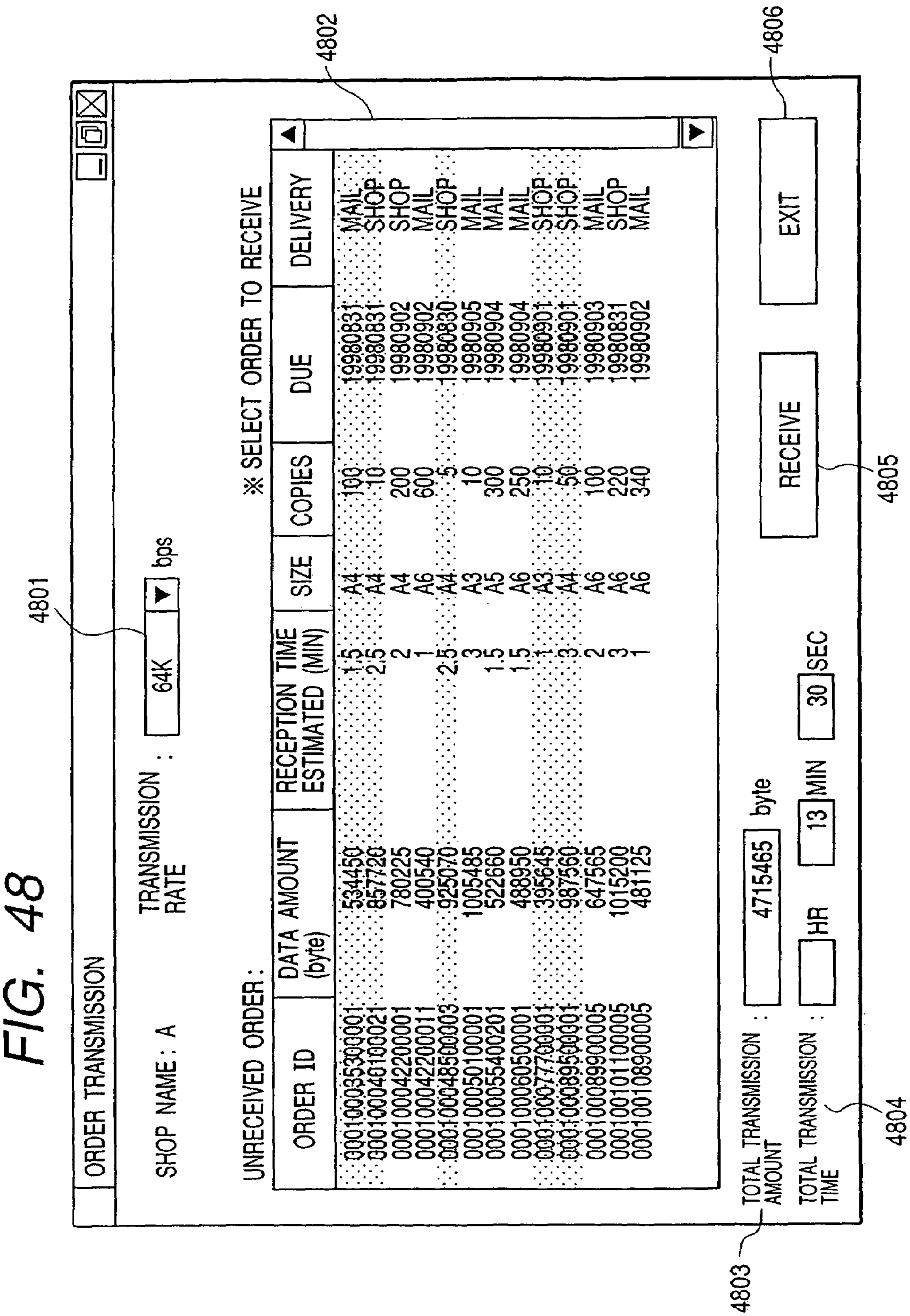
FIG. 48 is a diagram showing an example of a window displayed by a reception order selector of the fourth embodiment.

FIG. 48 shows an example of a window displayed by the reception order selector 4702 on CRT 2006 of the print server 121.

In FIG. 48, reference numeral 4801 represents a transmission rate of the network interconnecting the print server 121 and center server 102. An initial value of the transmission rate is displayed in accordance with the previous reception record or the like. If the transmission rate is changed, this value can be changed by using KB 2008. With this change, a reception time estimated in a list box 4802 is also changed.

In the list box 4802, a list of unreceived print orders are displayed. The displayed contents include reception related information such as data amount and reception time estimated and print related information such as sheet size, the number of copies and a due date. The data amount shows the total amount of data to be transmitted or received and is represented by the unit of byte. The reception time estimated is calculated from the data amount and the transmission rate 4801 and is represented by the unit of minute. The due date is a date the customer wished. A print delivery method is either a delivery at a shop or a mail delivery.

The operator can select an order to be received, by using KB 2008. The selected order is displayed in a highlight state on the unreceived order list 4802. If the highlighted order is again selected, the highlight state is released and the order is unselected.

Reference numeral 4803 represents the total transmission amount of the selected order which amount is represented by the unit of byte.

Reference numeral 4804 represents the total transmission time which is calculated from the total transmission amount 4803 and the transmission rate 4801.

Reference numeral 4805 represents a reception execution button. As this button is selected by using KB 2008, the reception Step S3511 of the first embodiment starts.

Reference numeral 4806 represents an exit button. When this button is selected, the reception order selector is terminated.

As the reception order selector is executed, the list of unreceived orders is received from the center server 102 and displayed on the unreceived order list 4802. The reception time estimated in this list is calculated from the transmission rate 4801. When the operator selects the order to be received and the reception button 4805, the reception is performed.

<Reception Schedule Setter>

Figure 49:
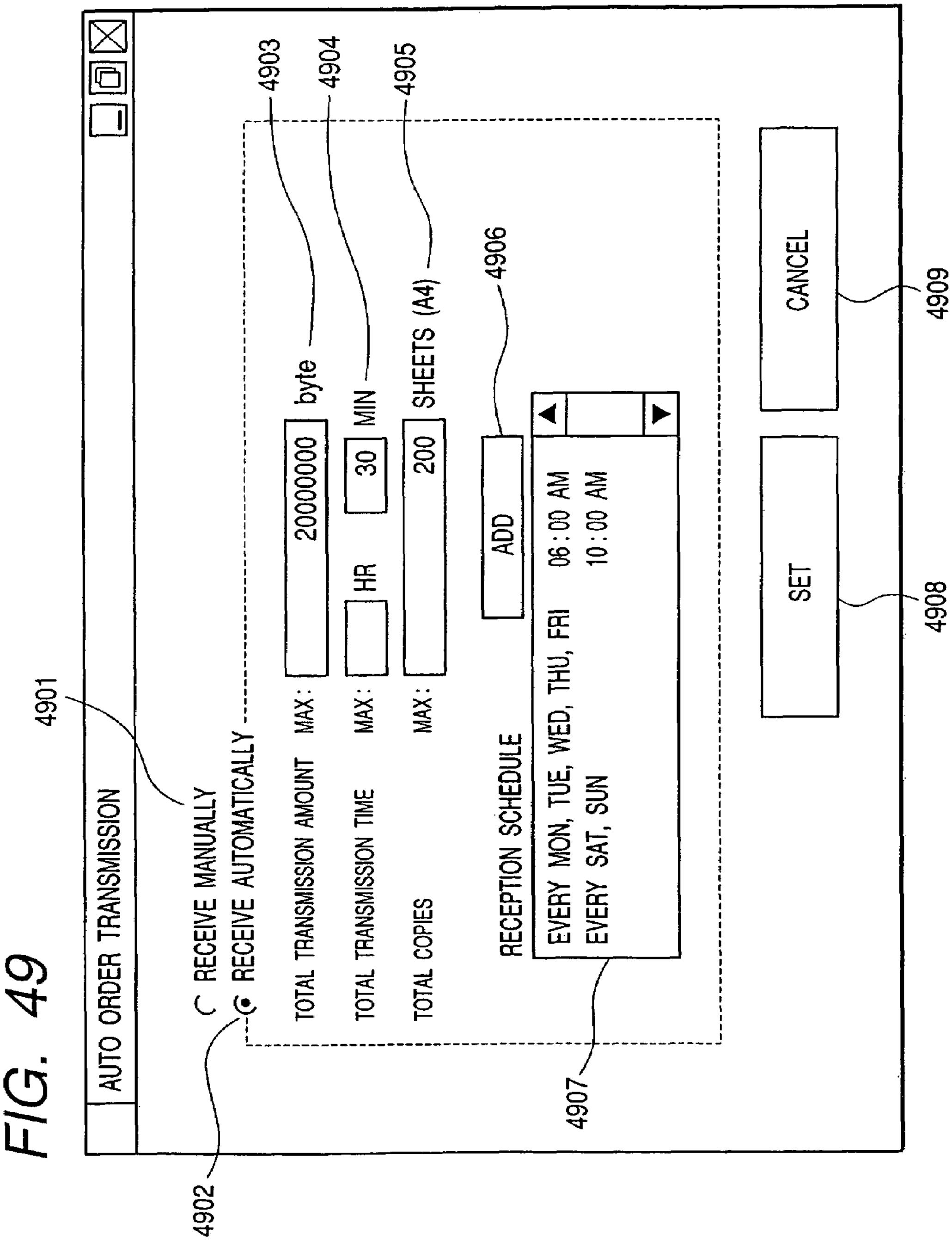
FIG. 49 is a diagram showing an example of a window displayed by an automatic reception setter of the fourth embodiment.

FIG. 49 shows an example of a window displayed by the reception schedule setter.

In FIG. 49, reference numeral 4901 represents a radio button for selecting a manual reception.

Reference numeral 4902 represents a radio button for selecting an automatic reception. When this button 4902 is selected, the setting items under this button can be entered and made effective.

Reference numeral 4903 represents an input area for the total transmission maximum amount which is entered by the operator by using KB 2008 by the unit of byte.

Reference numeral 4904 represents an input area for the total transmission time maximum amount which is entered by the operator by using KB 2008 by the unit of hour and minute.

Reference numeral 4905 represents an input area for the total maximum number of copies which is entered by the operator by using KB 2008 by the unit of A4.

Reference numeral 4906 represents a button for adding a reception execution schedule. When the operator selects this button 4906 by using KB 2008, the schedule adder 4704 is executed.

Reference numeral 4907 represents a list box in which schedules are displayed. The schedule added by the schedule adder 4704 is displayed with a list of times such as dates and days of the week.

Reference numeral 4908 represents a button for saving the settings described above.

Reference numeral 4909 represents a button for cancelling the settings.

<Schedule Adder>

Figure 50:
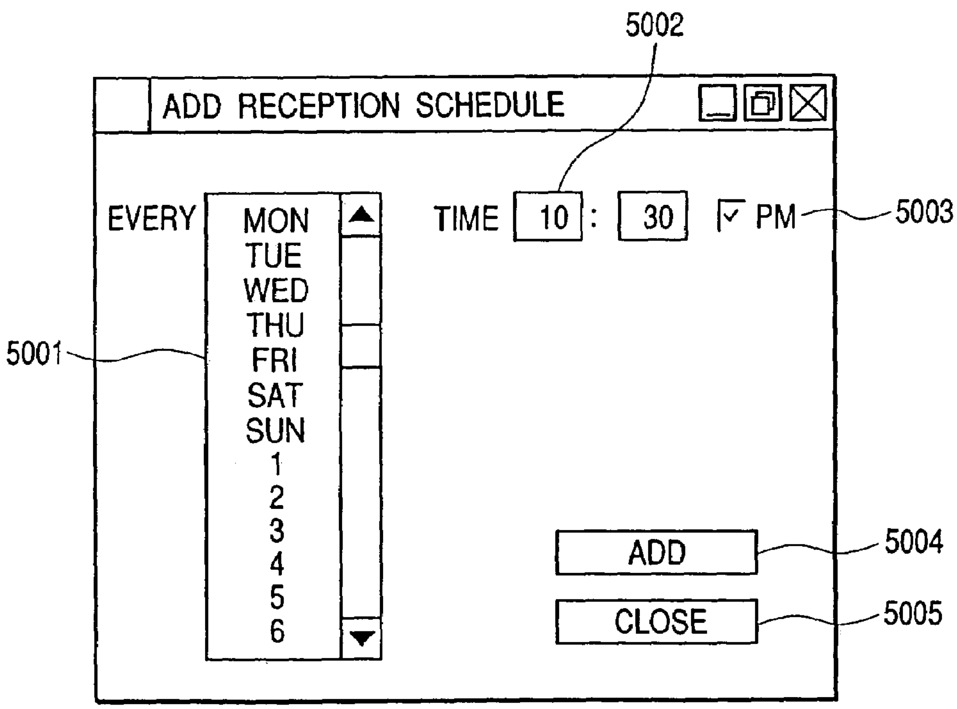
FIG. 50 is a diagram showing an example of a window displayed by an automatic reception schedule setter of the fourth embodiment.

FIG. 50 shows an example of a window displayed by the schedule adder.

In FIG. 50, reference numeral 5001 represents a list box for selecting at what day of the week and at what date the reception is performed. The operator can select a plurality of rows in this list box.

Reference numeral 5002 represents an input area for a reception time.

Reference numeral 5003 represents a check box for selecting either AM or PM. If PM is to be set, the operator checks this box. If AM is to be set, the check is released.

Reference numeral 5004 represents a button for adding the input values in the box 5001, area 5002 and box 503 to the reception schedule box 4907 shown in FIG. 49. As the operator operates upon this button 5004 a plurality of times, the corresponding number of schedules are added to the reception schedule box 4907.

Reference numeral 5005 represents a button for terminating the schedule adder 4704. As the operator operates upon this button 5005, the control is passed to the reception schedule setter 4703.

If the automatic reception is set, the print server 121 receives, on the appointed date, the print order which does not exceeds any of the maximum amounts of the total transmission amount, total transmission time, and the total number of copies.

The order to be received may be determined from a priority order such as the due date.

The operator selects the automatic reception radio button 4902 and enters each maximum value matching the process abilities of the printer server and printer. Then, the date and time of the reception are entered. In order to add a schedule, the box 5001, area 5002 and box 5003 are selected to enter values and set them by using the addition button 5004.

After all values are set, the operator selects the automatic reception execution button 4908 to register the reception schedule to the print server. After this setting, the print order is automatically received at the set time.

If the order is bulky and the due date is today and the order is not received, an alarm line is written in a log file of HDD 2009.

The print server and center server of the fourth embodiment operate as described above.

According to the fourth embodiment, it is possible to provide an image collector/transmitter with the smallest cost without lowering user service contents such as selection of an output server.

A manager for storing data transmission/reception history in the storage and the data transmission/reception controller having a function of transmitting/receiving only the data still not transmitted/received when the transmission/reception resumes after the transmission/reception failure by using the data transmission/reception history, are provided. Accordingly, even in an unstable network environment such as mobile communications, the dial-up connection can be used reliably.

All unreceived orders are not received but only the order selected by the operator is received. Accordingly, reception and print works can be performed efficiently.

The order not exceeding the preset maximum amount such as data amount is received. Accordingly, a more efficient and safe print work is possible.

Fifth Embodiment

In the first and second embodiments, original images or print images are registered from a floppy disk or CD-ROM, i.e., so-called local images are registered without intervening the network.

In the fifth embodiment, the print images are registered from the client computer 101 to the center server 102 via the network. Services similar to the first to fourth embodiments are also realized, and the registered images are provided with the security function to supply the registered images also to the third party, not the owner of the registered images.

<System Structure>

The system structure of the fifth embodiment is the same as the first embodiment, so the description thereof is omitted. The client computer and print server are also the same as those of the first embodiments.

<Center Server>

Figure 51:
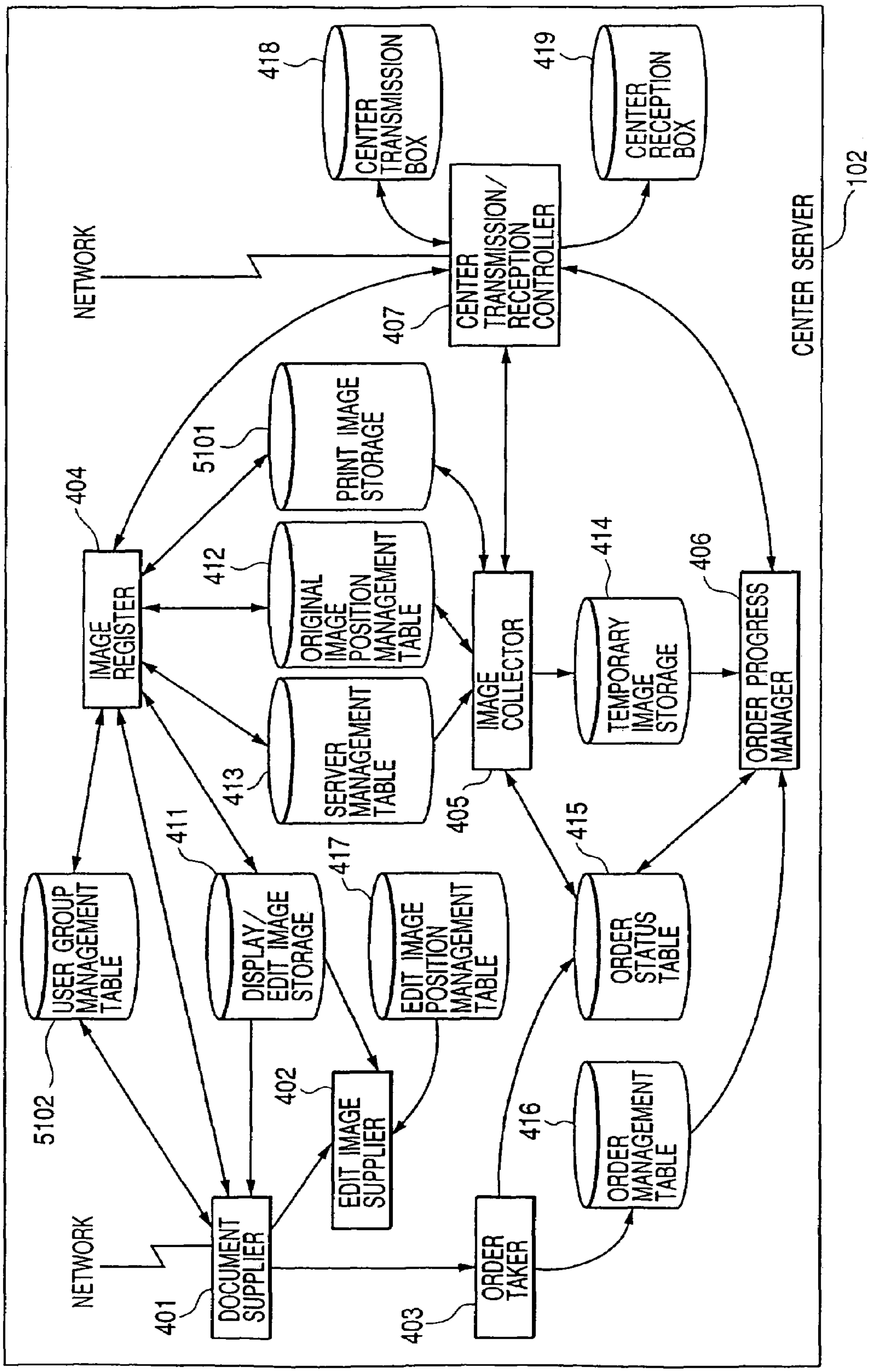
FIG. 51 is a diagram showing a system structure according to a fifth embodiment of the invention.

FIG. 51 is a diagram showing the structure of each processing component and management data of the center server 102. In FIG. 51, like elements to those of the first embodiment shown in FIG. 4 are represented by using identical reference numerals. The elements represented by identical reference numerals are the same as those of the first embodiment, and the description thereof is omitted.

A print image storage 5101 stores images, i.e., a print original image file of a high resolution, supplied from the client computer 101, in a removable disk readable by HDD 1009 or FDD 1010.

A user group management table 5102 manages information of images supplied from the client computer 101, as will be later described with reference to FIG. 52.

In this embodiment, the client computer 101 has a function of adding information to images in the storage to transmit the information added images to the center server and a function of requesting to register, update and delete the images. The information to be added to images includes information on whether use or read of the images by the third party is permitted or inhibited and information on which user is permitted during what period, and other information.

<User Group Management Table>

Figure 52:
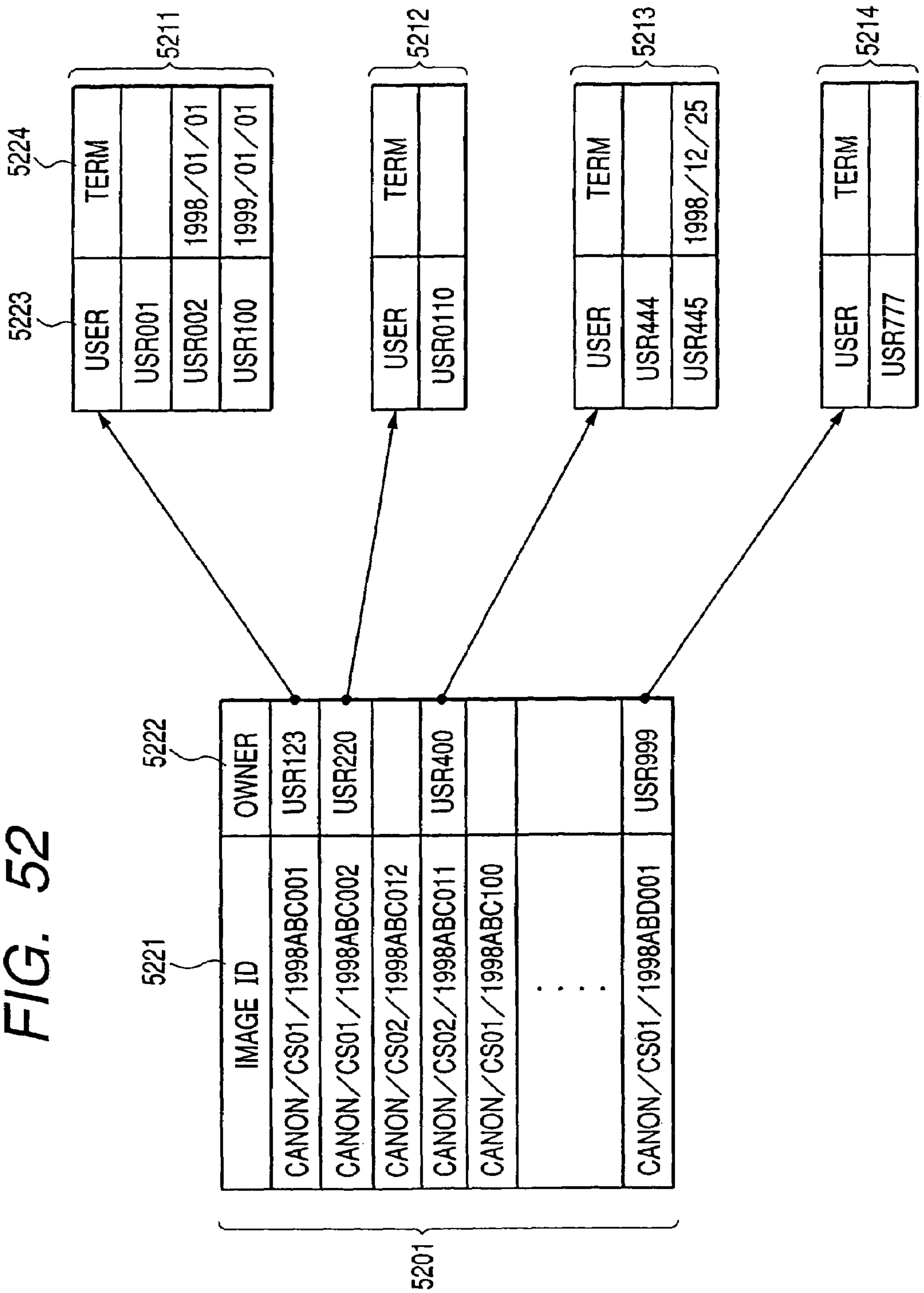
FIG. 52 is a user group management table for managing information on images transmitted from the client computer.

FIG. 52 is a diagram showing the user management table used in this embodiment. The user management table is stored in HDD 1009 of the center server 102 as a database or a searchable file, and used when print images transmitted from the client computer 101 are stored, when the user requests to edit print images, or at other times.

In FIG. 52, reference numeral 5201 represents a table storing the image ID of each image and its owner.

Reference numerals 5211 to 521N represent tables linked to respective images and storing users and their use periods. This information is transmitted from the client computer 101. Namely, this information can be set freely by the owner of print images which were transmitted to the center server.

Reference numeral 5221 represents an image ID of a usable print image.

Reference numeral 5222 represents an user ID of the owner of the image, the user ID being determined unique to the image ID. If an image is generally publicized free or not free, this item is made blank and there is no linked table.

Reference numeral 5223 represents an user ID of an user which can use the linked image.

Reference numeral 5224 represents a period during which the user identified by the user ID 5223 can use the linked print image. If this period of the user identified by the user ID 5223 is not limited, this item is made blank. This means that the print image can be used unlimitedly so long as it exists in the center server 102.

<Image Registration from Client Computer>

A process of registering print images transmitted from the client computer 101 will be described. The image register 404 shown in FIG. 51 registers new original images, deletes already registered images, moves or copies original images to the print server 122 or image server 112, in response to a request by the user of the client computer 101.

The client computer 101 transmits original images and information such as operation items, owner (user ID), user (user ID), and use period to the document supplier 401 shown in FIG. 51. The image register 404 acquires the original image and information.

Figure 53:
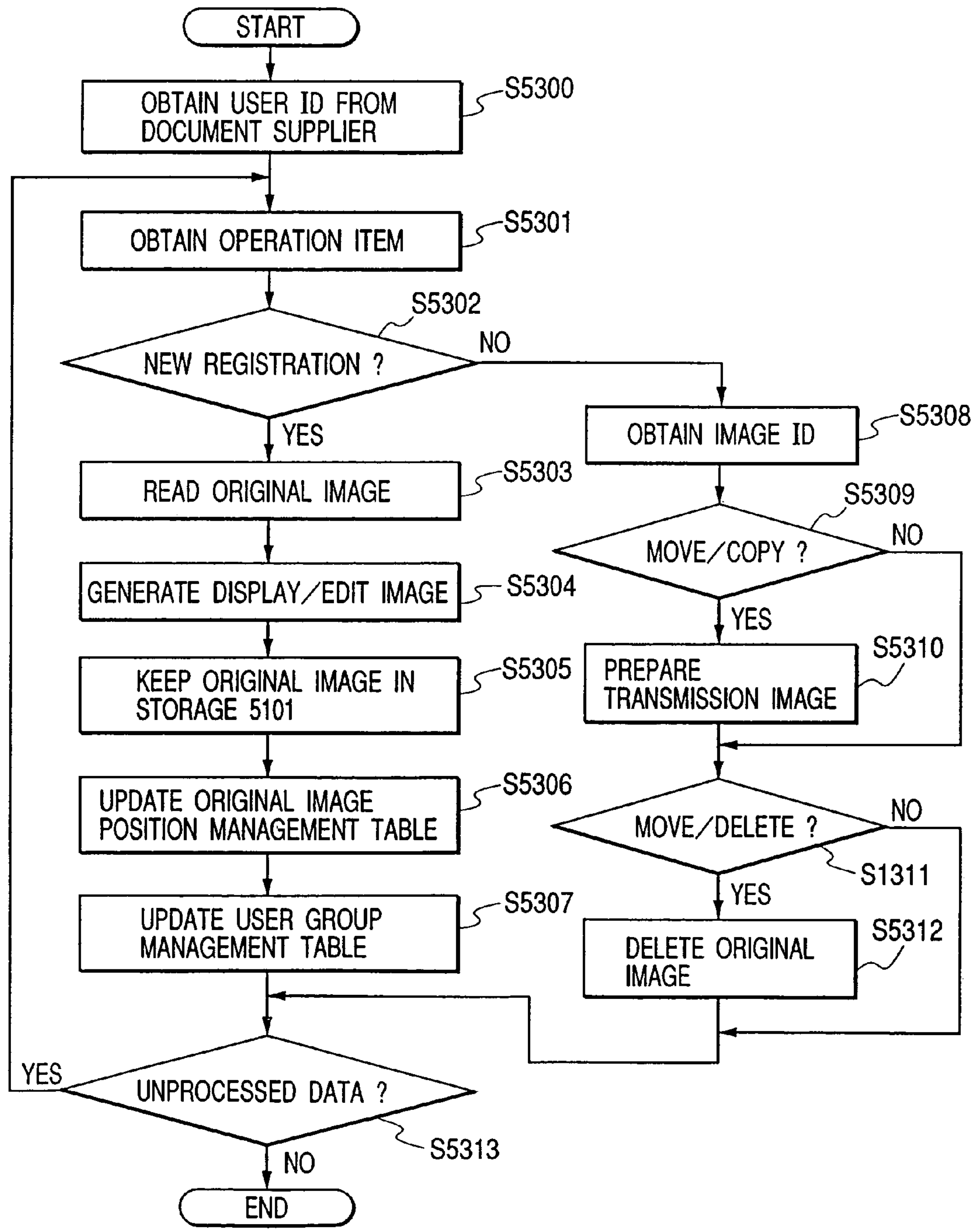
FIG. 53 is a flow chart illustrating an image registration process to be executed by the center server according to the fifth embodiment.

FIG. 53 is a flow chart illustrating an image register process to be executed by the image register 404. The image registration, move, copy and delete to be executed by the image register 404 will be described with reference to FIG. 53.

At Step S5300 the information acquired by the document supplier 401 is acquired by the image register 404.

At Step S5301 a code (hereinafter called an "operation code") for identifying the operation item is extracted from the information acquired at Step S5300, and stored in RAM 2002.

At Step S5302, the operation code stored at Step S5301 is checked. If the operation code corresponds to "new registration", the flow advances to Step S5303, whereas if not, the flow advances to Step S5308.

At Step S5303 the original image is written in RAM 2002. In this case, the center server 102 generates a unique value by using a present time or the like. This unique value is used as the image ID of the image such as the image ID of the first embodiment shown in FIG. 9, and stored in RAM 2002.

At Step S5304 the original image written in RAM 2002 at Step S5303 is converted into an image having a low resolution, a smaller image size and file size to thereby generate a display/edit image which is stored in the display/edit image storage 411. As the format of the display/edit image, a format which can be processed by the data processor 501 and expander 503 of the client computer 101 is used. The image format used is a format which allows to write additional information such as a comment, for example, a JFIF (JPEG Interchange Format) which is one of the image data formats using JPEG compression algorithms. The image ID of the image generated at Step S5303 and stored in RAM 2002 is written as the additional information.

At Step S5305 the original image written in RAM 2002 at Step S5303 is stored in the print image storage 5101.

At Step S5306 the user ID and image ID stored in RAM at Steps S5300 and S5303 and the keeping location are stored in the original image position management table 412 of the first embodiment described with reference to FIGS. 12A and 12B. As the keeping location, the path name of the original image file stored at Step S5305 or the volume name and path name of a removable disk are stored.

At Step S5307 the user ID and image ID stored in RAM at Steps S5300 and S5303, the user ID of a user which can use the original image and the use period, are stored in the user group management table 5102 described with reference to FIG. 52.

Steps S5308 to S5312 are executed if the operation code stored in RAM 2002 at Step S5301 is not "new registration", i.e., if it is "move", "copy", or "delete".

At Step S5308 the image ID of an already registered original image to be processed is acquired from the original image position management table 412 and stored in RAM 2002.

At Step S5309, the operation code stored at Step S5301 is checked. If the operation code is "move" or "copy", the flow advances to Step S5310, whereas if not, the flow advances to Step S5311.

At Step S5310 by using the image ID stored at Step S5308, the original image position management table 412 is searched to acquire the path name of the original image file corresponding to the image ID, to read the original image file from HDD 2009 or FDD 2010, and to copy it to the center transmission box 407 as a new image file. The path name of the copied file is stored in RAM 2002.

At Step S5311 the operation code stored at Step S5301 is checked. If the operation code is "move" or "delete", the flow advances to Step S5312, whereas if not, the flow advances to Step S5313.

At Step S5312 by using the image ID stored at Step S5308, the original image position management table 412 is searched to delete data and original image file from the original image position management table.

At Step S5313 the number of original images to be processed for the user is checked. If there is an original image still not processed, the flow returns to Step S5301.

The registered print image can be processed thereafter in a manner similar to processing the print image described in the first to fourth embodiments. Similar services of the first to fourth embodiments can be provided.

<Edit Image Acquisition by Client Computer>

A process to be executed by the center server when the user of the client computer 101 requests to acquire the edit image will be described.

The document supplier 401 shown in FIG. 51 executes the processes of the first embodiment, and in addition the search, addition, update, and delete processes for the user group management table 5102.

The client computer 101 transmits information such as the operation items, user ID and image ID to the document supplier 401.

Figure 54:
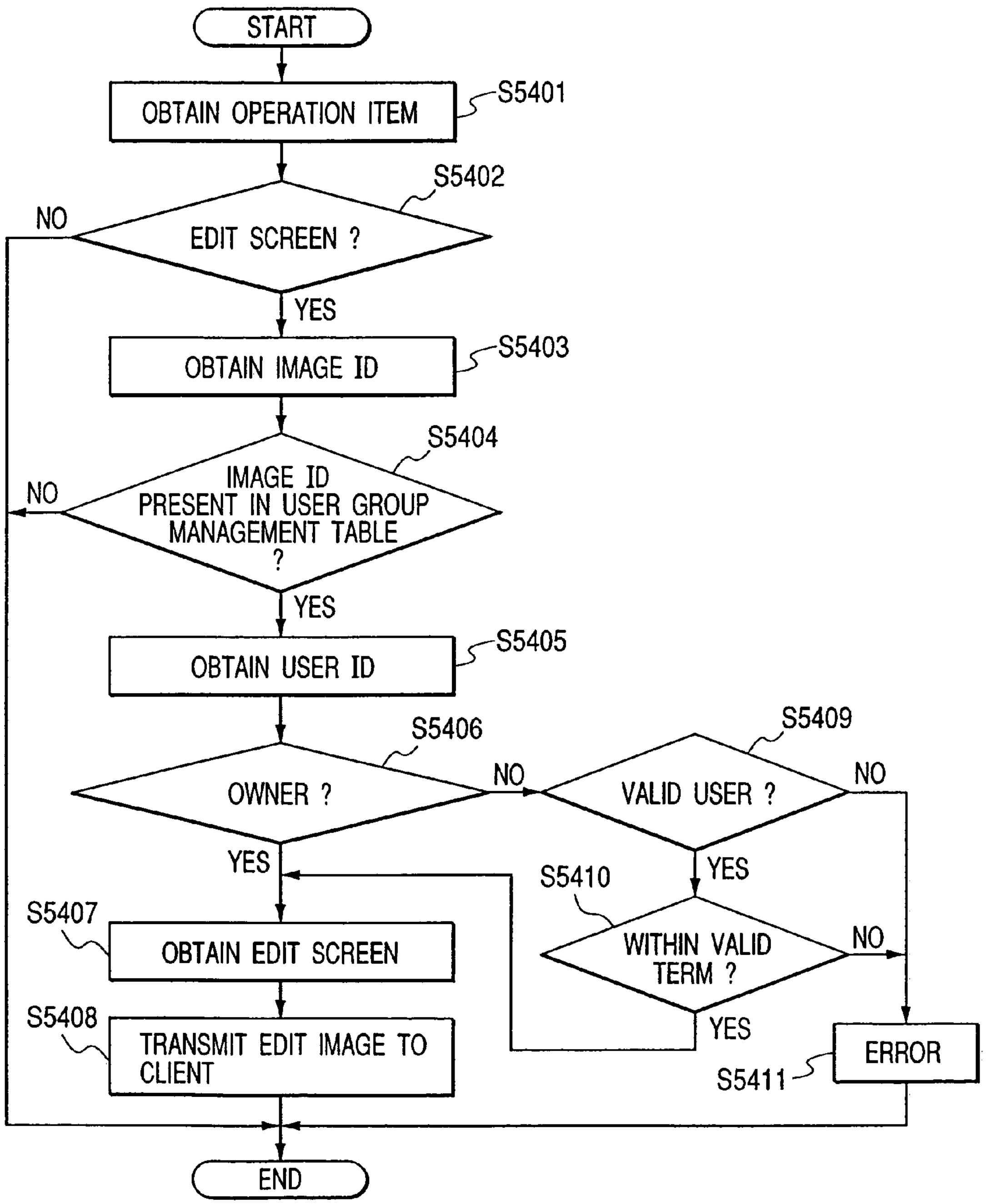
FIG. 54 is a flow chart illustrating an edition image supplying process according to the fifth embodiment.

FIG. 54 is a flow chart illustrating the edit image supply process to be executed by the document supplier 401 received the above-described information. The edit image supply process to be executed by the document supplier 401 will be described with reference to FIG. 54.

At Step S5401 a code (hereinafter called an "operation code") for identifying the process item is acquired and stored in RAM 2002.

At Step S5402, the operation code stored at Step S5401 is checked. If the operation code corresponds to "edit screen acquisition", the flow advances to Step S5403, whereas if not, the process is terminated.

At Step S5403 an image ID is acquired and stored in RAM 2002.

At Step S5404 by using the image ID acquired at Step S5403, the user group management table 5102 is searched to judge whether the previously acquired image ID exists in this table. If exists, the flow advances to Step S5405, whereas if not, the process is terminated and the process of acquiring an edit image of the original image registered in the print server 121 or image server 111 starts as in the first embodiment.

At Step S5405 it is checked whether the user ID stored at Step S5405 is coincident with the user ID at the row searched at Step S5404. If coincident, the flow advances to Step S5407, whereas if not, the flow advances to Step S5410.

At Step S5407 by using the image ID acquired at Step S5403, the edit image is acquired by using the edit image supplier 402.

At Step S5408, the edit image acquired at Step S5407 is transmitted to the client computer 101.

At Step S5409 by using the user ID acquired at Step S5405, the table linked to the row searched at Step S5404 is searched. If the same user ID exists, the flow advances to Step S5410, whereas if not, the flow advances to Step S5411.

At Step S5410 the value is acquired from the period item at the row searched at Step S5409 to check whether the present data is in the period. If in the period, the flow advances to Step S5407, whereas if not, the flow advances to Step S5411.

At Step S5411, an error process is performed and a message to this effect is transmitted to the client computer 101.

As above, print images are registered in the center server, and the center server controls the client computer which acquires and edits the edit image of the registered print image.

The present invention may be applied to a system constituted of a plurality of apparatuses or to a system constituted of a single apparatus. The invention is obviously applicable to the case wherein the embodiment functions can be realized by supplying programs to the system or apparatus. In this case, a storage medium storing such programs constitutes the invention. The system or apparatus reads the programs from the storage medium and operates in a predetermined manner.

The object of the invention can be achieved by supplying the system or apparatus with a storage medium storing program codes of software realizing the embodiment functions and making a computer (or CPU or MPU) of the system or apparatus read and execute the program codes stored in the storage medium. In this case, the software program codes themselves read from the storage medium realize the novel functions of the invention. Therefore, the storage medium storing such program codes constitutes the invention.

The storage medium storing such program codes may be a floppy disk, a hard disk, an optical disk, a magneto-optical disk, a CD-ROM, a CD-R, a magnetic tape, a non-volatile memory card, a ROM, and the like.

The invention also includes not only the case wherein the embodiment functions are realized by executing the program codes read by a computer, but also the case wherein the embodiment functions are realized by an OS on which the computer runs performs part or the whole of actual processes in accordance with the program codes.

Furthermore, the invention also includes the case wherein the program codes read from the storage medium are written in a memory of a function expansion board or unit connected to the computer, and a CPU or the like of the function board or unit executes part or the whole of actual processes for realizing the embodiment functions.

As described above, according to the present invention, the image position management system capable of communicating with a plurality of image storages via a network has: a manager for managing specific information indicating the image storage in which image data is stored; and an identifier for identifying the image storage storing the image data in accordance with the specific information stored in the manager, in response to a request for the image data from an external apparatus. Accordingly, a user is required only to memorize and use the image ID uniquely assigned to the image data file in order to acquire and process the image data file. Further, by managing and storing image data of an owner together with the information such as owner and user of the image data, it becomes possible to make or not to make public the image data to the third party.

What is claimed is:

1. An information processing apparatus for data transmission/reception to/from an external apparatus via a network, comprising:

storage means for storing a transmission data file and a data file; and transmission/reception control means for controlling the data transmission/reception of the data file to/from the external apparatus in accordance with the transmission data file, wherein the transmission data file includes transmission/reception identification information for identifying the information processing apparatus and the external apparatus and order information for controlling an order at the external apparatus.

2. An information processing apparatus according to claim 1, wherein the order information includes identification information for identifying the data file used by the order.

3. An information processing apparatus according to claim 1, further comprising generating means for generating transmission/reception control information for controlling the data transmission/reception of the data file in accordance with the transmission data file, wherein said transmission/reception control means controls the data transmission/reception in accordance with the generated transmission/reception control information.

4. An information processing apparatus according to claim 3, wherein the transmission/reception control information includes transmission completion information representative of a transmission completion of the data file, and said transmission/reception control means controls the data transmission/reception of the data file for which the transmission completion information is still not transmitted.

5. An information processing apparatus according to claim 1, wherein the information processing apparatus is applied to a system in which the external apparatus prints the data file in accordance with a print request from a document processing apparatus.

6. An information processing apparatus according to claim 1, wherein the information processing apparatus is a center server for collecting the data file of an image and making the external apparatus print the data file in accordance with the print request, a transmission method responding to the print request from a document processing apparatus is asynchronous, and a transmission method for the external apparatus is a positive transmission path establishment and transmission made by the external apparatus.

7. An information processing apparatus according to claim 1, wherein the information processing apparatus is a center server for collecting the data file of an image and making the external apparatus print the data file in accordance with the print request, and said transmission/reception control means controls to transmit a list of print orders to the external apparatus and transmit the transmission data file and the data file corresponding to a print order requested from the external apparatus.

8. An information processing apparatus according to claim 1, wherein the information processing apparatus is a print server for receiving the data file in accordance with the transmission data file supplied from the external apparatus and generating print data in accordance with the transmission data file and the data file, and said transmission/reception control means controls to receive a list of print orders from the external apparatus and transmits a request for a print order to be received, to the external apparatus.

9. An information processing apparatus according to claim 8, further comprising selection means for displaying the print order to be received on a display means in accordance with the list of print orders and selecting the print order to be received, wherein said transmission/reception control means controls to transmit a reception request for the selected print order to the external apparatus.

10. An information processing apparatus according to claim 9, further comprising reception schedule setting means for setting information for receiving data from the external apparatus, wherein the print order to be received when the data is received from the external apparatus is automatically selected in accordance with the information set by said reception schedule setting means.

11. An information processing apparatus according to claim 1, wherein the transmission data file has an SGML format.

12. An information processing apparatus according to claim 1, wherein said transmission/reception control means activates service software in accordance with contents of the received transmission data file.

13. A data transmission method for an information processing apparatus for data transmission/reception to/from an external apparatus via a network comprising:

a storage step of storing a transmission data file and a data file in a storage of the information processing apparatus; and a transmission/reception control step of controlling the data transmission/reception of the data file to/from the external apparatus in accordance with the transmission data file, wherein the transmission data file includes transmission/reception identification information for identifying the information processing apparatus and the external apparatus and order information for controlling an order at the external apparatus.

14. A data transmission method according to claim 13, wherein the order information includes identification information for identifying the data file used by the order.

15. A data transmission method according to claim 13, further comprising a generating step of generating transmission/reception control information for controlling the data transmission/reception of the data file in accordance with the transmission data file, wherein said transmission/reception control step controls the data transmission/reception in accordance with the generated transmission/reception control information.

16. A data transmission method according to claim 15, wherein the transmission/reception control information includes transmission completion information representative of a transmission completion of the data file, and said transmission/reception control step controls the data transmission/reception of the data file for which the transmission completion information is still not transmitted.

17. A data transmission method according to claim 13, wherein the data transmission method is applied to a system in which the external apparatus prints the data file in accordance with a print request from a document processing apparatus.

18. A data transmission method according to claim 13, wherein the data transmission method is a method of data transfer of a center server for collecting the data file of an image and making the external apparatus print the data file in accordance with the print request, a transmission method responding to the print request from a document processing apparatus is asynchronous, and a transmission method for the external apparatus is a positive transmission path establishment and transmission made by the external apparatus.

19. A data transmission method according to claim 13, wherein the data transmission method is a method of controlling data transfer of a center server for collecting the data file of an image and making the external apparatus print the data file in accordance with the print request, and said transmission/reception control step controls to transmit a list of print orders to the external apparatus and transmit the transmission data file and the data file corresponding to a print order requested from the external apparatus.

20. A data transmission method according to claim 13, wherein the data transmission method is a method of controlling data transfer of a print server for receiving the data file in accordance with the transmission data file supplied from the external apparatus and generating print data in accordance with the transmission data file and the data file, and said transmission/reception control step controls to receive a list of print orders from the external apparatus and transmits a request for a print order to be received, to the external apparatus.

21. A data transmission method according to claim 20, further comprising a selection step of displaying the print order to be received on a display means in accordance with the list of print orders and selecting the print order to be received, wherein said transmission/reception control step controls to transmit a reception request for the selected print order to the external apparatus.

22. A data transmission method according to claim 21, further comprising a reception schedule setting step of setting information for receiving data from the external apparatus, wherein the print order to be received when the data is received from the external apparatus is automatically selected in accordance with the information set at said reception schedule setting step.

23. A data transmission method according to claim 13, wherein the transmission data file has an SGML format.

24. A data transmission method according to claim 13, wherein said transmission/reception control step activates service software in accordance with contents of the received transmission data file.

25. A machine-readable storage medium storing a data transmission program for an information processing apparatus for data transmission/reception to/from an external apparatus via a network, the program comprising:

a storage step of storing a transmission data file and a data file in a storage of the information processing apparatus; and a transmission/reception control step of controlling the data transmission/reception of the data file to/from the external apparatus in accordance with the transmission data file, wherein the transmission data file includes transmission/reception identification information for identifying the information processing apparatus and the external apparatus, and order information for controlling an order at the external apparatus.

* * * * *